United States Patent
Hasan et al.

(10) Patent No.: US 11,229,871 B2
(45) Date of Patent: Jan. 25, 2022

(54) INTEGRATED CARBON CAPTURE AND CONVERSION FOR PRODUCTION OF SYNGAS

(71) Applicant: The Texas A&M University System, College Station, TX (US)

(72) Inventors: M. M. Faruque Hasan, College Station, TX (US); Shachit Shankaran Iyer, College Station, TX (US); Priyadarshini Balasubramanian, Bryan, TX (US); Ishan Bajaj, College Station, TX (US); Akhil Arora, College Station, TX (US)

(73) Assignee: The Texas A&M University System, College Station, TX (US)

( * ) Notice: Subject to any disclaimer, the term of this patent is extended or adjusted under 35 U.S.C. 154(b) by 218 days.

(21) Appl. No.: 16/154,873

(22) Filed: Oct. 9, 2018

(65) Prior Publication Data
US 2019/0105594 A1 Apr. 11, 2019

Related U.S. Application Data

(60) Provisional application No. 62/569,993, filed on Oct. 9, 2017.

(51) Int. Cl.
*B01D 53/02* (2006.01)
*B01D 53/62* (2006.01)
(Continued)

(52) U.S. Cl.
CPC ......... *B01D 53/02* (2013.01); *B01D 53/0423* (2013.01); *B01D 53/62* (2013.01);
(Continued)

(58) Field of Classification Search
CPC .... B01D 53/02; B01D 53/62; B01D 53/0423; B01D 53/869; C01B 3/38; C01B 2203/06
See application file for complete search history.

(56) References Cited

U.S. PATENT DOCUMENTS 7,964,020 B2 * 6/2011 Baker .................... B01D 53/22 95/51
8,911,536 B2 * 12/2014 Chang .................... B01D 53/62 95/51

OTHER PUBLICATIONS

Wang et al. (Carbon dioxide reforming of methane to produce synthesis gas over metal supported catalysts: State of the Art, Energy and Fuels, 1996, 10. 896-904) (Year: 1996).*
(Continued)

*Primary Examiner* — Youngsul Jeong
(74) *Attorney, Agent, or Firm* — Winstead PC

(57) ABSTRACT

A method of capturing and converting a gas includes supplying a first gas to an adsorption column, adsorbing a first component of the first gas into an adsorbent contained in the adsorption column responsive to the adsorbent having an increased affinity for the first component, venting a second component of the first gas out of the adsorption column, supplying a second gas to the adsorption column so as to increase a partial pressure of the second gas thereby decreasing the partial pressure of the first component within the adsorption column, desorbing the first component from the adsorbent responsive to the increased partial pressure of the second gas and decreased partial pressure of the at least one first component, and transmitting a mixture of the first component and the second gas to a reactor via a reactor line.

5 Claims, 19 Drawing Sheets

(51) Int. Cl.
*C01B 3/38* (2006.01)
*B01D 53/04* (2006.01)
*B01D 53/86* (2006.01)

(52) U.S. Cl.
CPC .............. *B01D 53/869* (2013.01); *C01B 3/38* (2013.01); *B01D 2251/208* (2013.01); *B01D 2256/10* (2013.01); *B01D 2256/22* (2013.01); *B01D 2257/102* (2013.01); *B01D 2257/504* (2013.01); *B01D 2258/0283* (2013.01); *C01B 2203/0238* (2013.01); *C01B 2203/06* (2013.01)

(56) References Cited

OTHER PUBLICATIONS

Iyer, S, et al., Integrated Carbon Capture and Conversion to Produce Syngas: Novel Process Design, Intensification, and Optimization, Industrial & Engineering Chemistry Research, 56, pp. 8622-8648 [Jul. 12, 2017].

Iyer, S. et al., Design and Optimization of Integrated Carbon Capture and Conversion with Natural Gas to Produce Syngas, American Institute of Chemical Engineers Annual Meeting [Nov. 16, 2016].

Iyer, S. et al., Design and Optimization of Modular Technology for Integrated Carbon Capture & Conversion of CO2 Using Methane Sources, Texas A&M Chemical Engineering Research Symposium [Mar. 9, 2017].

* cited by examiner

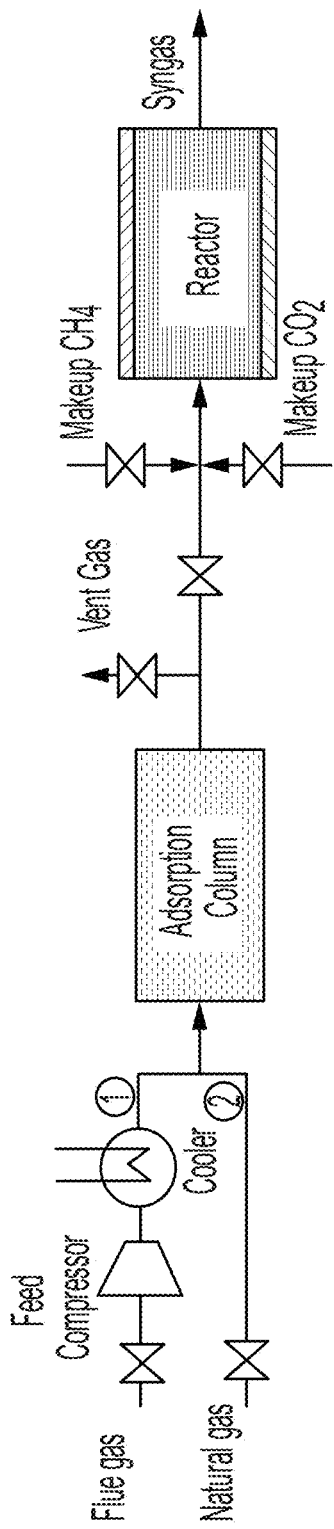
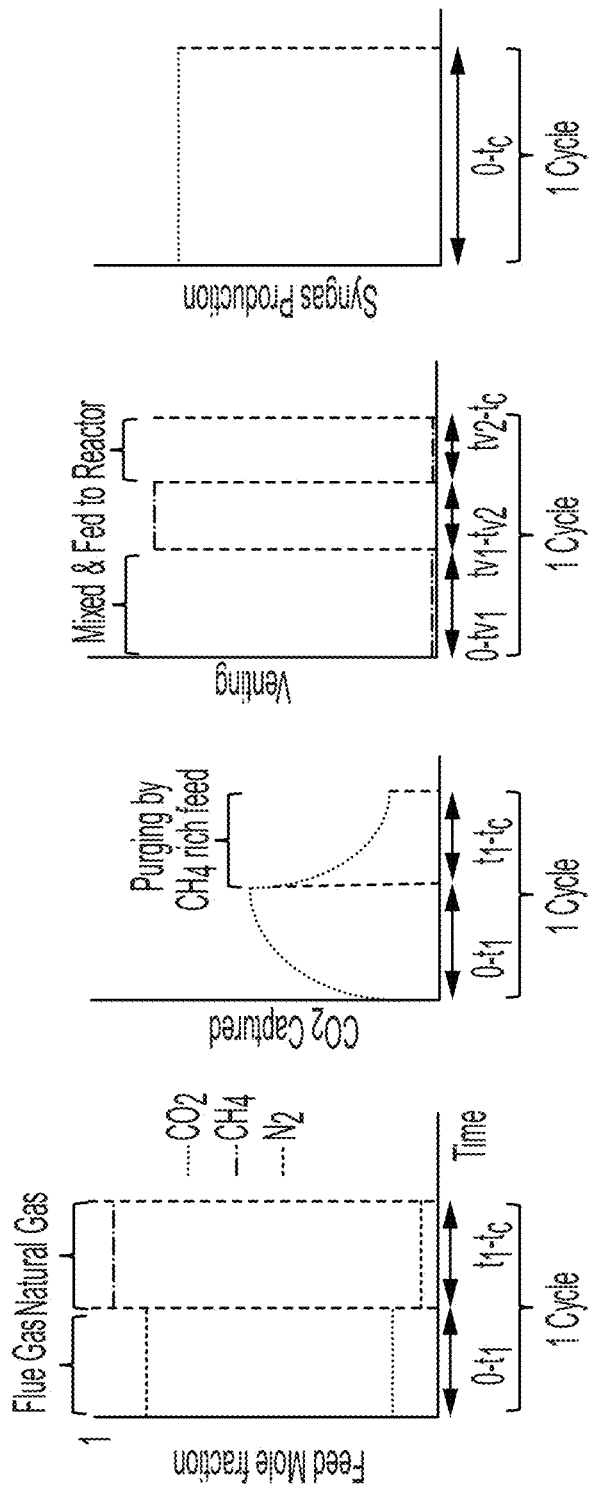
FIG. 4A
FIG. 4B
FIG. 4C
FIG. 4D
FIG. 4E

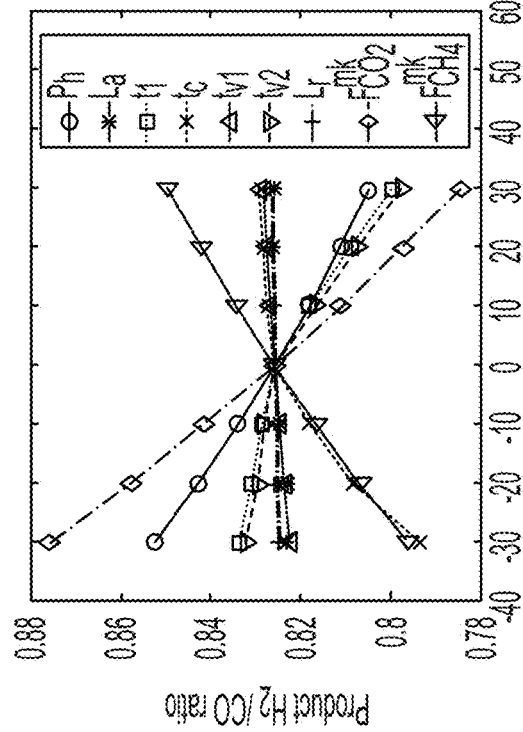
FIG. 13A
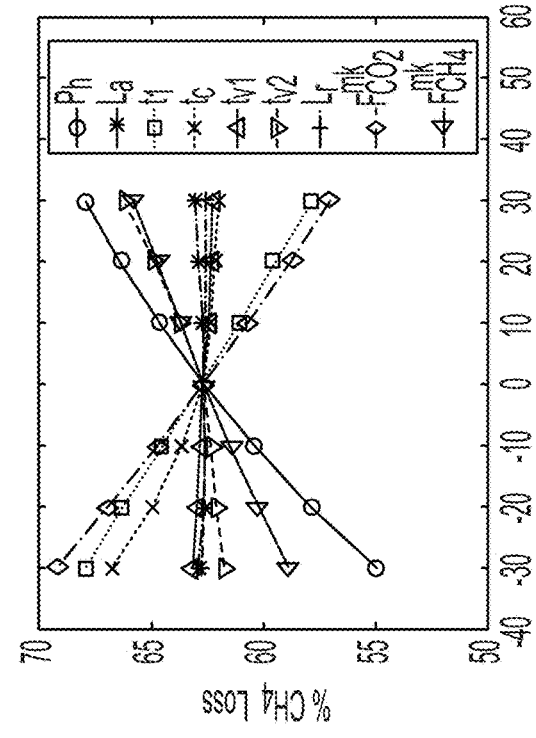
FIG. 13B
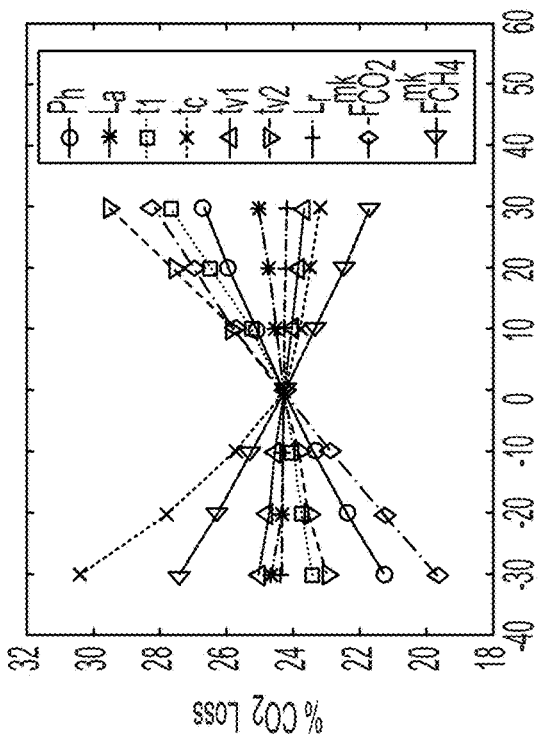
FIG. 13D
FIG. 13C

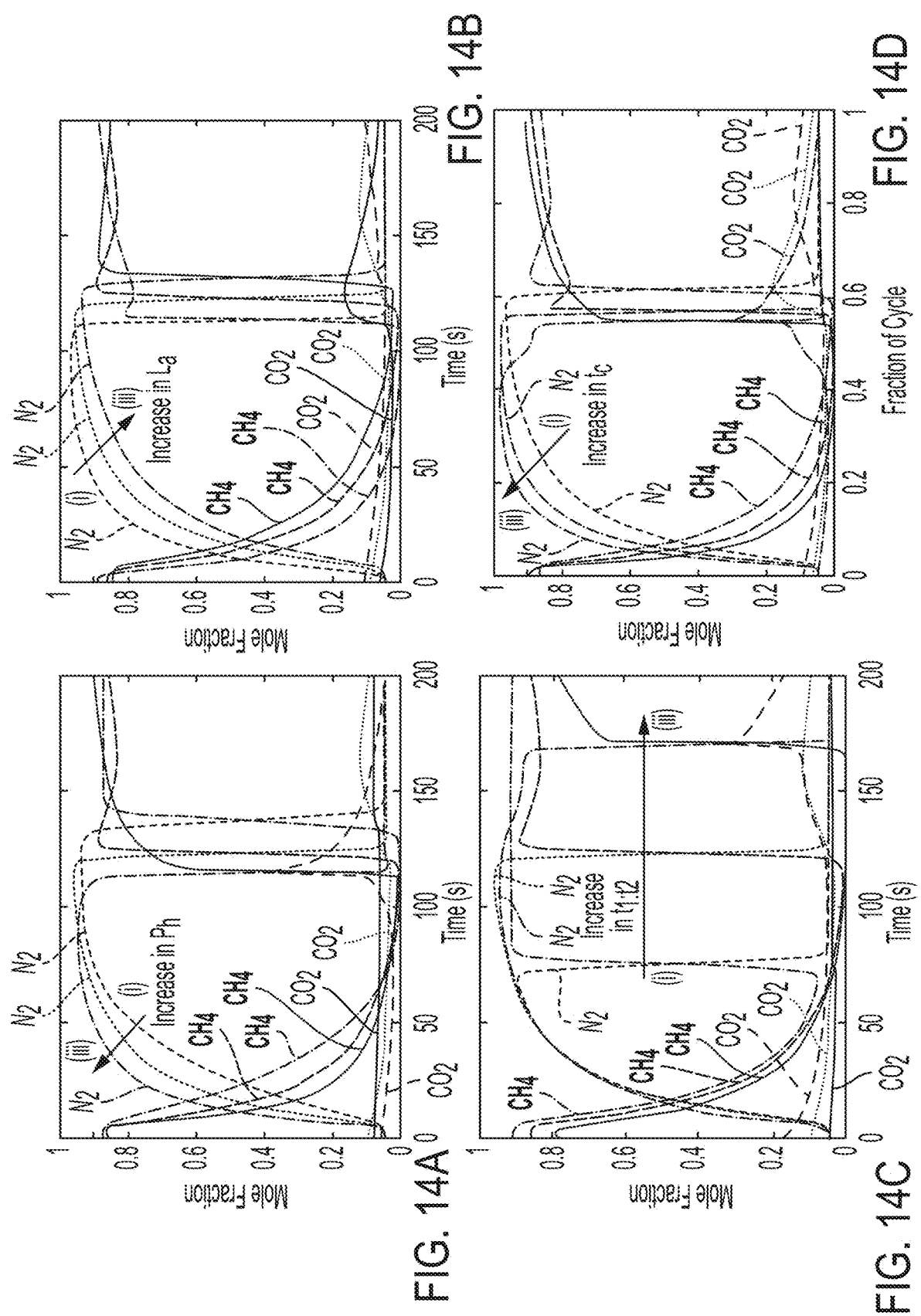

INTEGRATED CARBON CAPTURE AND CONVERSION FOR PRODUCTION OF SYNGAS

CROSS-REFERENCE TO RELATED APPLICATIONS

This patent application claims priority from, and incorporates by reference the entire disclosure of, U.S. Provisional Patent Application No. 62/569,993 filed on Oct. 9, 2017.

STATEMENT REGARDING FEDERALLY SPONSORED RESEARCH

This invention was made with government support under CBET-1606027 awarded by the National Science Foundation. The government has certain rights in the invention.

BACKGROUND

Technical Field

The present disclosure relates generally to carbon capture and conversion and more particularly, but not by way of limitation, to systems and methods for integrated carbon capture and conversion for production of syngas.

History of Related Art

In recent years, the concentration of carbon dioxide ($CO_2$) in the atmosphere has reached the highest level (>400 ppm) in recorded history. $CO_2$ is a major greenhouse gas (GHG) and has been linked to global warming. Adverse effects of global warming include climate change, extreme weather events, melting of polar ice caps, rise of sea levels, and oceanic acidification. The increased levels of $CO_2$ in the post-industrial period are attributed to the burning of fossil fuels. Emissions at the current rates would lead to increased global warming and the resulting future adverse impacts could be larger as compared to the last century. World energy consumption is predicted to see a 48% increase from 2012 to 2040 and fossil fuel sources will still account for 78% of the world energy consumption in 2040. Reduction of $CO_2$ emissions by at least 50% is necessary to restrict the global temperature rise to 2° C. by 2050. Hence it is imperative to reduce $CO_2$ emissions from fossil fuel consumption.

SUMMARY OF THE INVENTION

In an embodiment, a gas capture and conversion system, including a first gas feed, a second gas feed, an adsorption column fluidly coupled to the first gas feed and to the second gas feed, the adsorption column comprising an adsorbent having an affinity for at least one first component of the first gas, a vent fluidly coupling the adsorption column to the atmosphere, the vent exhausting at least one second component of the first gas, and where, increasing a partial pressure of the second gas by supplying the second gas results in a reduction of a partial pressure of the at least one first component of the first gas resulting in the at least one first component of the first gas being desorbed from the adsorbent.

In a further embodiment, a method of capturing and converting a gas, the method including supplying a first gas to an adsorption column, adsorbing a first component of the first gas into an adsorbent contained in the adsorption column responsive to the adsorbent having an increased affinity for the first component of the gas, venting a second component of the first gas out of the adsorption column, supplying a second gas to the adsorption column so as to increase a partial pressure of the second gas thereby decreasing the partial pressure of the first component of the first gas within the adsorption column, desorbing the first component of the first gas from the adsorbent responsive to the increased partial pressure of the second gas and decreased partial pressure of the at least one first component of the first gas, and transmitting a mixture of the first component of the first gas and the second gas to a reactor via a reactor line.

In a particular embodiment, a method of carbon capture and conversion, the method including supplying flue gas to an adsorption column, adsorbing $CO_2$ from the flue gas into an adsorbent contained in the adsorption column responsive to the adsorbent having an increased affinity for the $CO_2$, venting a $N_2$ out of the adsorption column, supplying $CH_4$ to the adsorption column so as to increase a partial pressure of the $CH_4$ within the adsorption column thereby decreasing a partial pressure of the $CO_2$, desorbing the $CO_2$ from the adsorbent responsive to the increased partial pressure of the $CH_4$ and a reduced partial pressure of $CO_2$, and transmitting a mixture of the $CO_2$ and the $CH_4$ to a reactor via a reactor line.

BRIEF DESCRIPTION OF THE DRAWINGS

A more complete understanding of the subject matter of the present disclosure may be obtained by reference to the following Detailed Description when taken in conjunction with the accompanying Drawings.

FIG. 4a illustrates a process schematic for integrated capture and conversion wherein the process is operated in a cyclic manner, where each cycle consists of two steps 1 and 2. $t_1$ is the duration of step 1, and $t_c$ is the total cycle time. In step 1, flue gas is fed to the adsorption column, while in the second step, $CH_4$-rich feed, such as natural gas, is fed to the column to desorb $CO_2$. The outlet gas from the adsorption column during the period when it is rich in $N_2$ is vented out and outlet gas from the rest of the cycle, when it is rich in $CH_4$ and $CO_2$, becomes reactor feed. It is further mixed with makeup feed and fed to the reactor for continuous operation.

FIG. 4b illustrates a schematic of feed mole fraction variation with time wherein a flue gas feed of composition 14% $CO_2$ and 86% $N_2$ is used, while natural gas of composition 95% $CH_4$ and 5% $N_2$ is used.

FIG. 4c illustrates a schematic of $CO_2$ captured/adsorbed and desorbed at cyclic steady state.

FIG. 4d illustrates the times of the cycle during which outlet gas from adsorption column is vented or mixed and fed to the reactor wherein $t_{v1}$ is the venting start time and $t_{v2}$ is the venting end time.

FIG. 4e illustrates a schematic of syngas produced at an outlet of the process.

FIG. 13a illustrates sensitivity analysis of total cost of the process per ton of syngas (SG) produced.

FIG. 13b illustrates sensitivity analysis of $H_2$/CO ratio in the product syngas.

FIG. 13c illustrates sensitivity analysis of % $CO_2$ loss.

FIG. 13d illustrates sensitivity analysis of % $CH_4$ loss performed at 10%, 20%, and 30% above and below the values of the design variables from the reference case. Loss percentages for $CO_2$ and $CH_4$ account for both the loss through the venting step and the loss due to the presence in the final product syngas. The process metrics are calculated over a representative cycle at cyclic steady state.

FIG. 14a illustrates the effect of three different values of pressure: (i) 1 bar, (ii) 5 bar, and (iii) 10 bar on the adsorption column outlet profiles.

FIG. 14b illustrates the effect of three different values of adsorption column length $L_a$: (i) 1 m, (ii) 1.5 m, and (iii) 2 m on the adsorption column outlet profiles.

FIG. 14c illustrates the effect of different relative duration: (i) 1:2, (ii) 1:1, and (iii) 2:1 values of feed step 1 and 2 on adsorption column outlet profiles. Total cycle time= 200 s.

FIG. 14d illustrates the effect of different values of total cycle time $t_c$: (i) 200 s, (ii) 300 s, and (iii) 400 s on the adsorption outlet profiles. The profiles are obtained for each case by changing the appropriate value of the variable, while setting the values of other variables same as the reference case.

FIG. 15 illustrates simulations which are infeasible as well as simulations within a feasible region of operation. The simulations are run for number of spatial discretizations N=5 and cycles C=5, and the process metric values are calculated over a cycle.

DETAILED DESCRIPTION

Figure 1:
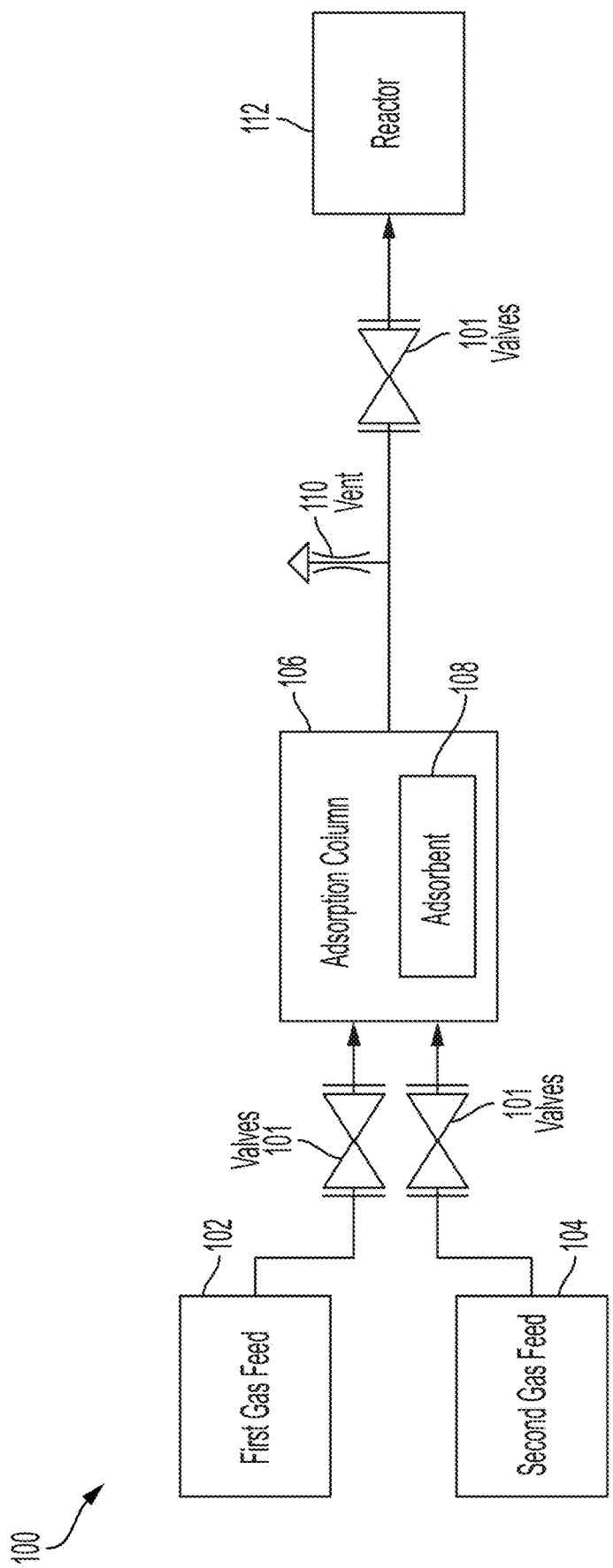
FIG. 1 illustrates a gas capture and conversion system according to an embodiment of the present disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

An integrated, modular, and multifunctional process is designed, simulated, and optimized for direct utilization of $CO_2$ from dilute flue gas to produce syngas—a precursor for many value-added chemicals and liquid transportation fuels. The process is intensified to simultaneously capture and convert $CO_2$ using methane, natural gas, or excess fuel gas from the same plant, or using nearby unconventional methane from biogas or landfill gas. It is an integrated adsorption-purge-reaction system where $CO_2$ is first adsorbed and then desorbed using methane-rich feed leading to a mixture suitable for dry reforming. The merging of concentration-based $CO_2$ desorption with the reactor feed premixing step eliminates the need for pressure or temperature swings and significantly reduces the energy penalty and cost of $CO_2$ capture and utilization. The process is simulated at different conditions using a high-fidelity process model to elucidate the effects of key decision variables as well as the trade-offs and interactions between the capture and reforming sections. The systems and methods presented herein are flexible to handle different feedstock compositions, and are amenable to both centralized and distributed production of syngas. A constrained grey-box optimization method is employed to achieve approximately 99.7% net overall $CO_2$ utilization considering auxiliary emissions at a total cost ranging from $110-130 per ton of syngas. Approximately 14.6% of the total $CO_2$ input to the process comes "directly" from flue gas without additional cost for $CO_2$ capture while maintaining about 91% overall $CO_2$ utilization. The systems and methods presented herein are also computationally found to be robust in terms of $CO_2$ utilization and cost for different natural gas feeds with $CO_2$ contamination as high as 60%. This can be attributed to the novel process intensification concept and the grey-box constrained optimization method presented herein.

While Carbon Capture and Sequestration (CCS) have the potential to reduce $CO_2$ emissions from the energy sector by 20%, high costs prevent the technology from being implemented on a large scale. For power plants, estimated cost for CCS ranges from $60-$114 per ton of $CO_2$ avoided. The capture/separation step of CCS is the most energy intensive, and hence accounts for a large share (60-70%) of the total cost. After the capture, there is cost associated with compression to high pressures (150 bar) for transportation via pipelines to storage sites. Additionally, limited geological storage capacity at certain locations, concerns over possible leaks, and costs associated with rigorous monitoring of injected $CO_2$ have raised concerns towards widespread implementation of CCS.

In the light of these issues with CCS, an alternative way to reduce $CO_2$ emissions is the capture and conversion of $CO_2$ to useful products which can be sold for profit. $CO_2$ can be used as a source of carbon for chemicals such as syngas (a mixture of $H_2$ and CO), methanol, formic acid, carbonates, polymeric materials, fine chemicals, inter alia. Syngas is a universal precursor that can be converted to various fuels and hydrocarbons via Fischer-Tropsch synthesis which makes a potential case for large-scale $CO_2$ utilization to address the scale of global $CO_2$ emissions (around 35 Gt per year). Different reforming approaches of natural gas using $CO_2$ (e.g., dry reforming, mixed reforming, tri-reforming, etc.) have been studied as they can produce syngas with varying $H_2$/CO ratios. A recent study reports that $CO_2$ reforming has lower capital and operating cost compared to steam reforming, assuming the $CO_2$ feed has negligible cost.

$CO_2$ capture and conversion also poses several technological challenges. First, due to high thermodynamic stability of $CO_2$, its conversion is energy-intensive. Second, existing utilization technologies use mostly high-purity $CO_2$ obtained from isolated capture plants. The cost of product syngas becomes high because of the additional expense ($35-$50 per ton) and high-energy penalty (10-30% of power plant output) associated with $CO_2$ capture. Third, the lack of proper integration between capture and conversion may lead to an overall negative utilization of $CO_2$ when auxiliary emissions from electricity consumption are considered.

To this end, process intensification is paramount towards making $CO_2$ capture and conversion viable for large-scale deployment. Intensification can be achieved by combining the salient features of individual process technologies. Examples include multi-functional reactors, membrane reactors, layered bed adsorption columns, sorption-enhanced reaction processes (SERP), combined separation and storage (CSS), and multi-material simulated moving bed (MSMB). In the context of $CO_2$ utilization, an intensification method would have significant impact if it could combine post-combustion $CO_2$ capture and $CO_2$ reforming in a manner that would break the current barrier of high cost and high-energy penalty while ensuring a net positive $CO_2$ utilization.

Currently, with existing systems, $CO_2$ separation from flue gas is very costly. There are a number of factors that cause existing systems and methods to maintain high operation costs. For example, in current systems the source of $CO_2$ in a feed stream is typically low, or even dilute when in a mixture of other gasses, this typically results in very high separation costs to extract the $CO_2$. Furthermore, current systems require high temperatures, and/or low pressures, and/or repetitive/periodic changes in pressures and/or temperatures to capture and convert $CO_2$, which equates to higher energy costs and operation costs for capture and conversion of $CO_2$.

The present disclosure combines and further intensifies the post-combustion capture of $CO_2$ from flue gas (a mixture of predominantly $N_2$ and $CO_2$) with $CO_2$ conversion to produce syngas towards "direct" utilization of $CO_2$ at the source. The present disclosure discusses an integrated carbon capture-conversion (ICCC) process. Contributions of this disclosure are as follows:

Process Design and Intensification: A conceptual design of a modular and multi-functional cyclic process is put forward to simultaneously capture $CO_2$ from flue gas, release $CO_2$ using methane, natural gas, fuel gas, biogas, landfill gas, or combinations thereof, to provide a mixture of methane and $CO_2$ for dry reforming, and convert the mixture of $CO_2$ and $CH_4$ into syngas. The integrated carbon capture and conversion (ICCC) process of the present disclosure eliminates energy intensive temperature and/or pressure swings in the regeneration step of $CO_2$ capture by combining the $CO_2$ desorption with the reactor feed premixing step, which significantly reduces the overall energy penalty and cost of $CO_2$ utilization.

High-Fidelity Model-Based Process Simulation: To establish the techno-economic feasibility and to predict the performance of the systems and methods of the present disclosure, rigorous simulations using a detailed process model were performed. The model describes the dynamics and interaction of the adsorption-purge-reaction system and is implemented to perform rigorous process simulations elucidating the key variables affecting the process.

Process Optimization: A simulation-based, data-driven, and constrained grey-box optimization framework is developed to obtain feasible and optimal process configurations and operating conditions. The objectives of process optimization include: (i) maximizing net utilization of $CO_2$; (ii) minimizing energy penalty and operating cost of the process; and (iii) minimizing total cost of syngas production via "direct" $CO_2$ utilization. The objectives are met while operating within specified conditions for $CH_4$ and $CO_2$ losses, operational constraints, and bounded syngas ratios.

Robustness and Techno-Economic Analyses: The simulation-based constrained optimization method is applied to find feasible operating windows, $CO_2$ utilization, and total costs for a range of feed conditions to computationally show the robustness of the proposed technology.

In some embodiments, the present disclosure relates generally to regenerating the capacity of an adsorbent medium contained in an adsorption column, used to capture a desired gas (e.g., gas A) from a feed stream containing a mixture of gas A and gas B, by employing a feed mixture including gas C, or a predominant mixture of gas C with another gas (e.g., gas A, gas B, or combinations thereof). For example, a mixture of gas A and gas B, where the desired gas to capture is gas A, can be fed into the adsorption column via a feed. In some embodiments, the desired gas A has a stronger affinity to the adsorbent medium than that of gas B, and as such is separated from the mixture of gas A and gas B by capture of gas A into the adsorbent. Gas B exits the column and is then rejected by venting. After a certain time of feeding the mixture of gas A and gas B into the column, the adsorbent is saturated with the desired gas A, and thus needs to be regenerated to enable further separation of gas A from the mixture of gas A and gas B.

The adsorbent is purged of gas A using another feed stream rich in gas C by exploiting differences in concentrations or partial pressures of gas C and gas A. The change in concentration or partial pressure creates a driving force for storage of gas C in the adsorbent and release of gas A from the adsorbent. This results in a gas mixture of gas A and gas C at the column outlet initially until gas A (stored in the adsorbent) is purged by the feed stream rich in gas C. Gas C now takes the place of gas A in the adsorbent and once most of gas A is removed/replaced from the adsorbent, thereby regenerating the adsorbent, the feed stream containing gas A and gas B is fed into the column again. In some embodiments, depending on the affinity of gas C to the adsorbent, gas C can either replace gas A from the adsorbent (e.g., it has appreciable affinity) or it can remove/purge gas A from the adsorbent (e.g., if it has very low affinity to the adsorbent).

As a result, the desired gas A gets adsorbed into the adsorption column, with predominantly gas B (with some gas C) exiting the column, separating gas A from gas B. After the adsorbent capacity for storage of gas A gets depleted, the feed mixture rich in gas C is again fed and the steps repeat in a cycle. In some embodiments, the cyclic switching of different feeds can happen in two or more steps. This method is effective where there is a need for, or a way to process or monetize the purge gas mixture of gas A and gas C, or if the separation of the purge gas mixture (e.g., gas A and gas C) is technically cheap and cost effective.

In a various embodiments, gas A can be $CO_2$, gas B can be $N_2$, and gas C can be $CH_4$. In this particular embodiment, flue gas (mixture of gas A and gas B) containing approximately 14% $CO_2$ and about 86% $N_2$ is fed into the column containing an adsorbent material, for example zeolite 13X, in the first step. Most of $CO_2$ gets adsorbed into the adsorbent due to its stronger affinity for $CO_2$ compared to $N_2$. The $N_2$ exits through the outlet of the column and is vented out into the atmosphere or other compartment. To regenerate the adsorbent for further processing of the flue gas, the flue gas feed stream is stopped and a feed containing pure $CH_4$, or a $CH_4$-rich feed containing some $CO_2$, is fed into the column to purge the adsorbent of $CO_2$ stored from the previous flue gas feed step. The differences between the composition of $CO_2$ in the flue gas and the $CH_4$-rich feed determines the driving force of the regeneration step, as will be discussed in further detail below. In this particular embodiment, the outlet purge gas containing $CO_2$ and $CH_4$ is useful as feed to a syngas production section and can then be utilized and/or monetized. Once the adsorbent is adequately regenerated by the $CH_4$-rich purge feed, the flue gas is fed to the column again and the cycle repeats.

In some embodiments, the systems and methods of the present disclosure can be used for the utilization of a wide range of natural gas and methane sources with varying methane contents. For example, methane-rich sources can include, but are not limited to, conventional and unconventional natural gas, shale gas with or without contaminants, biogas, landfill gas, coalbed methane, off-gas, refinery gas, fuel gas, other industrial sources containing methane in the ranges of approximately 40-95%, or combinations thereof.

In various embodiments, the systems and methods presented herein can be used for $CO_2$ utilization purposes from various industrial sources of $CO_2$. For example, the industrial sources for $CO_2$ can include, but are not limited to, power plants, refineries, chemical plants, petrochemical plants, cement, compressor stations, petroleum/natural gas processing, agricultural processing, ammonia, asphalt production, manufacturing, aluminum, glass, mining, iron and/or steel, paper and wood products, sugar, utility generation, or combinations thereof.

In further embodiments, the systems and methods disclosed herein can be designed for a wide range of flow rates of various feedstocks and products, as well as for a range of methane compositions and $CO_2$ compositions.

In some embodiments, the systems and methods presented herein can be deployed either as a stand-alone facility, or can be integrated with source plants generating $CO_2$. Various source plants include, but are not limited to, power plants, refineries, chemical plants, petrochemical plants, cement, compressor stations, petroleum/natural gas processing, agricultural processing, ammonia, asphalt production, manufacturing, aluminum, glass, mining, iron and/or steel, paper and wood products, sugar, utility generation, or combinations thereof. As an example, the systems and methods disclosed herein can be integrated with a power plant and a syngas generating facility, as will be discussed in further detail below.

In various embodiments, the systems and methods disclosed herein are able to produce syngas (a predominant mixture of $CO_2$ and $H_2$) for a wide range of $H_2$-to-CO ratios (0.5-3.0 or more). In some embodiments, the systems and methods herein can use one or more adsorbents. In some embodiments the adsorbents can include, but are not limited to, zeolites, metal-organic frameworks (MOFs), activated carbons, molecular sieves, or combinations thereof. In various embodiments, the one or more adsorbent can be utilized for $CO_2$ adsorption. In some embodiments, the systems and methods disclosed herein can include one or more reforming catalysts. In some embodiments, the one or more reforming catalysts can include, but are not limited to, Ni- and Cu-based catalysts. In further embodiments, the one or more reforming catalysts can include transition metal-based catalysts.

In some embodiments, the operating ranges for the adsorbent section is close to atmospheric pressure (1 atm) and ambient temperature (298 K), while the reaction section is around 1200-1230 K and atmospheric pressure (1 atm). In some embodiments, the duration of the feed steps, venting, and reaction steps can range from 10 to 200 s depending on the operation and objectives such as cost or utilization to be optimized. In some embodiments, some of the energy for desorption is obtained from the heat of the mixing of $CO_2$ and $CH_4$.

FIG. 1 illustrates a gas capture and conversion system 100 according to an embodiment of the present disclosure. The gas capture and conversion system 100 includes a first gas feed 102 and a second gas feed 104 fluidly coupled to an adsorption column 106 via valves 101. The adsorption column 106 includes an adsorbent 108. In some embodiments the adsorbent 108 can be, for example, zeolites, metal-organic frameworks (MOFs), activated carbons, molecular sieves, or combinations thereof. In various embodiments, the adsorbent 108 can be utilized for $CO_2$ adsorption. The gas capture and conversion system 100 includes a vent 110 fluidly coupled to the adsorption column 106, and the gas capture and conversion system 100 further includes a reactor 112 fluidly coupled to the adsorption column 106 via the valves 101 ensuing the vent 110. In various embodiments, the valves 101 could be, for example, a gate valve, a ball valve, a solenoid valve, or any other type of valve as dictated by design requirements.

In some embodiments, the first gas feed 102 can include a single gas or a combination of various gasses. For example, the first gas feed 102 can include $CO_2$, $N_2$, CO, $N_2O$, fluorinated gasses, greenhouse gasses, or combinations thereof. In various embodiments, the second gas feed 104 can include a single gas, or a combination of various gasses. In some embodiments, the second gas feed 104 can include methane-rich gasses, such as, for example, natural gas, fuel gas, biogas, landfill gas, or combinations thereof.

The first gas feed 102 can feed the first gas, for example, flue gas ($CO_2$ and $N_2$), into the adsorption column 106. As the first gas is fed into the adsorption column 106 via the first gas feed 102, the adsorbent 108 adsorbs a first component of the first gas (e.g., $CO_2$ from the flue gas) due to the adsorbent 108 having a higher affinity for the first component of the first gas, while a second component of the first gas is released from the gas capture and conversion system 100 via the vent 110.

After a determined period of time, the first gas feed 102 can be shutoff, and the second gas feed 104 can begin feeding the second gas, for example, $CH_4$ into the adsorption column 108. As the second gas is fed into the adsorption column 106, whereby a partial pressure of the second gas is increased whereby the partial pressure of first component of first gas is decreased to thereby cause desorption of the first component from the adsorbent 108 into the adsorption column 106. Subsequently, a mixture of the first component of the first gas and the second gas ($CO_2$ and $CH_4$) can be fed into the reactor 112 to create syngas.

Figure 2:
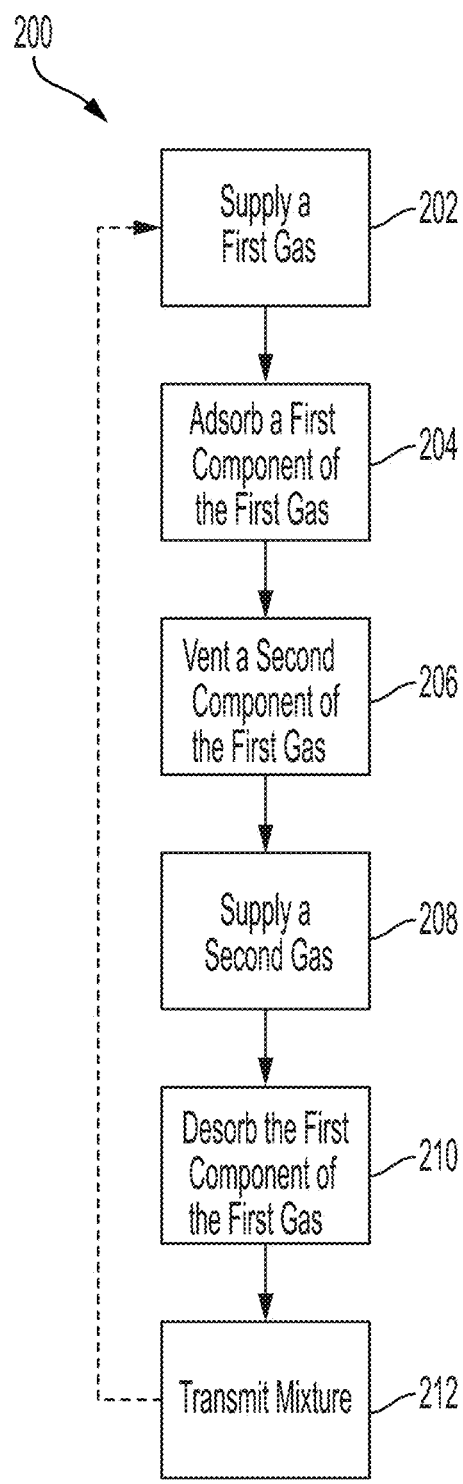
FIG. 2 illustrates a method of capturing and desorbing a gas according to an embodiment of the present disclosure.

FIG. 2 illustrates a method 200 of capturing and desorbing a gas according to an embodiment of the present disclosure. At block 202, a first gas is supplied to an adsorption column, for example, the adsorption column 106 of FIG. 1. In some embodiments, the first gas can be a single homogeneous gas or a combination of various heterogeneous gasses. For example, the first gas can include, without limitation, $CO_2$, $N_2$, CO, $N_2O$, fluorinated gasses, greenhouse gasses, or combinations thereof.

After the first gas is supplied to the adsorption column, the method 200 proceeds to block 204 where an adsorbent, for example, the adsorbent 108 of FIG. 1, adsorbs a first component of the first gas. In some embodiments, the adsorbent can adsorb the first component of the first gas based, at least in part, on an affinity of the adsorbent to the first component of the first gas being higher than an affinity of a second component of the first gas. For example, in some embodiments, an adsorbent can be chosen that has a high affinity towards $CO_2$. In this manner, if the first gas is flue gas ($CO_2$ and $N_2$) the adsorbent will adsorb the $CO_2$ leaving the $N_2$ remaining in the adsorption column. In some embodiments the adsorbent 108 can be, for example, zeolites, metal-organic frameworks (MOFs), activated carbons, molecular sieves, or combinations thereof. In various embodiments, the adsorbent 108 can be utilized for $CO_2$ adsorption.

Subsequently, after the first component of the first gas has been adsorbed into to adsorbent, the method 200 proceeds to block 206 where the second component of the first gas is vented out of the adsorption column via a vent, for example, the vent 110 of FIG. 1. Continuing with the example of flue gas, after the $CO_2$ has been adsorbed by the adsorbent, the $N_2$ remaining in the adsorption column would be vented out of the adsorption column.

After the venting at the block 206, the method 200 proceeds to block 208 where a second gas is supplied into the adsorption column. In some embodiments, the second gas can be a single homogeneous gas or a combination of various heterogeneous gasses. For example, the second gas can be a methane-rich gas, such as, for example, natural gas, fuel gas, biogas, landfill gas, or combinations thereof. Upon supplying the second gas, for example, $CH_4$, into the adsorption column, an increase in partial pressure of the second gas and reduction in partial pressure of the first component of first gas is experienced within the adsorption column. Due to the partial pressure difference caused by the second gas, the method 200 proceeds to block 210 where the first component of the first gas is desorbed from the adsorbent.

As a result of desorption, at the block 210, a mixture of the second gas and the first component of the first gas remain. Continuing with the flue gas example, if the second gas is $CH_4$ the resulting mixture would include $CO_2$ and $CH_4$ which would then be transmitted via a reactor line to a reactor, for example, the reactor 112 of FIG. 1, at block 212. Optionally, the method 200 can end after the transmission at the block 212 or can repeat by proceeding to the block 202 where the first gas is supplied to the adsorption column. In some embodiments, steps indicated by the blocks 202-212, each, or in combination, can be omitted. In some embodiments, one or more makeup feeds can be utilized to feed various gasses into the reactor while the mixture is being fed into the reactor to assist in the reaction creating the final product (e.g., syngas) in the reactor.

In some embodiments, after the transmission at the block 212 the first component of the first gas and the second gas can be utilized in a reaction to synthesize a resultant produce, for example, syngas. In such embodiments, the reactor can include one or more reforming catalysts. In some embodiments, the one or more reforming catalysts can include, but are not limited to, Ni- and Cu-based catalysts. In further embodiments, the one or more reforming catalysts can include transition metal-based catalysts.

It should be appreciated that, although the method 200 is being described with respect to a single step-by-step process, in various embodiments, each step of the method 200 can be repeated, or performed simultaneously. It should further be appreciated that, in various embodiments, each steps of the method 200 each, or in combination, can be omitted, and that, in some embodiments, the method 200 of the present disclosure can begin at any of the blocks 202-212.

WORKING EXAMPLE

Reference will now be made to more specific embodiments of the present disclosure and data that provides support for such embodiments. However, it should be noted that the disclosure below is for illustrative purposes only and is not intended to limit the scope of the claimed subject matter in any way.

In the sections that follow, the present disclosure provides a description of the proposed integrated carbon capture and conversion (ICCC) process and its potentials for utilizing greenhouse gases for both centralized and distributed chemicals manufacturing. Next, the present disclosure describes the high-fidelity process model that is used for process simulation. Through simulations at different conditions, the present disclosure elucidates the complex dynamics and interactions between the capture and conversion sections and the effects of key design variables on the process performance. Next, the present disclosure discusses grey-box constrained optimization framework and presents optimization results for different methane-based feedstocks. The present disclosure next discusses a non-dimensional discretized adsorption model, total installed cost calculation, design of simulations for data-driven optimization, and surrogate models and parameter estimation. Finally, the present disclosure presents concluding remarks in relation to the aforementioned systems and methods of the integrated carbon capture and conversion disclosed in detail herein.

Process Intensification

Figure 3:
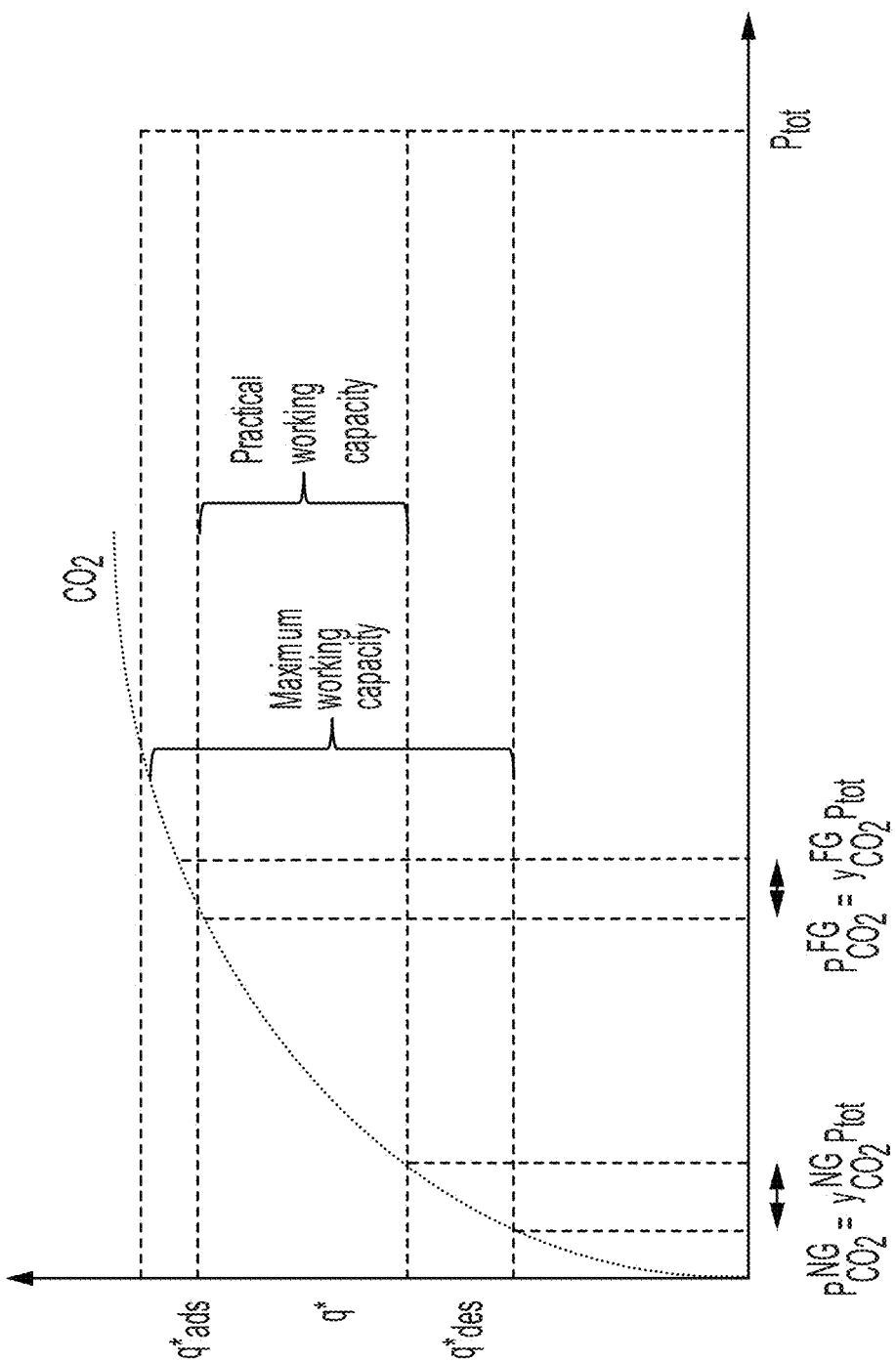
FIG. 3 illustrates a schematic of the concentration driving force for adsorption and desorption of $CO_2$ from multi-component mixture using feed switching. Adsorbent capacity/loadings at equilibrium q* is affected by the partial pressure of $CO_2$ in the multi-component mixture introduced, e.g., flue gas or a methane-rich feed, e.g., natural gas. This leads to the possibility of a working capacity due to differences in equilibrium adsorbent loading of $CO_2$ in different feeds. Practical working capacity obtained will also depend on cycle times, feed step durations, kinetic factors, and nature of isotherms of other gases relative to $CO_2$. The total pressure $P_{tot}$ is kept constant.

In the present disclosure, process intensification is defined as the merging of isolated processes with different core objectives, for example, $CO_2$ capture and syngas production into a process which can achieve integration of both objectives, for example, direct utilization of $CO_2$ from flue gas to syngas, in an attempt to reduce the cost and/or energy consumption. The proposed integrated carbon capture and conversion (ICCC) process uses flue gas as a source of $CO_2$, and natural gas, biogas, landfill gas, fuel gas, or combinations thereof, as a source of $CH_4$. Since the feeds (especially flue gas) contain a significant amount of $N_2$, the process has been designed to achieve four major tasks—(i) preferential adsorption of $CO_2$ over $N_2$ from flue gas using an adsorbent; (ii) $CO_2$ desorption; (iii) mixing of $CO_2$ and methane at a ratio appropriate for dry reforming; and (iv) dry reforming of the $CO_2$/methane mixture to produce syngas over a catalyst. Presented herein is the simultaneous desorption (purging) of $CO_2$ and mixing of $CO_2$ and $CH_4$ through the use of a methane ($CH_4$) rich feed. The introduction of the methane-rich feed into a column saturated with adsorbed $CO_2$ reduces the partial pressure of $CO_2$ in the gaseous phase, thereby creating a concentration driving force for $CO_2$ desorption and a working capacity for adsorption-based $CO_2$ capture. This allows for partially regenerating the process at the same pressure and temperature of $CO_2$ adsorption without consuming energy as in the case of pressure and temperature swing adsorption (PSA and TSA) processes. A schematic of the effect of changing the concentration of $CO_2$ in a multi-component mixture on the equilibrium adsorbent loading and the working capacity is depicted in FIG. 3. A $CH_4$-rich feed is chosen to desorb the $CO_2$ via dilution, as this facilitates the conversion of the desorbed $CO_2$ to syngas using $CH_4$. Hence, the mixing of $CO_2$ and $CH_4$ would not be an issue. The mixing of $CH_4$ with $CO_2$ within the adsorption column also facilitates the feed preparation for subsequent dry reforming. Therefore, the present disclosure has essentially combined the $CO_2$ desorption, or regeneration, step of the capture part with the reactor feed premixing while eliminating the need for any temperature and/or pressure swings.

Process Configuration: The ICCC process illustrated in FIG. 4 implements the intensification concept as discussed above. Specifically, it involves separation of $CO_2$ from flue gas by selective adsorption in a column filled with a microporous adsorbent such as zeolite 13X followed by subsequent desorption of the adsorbed $CO_2$ using a methane ($CH_4$) rich feed. The outlet gas is then sent to the reactor for conversion of $CO_2$ to syngas. This is achieved in two steps run in a cyclic manner. In the first step, flue gas ($N_2$/$CO_2$=86%/14%) is fed to the adsorption column for a time $t_1$ while in the second step, $CH_4$-rich feed is fed to the column for rest of the cycle duration ($t_c$). The high concentration of $CH_4$ in the feed gas of the second step leads to desorption of the $CO_2$ adsorbed in the column. The $CO_2$ desorption is achieved by a change in concentration, rather than a change in pressure (PSA process) or temperature (TSA process) thus reducing the energy costs. The outlet gas from the column contains a mixture of $CO_2$, $N_2$, and $CH_4$. Since the final aim is to convert $CO_2$ to syngas which is usually achieved through reactions using $CH_4$, the outlet gas from the adsorption column can be directly sent to the reactor. The reactor section is filled with a suitable catalyst, where $CO_2$ reforming takes place leading to the formation of syngas. Since $N_2$ does not participate in the reforming reactions, the outlet gas from the adsorption column is vented out between two chosen times to remove $N_2$ without a considerable loss of $CO_2$ and $CH_4$.

The adsorption column outlet gas from the non-venting period of each cycle is mixed and fed to the reactor throughout the duration of the cycle at a constant rate and composition. This makes the overall process continuous without interruptions. In practice, this can be achieved by collecting the outlet gas in a large well-mixed tank and setting the reactor feed withdrawal flow rate appropriately. This also enables the ability to study and optimize the process without dealing with the increased complexities associated with operating the reactor at time-varying feed conditions. Makeup or extra $CO_2$ and $CH_4$ may be added to the reactor feed to ensure flexibility to meet the product specifications at the reactor outlet for a variety of operating conditions and feeds (flue gas, biogas, natural gas, or combinations of same and the like). The process thus demonstrates a potential to leverage the dynamic nature of the adsorption process while integrating it with conventional fixed bed reactor systems for $CO_2$ conversion to syngas.

Figure 5:
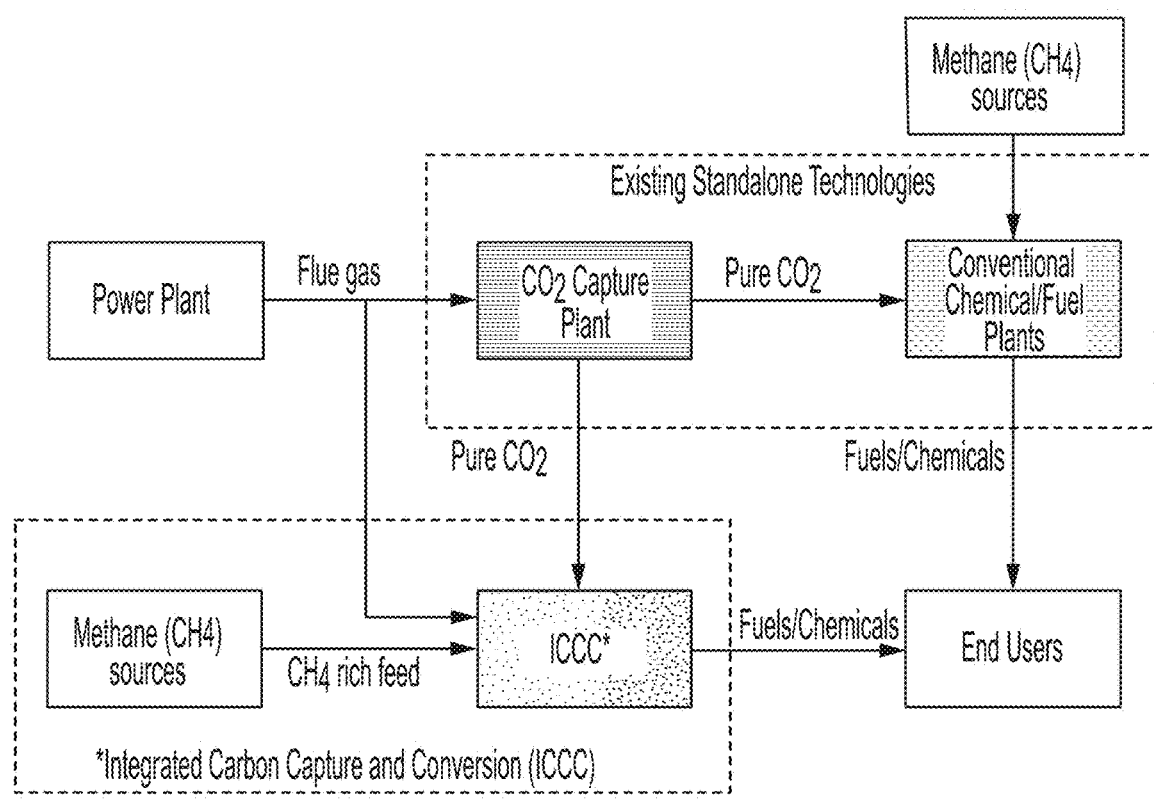
FIG. 5 illustrates an integrated power and chemical production complex employing integrated carbon capture-conversion technology. Integration of the proposed process (integrated carbon capture-conversion) with existing $CO_2$ capture and utilization plants, as shown, can reduce the overall costs of $CO_2$ capture and utilization. The process disclosed herein utilizes both low-cost flue gas and small, stranded and unconventional methane sources to produce syngas, a precursor to many fuels and chemicals.

Scope of Implementation: The present disclosure envisions at least two scenarios for the implementation of the proposed systems and methods. One is a modular implementation for a grass root design for the utilization of small, stranded, unutilized, and unconventional methane. An example of such unconventional methane is the excess fuel gas available in a refinery or a chemical plant. The lack of pressure and temperature changes further adds to the benefit of employing the technology of the present disclosure on a modular level, thereby enhancing its applicability for stranded sources. The other possible implementation is within an integrated power and chemical complex (FIG. 5) that coproduces fuels, power, and chemicals. A part of the flue gas from the power generation section can be "directly" sent to the ICCC plant, while the rest can be processed via a standalone $CO_2$ capture plant. The pure $CO_2$ obtained from the capture plant can then be either used for conversion, sent for external utilization, or sequestration purposes. In this way, a balance can be achieved between emission, utilization, and storage for de-carbonization at reduced overall cost of $CO_2$ avoidance.

Process Modeling

The process is divided into two sections, namely the adsorption and reaction sections, which are modeled as described in detail below.

Modeling Adsorption Section: The dynamics of gas adsorption onto adsorbent inside the adsorption column is described by a 1-dimensional nonlinear algebraic partial differential equation (NAPDE) model in time and space domains. This model includes total and component mass balances, energy balances, pressure drop correlations, a driving force model to calculate the adsorption loadings, and other empirical relations. The major assumptions used in the model are listed as follows: (a) ideal gas behavior; (b) plug flow model with axial dispersion; (c) no gradients in the radial direction; (d) thermal equilibrium between gas and solid phase achieved instantly; (e) linear driving force (LDF) model to describe mass transfer in the adsorbent; (f) mass transfer into the adsorbent is controlled by molecular diffusion in the macropores; (g) the equilibrium loading of gas on the adsorbent at a temperature is described using a multicomponent dual site Langmuir adsorption isotherm; and (h) no reaction occurs in the adsorption section.

Disclosed herein below, the NAPDE model used in the present disclosure will be described in detail. Equation (Eq.) 1, shown below, describes the mass conservation for each species $i \in I_A$ entering and leaving the adsorption section. It accounts for contribution to the accumulation term from convection, axial dispersion, and gas adsorption.

$$\frac{\partial c_i}{\partial t} = -\frac{\partial}{\partial z}\left(-cD_L\frac{\partial y_i}{\partial z} + c_i v\right) - \frac{(1-\varepsilon)}{\varepsilon}\frac{\partial q_i}{\partial t} \quad \forall\, i \in I_A \qquad \text{Eq. 1}$$

where $c_i$ and $y_i$ are the gas phase bulk concentration in mol/m³ and mole fraction respectively, $q_i$ is the adsorbed phase loadings on the solid adsorbent in mol/m³, $D_L$ is the axial dispersion coefficient in m²/s, v is the interstitial velocity in m/s, z is the spatial coordinate in m along the length ($L_a$) of the column, i.e., $0 \le z \le L_a$, and t is the temporal coordinate in seconds.

Applying the ideal gas assumption $$c_i = \frac{y_i P}{RT}$$

and using the chain rule for differentiation, Equation 1 becomes:

$$\frac{\partial y_i}{\partial t} + \frac{y_i}{P}\frac{\partial P}{\partial t} - \frac{y_i}{T}\frac{\partial T}{\partial t} = \frac{T}{P}D_L\frac{\partial}{\partial z}\left(\frac{P}{T}\frac{\partial y_i}{\partial z}\right) - \frac{T}{P}\frac{\partial}{\partial z}\left(\frac{y_i Pv}{T}\right) - \frac{RT}{P}\frac{(1-\varepsilon)}{\varepsilon}\frac{\partial q_i}{\partial t} \quad \forall\, i \in I_A \qquad \text{Eq. 2}$$

Here P is the adsorption column pressure in Pa which is considered to be the same for both the adsorption and reactor sections, T is the temperature inside the column in K, and R is the universal gas constant in J/mol/K.

Summing up the component balance equations for all the components results in the total mass balance equation shown below in Equation 3, since $\Sigma_{i \in I_A} y_i = 1$. The pressure (P) explicitly appears in this formulation.

$$\frac{\partial P}{\partial t} = \frac{P}{T}\frac{\partial T}{\partial t} - T\frac{\partial}{\partial z}\left(\frac{Pv}{T}\right) - RT\frac{(1-\varepsilon)}{\varepsilon}\sum_{i \in I_A}\frac{\partial q_i}{\partial t} \qquad \text{Eq. 3}$$

Only $|I_A|-1$ component balance equations are considered along with the total mass balance equations so that the system of equations is independent.

Equation 4, shown below, describes the conservation of thermal energy of the gas stream entering and exiting the adsorption section. The gas and the adsorbent are assumed to be at the same temperature.

$$(1-\varepsilon)\left(\rho_s C_{p,s} \frac{\partial T}{\partial t} + C_{p,a} \frac{\partial \left(\sum_{i \in I_A} q_i T\right)}{\partial t}\right) + \varepsilon C_{p,g} \frac{\partial (\rho_g T)}{\partial t} = K_z \frac{\partial^2 T}{\partial z^2} + (1-\varepsilon) \sum_{i \in I_A} (-\Delta H_i) \frac{\partial q_i}{\partial t} - \frac{2h_{in}}{r_{in}} (T - T_w) \quad \text{Eq. 4}$$

where ε is the void fraction of the adsorbent column, $\rho_s$ is the density of the adsorbent in kg/m³, $\rho_g$ is the density of the gas in mol/m³, $C_{p,s}$, $C_{p,a}$ and $C_{p,g}$ are the specific heat capacities of the solid adsorbent, the gas in the adsorbed phase, and gaseous phase in J/mol/K, respectively, $K_z$ is the effective axial thermal conductivity of the gas in W/m/K, $\Delta H_i$ is the isoteric heat of adsorption of species i in J/mol, $h_{in}$ is the inside heat transfer coefficient in W/m²/K, $r_{in}$ is the inner radius of the column in m, and $T_w$ is the temperature of the column wall in K. $C_{p,g}$ is calculated by mole fraction average of the individual specific heat capacities of the species and $C_{p,a}$ is equal to $C_{p,g}$.

Substituting $$\rho_g = \frac{P}{RT}$$

using the ideal gas assumption and expanding the terms, Equation 5, shown below, is obtained.

$$\left(\rho_s C_{p,s} + C_{p,a} \sum_{i \in I_A} q_i\right) \frac{\partial T}{\partial t} = \quad \text{Eq. 5}$$

$$-\frac{C_{p,g}\varepsilon}{R(1-\varepsilon)} \frac{\partial P}{\partial t} - C_{p,a} T \sum_i \frac{\partial q_i}{\partial t} + \sum_{i \in I_A} (-\Delta H_i) \frac{\partial q_i}{\partial t} +$$

$$\frac{K_z}{(1-\varepsilon)} \frac{\partial^2 T}{\partial z^2} - \frac{C_{p,g}\varepsilon}{R(1-\varepsilon)} \frac{\partial}{\partial z}(vP) - \frac{2h_{in}}{r_{in}(1-\varepsilon)} (T - T_w)$$

Equation 6, shown below, describes the heat transfer across the column wall and the ambient.

$$\rho_w C_{p,w} \frac{\partial T_w}{\partial \tau} = \quad \text{Eq. 6}$$

$$K_w \frac{\partial^2 T_w}{\partial z^2} + \frac{2 r_{in} h_{in}}{(r_{out}^2 - r_{in}^2)} (T_w - T_a) - \frac{2 r_{out} h_{out}}{(r_{out}^2 - r_{in}^2)} (T_w - T_a)$$

where $\rho_w$, $C_{p,w}$, and $K_w$ are the density in kg/m³, specific heat capacity in J/kg/K, and thermal conductivity of the column wall in W/m/K, respectively, $h_{out}$ is the outside heat transfer coefficient in W/m²/K, $r_{out}$ is the outer radius of the column in m, and $T_a$ is the ambient temperature outside the column in K.

Darcy's law is used to describe the axial pressure drop across the packed bed.

$$v = \frac{-4}{150\mu} r_p^2 \left(\frac{\varepsilon}{1-\varepsilon}\right)^2 \left(\frac{\partial P}{\partial z}\right) \quad \text{Eq. 7}$$

where μ is the viscosity of the gas (fluid) phase in Pa s and $r_p$ is the particle radius of the adsorbent in m.

The kinetics of gas adsorption into the adsorbent is described by a linear driving force relation given in Equation 8, shown below. Mass transfer is assumed to be limited by molecular diffusion in the macropores.

$$\frac{\partial q_i}{\partial t} = k_i (q_i^* - q_i) \; \forall \, i \in I_A \quad \text{Eq. 8}$$

$$k_i = \frac{15 \varepsilon_p D_p c_i}{r_p^2 q_i^*} \; \forall \, i \in I_A \quad \text{Eq. 9}$$

where $k_i$ is a lumped mass transfer rate coefficient in s⁻¹, $\varepsilon_p$ is the particle porosity, $$D_p \left(= \frac{D_m}{\tau'}\right)$$

is the effective macropore diffusivity in m²/s, $D_m$ is the molecular diffusivity in m²/s, and τ' is the tortuosity of the adsorbent.

The equilibrium loading ($q^*_i$) of gas on the adsorbent at given temperature, pressure, and composition is given by a multi-component dual-site Langmuir adsorption isotherm, as follows:

$$q_i^* = \frac{q_{b,i}^s b_i c_i}{1 + \Sigma_{i \in I_A} b_i c_i} + \frac{q_{d,i}^s d_i c_i}{1 + \Sigma_{i \in I_A} d_i c_i} \; \forall \, i \in I_A \quad \text{Eq. 10}$$

where $q_{b,i}^s$ and $q_{d,i}^s$ are the saturation loadings of the species i on the adsorbent in mol/m³, $b_i$ and $d_i$ are parameters in an Arrhenius-type relation for the two sites in m³/mol, which are calculated as follows:

$$b_i = b_i^0 e^{-\Delta U_{b,i}/RT}; \; d_i = d_i^0 e^{-\Delta U_{d,i}/RT} \quad \text{Eq. 11}$$

where $\Delta U_{b,i}$ and $\Delta U_{d,i}$ relates to sites 1 and 2, respectively, in J/mol.

The axial dispersion coefficient is calculated as follows:

$$D_L = 0.7 D_m + v_0 r_p \quad \text{Eq. 12}$$

For the adsorption section, both ends of the column are open resulting in the following Danckwerts boundary conditions. The Danckwerts boundary conditions are used to account for continuity of flux at the inlet for dispersed plug flow system considered.

At z=0 end of the adsorption section/column:

$$D_L \frac{\partial y_i}{\partial z} \bigg|_{z=0} = -v|_{z=0} (y_{i,f} - y_i|_{z=0}) \quad \text{Eq. 13}$$

$$K_z \frac{\partial T}{\partial z} \bigg|_{z=0} = -\varepsilon v|_{z=0} \rho_g C_{p,g} (T_f - T|_{z=0})$$

$$v|_{z=0} = v_f$$

$$T_w|_{z=0} = T_a$$

At z=$L_a$ end of the adsorption section/column:

$$\frac{\partial y_i}{\partial z} \bigg|_{z=L_a} = 0 \quad \text{Eq. 14}$$

-continued $$\left.\frac{\partial T}{\partial z}\right|_{z=L_a} = 0$$

$$P|_{z=L_a} = P_h$$

$$T_w|_{z=L_a} = T_a$$

where $P_h$ is the pressure value set at the outlet end of the adsorption column in Pa, $y_{i,f}$ is the mole fraction of species $i \in I_A$ in the feed, while $T_f$ is the feed inlet temperature in K.

The column is assumed to be initially saturated with pure $N_2$ prior to the introduction of the feeds. The initial conditions of the column at t=0 is given by:

$$q_{N_2}|_{t=0} = q^*_{N_2}, q_{CO_2}|_{t=0} = 0, \text{ and } q_{CH_4}|_{t=0} = 0$$

$$y_{N_2}|_{t=0} = 1, y_{CO_2}|_{t=0} = 0, \text{ and } y_{CH_4}|_{t=0} = 0$$

$$P|_{t=0} = P_h$$

$$T|_{t=0} = T_a$$

$$T_w|_{t=0} = T_a \qquad \text{Eq. 15}$$

Configuration of the Process Cycle: Since the process involves two feed steps repeated in a cyclic manner, variables to denote different instances of time in the cycle, namely, the total cycle time ($t_c$) and the step 1 duration ($t_1$), both in seconds, are defined. $t_{min}$ is the lower bound for the duration of any step while $t_{max}$ is the upper bound for the total cycle duration. The configuration of the cycle, i.e., the chronology and duration of the two feed steps and the bounds on the cycle time are specified in Equations 16-18, shown below.

$$t_{min} \leq t_1 \leq t_c \qquad \text{Eq. 16}$$

$$t_{min} \leq t_c - t_1 \leq t_c \qquad \text{Eq. 17}$$

$$t_{min} \leq t_c \leq t_{max} \qquad \text{Eq. 18}$$

For the venting cycle, $t_{v1}$ as the time in seconds from start of cycle to the time at which venting starts, while $t_{v2}$ is the time (s) at which venting ends is defined. Therefore, the period at which venting is active is between $t_{v1}$-$t_{v2}$. Constraints which describe the times at which venting of the outlet gas from the adsorption is performed are described in Equations 19-21, shown below.

$$0 \leq t_{v1} \leq t_c \qquad \text{Eq. 19}$$

$$0 \leq t_{v2} \leq t_c \qquad \text{Eq. 20}$$

$$t_{min} \leq t_{v2} - t_{v1} \leq t_c \qquad \text{Eq. 21}$$

The gases at the outlet of the adsorption section during the non-venting period (between 0-$t_{v1}$ and $t_{v2}$-$t_c$) is collected, mixed and sent to the reactor section.

Modeling Reaction Section: The outlet gas from the adsorption column pertaining to the non-venting period of each cycle is assumed to be mixed (in a tank) and withdrawn at a constant flow rate as reactor feed. The flow rate is set such that the moles of gas entering the tank from the adsorption column during each cycle are completely withdrawn before the end of that cycle. The withdrawn gas is mixed with appropriate amounts of makeup $CO_2$ and $CH_4$, and then fed to the reactor. The inlet feed flow rate and composition for the reactor are calculated as follows:

$$F_{0,i}^R = \frac{n_i^{NV}}{t_c} + \sum_{j \in J_M} y_{i,j}^{mk} F_j^{mk} \quad \forall i \in I_A \qquad \text{Eq. 22}$$

$$n_i^{NV} = \int_0^{t_{v1}} y_i^{A,out} F_i^{A,out} dt + \int_{t_{v2}}^{t_c} y_i^{A,out} F_i^{A,out} dt \quad \forall i \in I_A \qquad \text{Eq. 23}$$

$$F_i^{A,out} = \frac{\varepsilon A_{c,a} v|_{z=L_a} y_i|_{z=L_a} P|_{z=L_a}}{RT|_{z=L_a}} \quad \forall i \in I_A \qquad \text{Eq. 24}$$

where $F_{0,i}^R$ is the molar feed flow rate of species $i \in I_A$ fed to the reactor section in mol/s, $n_i^{NV}$ is the moles of species i collected during the non-venting period, $F_j^{mk}$ is the molar flow rate of makeup feed $j \in J_M = \{CO_2, CH_4\}$ in mol/s, $y_{i,j}^{mk}$ is the composition of species i in makeup feed $j \in J_M$. Note that $y_i^{A,out}(=y_i|_{z=L_a})$ and $F_i^{A,out}$ are the mole fraction and the corresponding molar flow rate in mol/s of species i, respectively at the outlet of the adsorption column at any given time t, while $A_{c,a}$ is the cross-sectional area of the adsorption column in m². The superscripts "A,out" and "mk" pertain to the adsorber outlet and makeup feeds, respectively.

The reaction considered for conversion of $CO_2$ to syngas uses $CH_4$ and is known as $CO_2$-reforming or dry reforming. While dry reforming may suffer from coke formation, it is not considered in the present disclosure. The reactions involved in dry reforming are as follows:

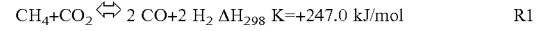

$CH_4 + CO_2 \leftrightarrow 2\ CO + 2\ H_2\ \Delta H_{298}\ K = +247.0\ kJ/mol$     R1

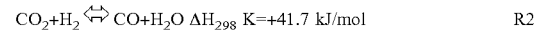

$CO_2 + H_2 \leftrightarrow CO + H_2O\ \Delta H_{298}\ K = +41.7\ kJ/mol$     R2

The $CO_2$-reforming of methane (Reaction R1) is a reversible and highly endothermic reaction and results in an increase in the number of total moles of gases in the column. This is because as per Reaction R1, one mole of $CH_4$ and one mole of $CO_2$ can produce two moles of CO and two moles of $H_2$. Hence, the production of syngas is thermodynamically favored at low pressures and high temperatures. The high endothermicity of the reaction makes this reaction energy intensive. The reverse water gas shift reaction (Reaction R2) is also an endothermic reaction.

The reactor feed thus obtained is heated to the reactor temperature ($T_R$) in the furnace of the reformer. The heat duty required in W is given by:

$$Q_f = \frac{\Sigma_i n_i^{NV}}{t_c} \int_{T^{A,out}}^{T_R} C_{pm} dT + \sum_{j \in J_M} \left( F_j^{mk} \int_{T_f^{mk}}^{T_R} C_{pm,j} dT \right) \qquad \text{Eq. 25}$$

where $T^{A,out}(=T|_{z=L_a})$ is the outlet temperature at the adsorption section in K, $T_f^{mk}$ is the feed temperature of the makeup feeds in K, $C_{pm}$ is the specific heat capacity of the appropriate gas mixture in J/mol/K calculated using Equation 26. The variation of specific heat capacity with temperature is considered as per the Shomate equation as follows:

$$C_{pm} = \sum_{i \in I_m} y_i A_i + \sum_{i \in I_m} y_i B_i \left(\frac{T}{1000}\right) + \sum_{i \in I_m} y_i C_i \left(\frac{T}{1000}\right)^2 + \qquad \text{Eq. 26}$$

$$\sum_{i \in I_m} y_i D_i \left(\frac{T}{1000}\right)^3 + \sum_{i \in I_m} y_i E_i \bigg/ \left(\frac{T}{1000}\right)^2 \quad \forall i \in I_m$$

where $I_m$ is the set of species present in the gas mixture considered. The values of the constants are taken from the National Institute of Standards and Technology.

A pseudo-homogenous model is used for modeling the reactor and its assumptions are listed as follows: (a) ideal gas behavior; (b) steady state operation; (c) isothermal operation; (d) one dimensional plug flow behavior; (e) concentration, temperature, and pressure gradients in radial direction are neglected; (f) axial dispersion is neglected; (g) the thermal and chemical equilibrium between the bulk and the catalyst surface are achieved instantly, i.e., the gas and the catalyst have the same temperature and concentration; and (h) the catalyst effectiveness factor is assumed to be unity.

The component balance for all the species in the reaction mixture is given in Equation 27, shown below. The set of species considered in the reaction section are $I_R=\{CO_2, CH_4, N_2, CO, H_2, H_2O\}$.

$$\frac{dF_i^R}{dz_R} = \rho_b A_{c,r} r_i \quad \forall\, i \in I_R \qquad \text{Eq. 27}$$

where $F_i^R$ is the molar flow rate in mol/s of each species i inside the reactor bed at any $z_R$, $r_i$ is the rate of generation of species i per unit mass of catalyst in mol/kg/s, $\rho_b$ is the reactor bed density in kg/m$^3$, $A_{c,r}$ is the cross-sectional area of the reactor in m$^2$, and $z_R$ is the spatial coordinate along the length ($L_R$) of the reactor bed in meters ($0 \leq z_R \leq L_R$). The inlet flow rates ($F_{0,i}^R$) for $i \in I_A$ are given in Equation 22, shown above, and is set to 0 for $i \notin I_A$.

$$r_i = \sum_k \vartheta_{i,k} R_k \quad \forall\, i \in I_R \qquad \text{Eq. 28}$$

where $\vartheta_{i,k}$ is the stoichiometric coefficient of species i in reaction $R_k$. For example, $\vartheta_{H_2,1}$ is +2 and $\vartheta_{H_2,2}$ is −1 since two moles of H$_2$ are formed in Reaction R1 while one mole of H$_2$ is consumed in Reaction R2. The reaction kinetics and the parameters are taken from Table 1, shown below, and are incorporated in the process model.

$$R_1 = \frac{k_1 K_{CO_2,1} K_{CH_4,1} p_{CO_2} p_{CH_4}}{(1+K_{CO_2,1} p_{CO_2} + K_{CH_4,1} p_{CH_4})^2}\left(1 - \frac{(p_{CO} p_{H_2})^2}{K_{eq,1} p_{CO_2} p_{CH_4}}\right) \qquad \text{Eq. 29}$$

$$R_2 = \frac{k_2 K_{CO_2,2} K_{H_2,2} p_{CO_2} p_{H_2}}{(1+K_{CO_2,2} p_{CO_2} + K_{H_2,2} p_{H_2})^2}\left(1 - \frac{p_{CO} p_{H_2O}}{K_{eq,2} p_{CO_2} p_{H_2}}\right) \qquad \text{Eq. 30}$$

where $p_i$ is the partial pressure of species $i \in I_R$ in bar given by:

$$p_i = \frac{F_i^R}{\sum_{i \in I_R} F_i^R}\frac{P_R}{10^5} \quad \forall\, i \in I_R \qquad \text{Eq. 31}$$

where $P_R$ is the pressure in the reactor bed in Pa.

Table 1, shown below, lists reaction rate coefficients and parameters used in the present disclosure.

TABLE 1

| Parameter | Value |
|---|---|
| $k_1$ [mol/kg cat/s] | $1.29 \times 10^6\ e^{-102065/RT_R}$ |
| $k_2$ [mol/kg cat/s] | $3.5 \times 10^5\ e^{-81030/RT_R}$ |
| $K_{CH_4,1}$ [/atm] | $2.60 \times 10^{-2}\ e^{40684/RT_R}$ |

TABLE 1-continued

| Parameter | Value |
|---|---|
| $K_{CO_2,1}$ [/atm] | $2.61 \times 10^{-2}\ e^{37641/RT_R}$ |
| $K_{CO_2,2}$ [/atm] | $0.5771\ e^{9262/RT_R}$ |
| $K_{H_2,2}$ [/atm] | $1.494\ e^{6025/RT_R}$ |
| $K_{eq,1}$ [atm$^2$] | $6.781 \times 10^{14}\ e^{-259660/RT_R}$ |
| $K_{eq,2}$ | $56.4971\ e^{-36580/RT_R}$ |

The reactor operation is assumed to be isothermal, i.e., the reactor temperature $T_R$ is kept constant. However, heat needs to be supplied to the reactor section to ensure isothermal operation to compensate for the heat consumed by the endothermic reaction. This heat can be provided by appropriate placement of natural gas fired burners along the reactor section. The following equation describes the heat consumed by the reactions taking place in the reactor. Integrating over the length of the reactor bed ($z_R$), gives the cumulative heat duty ($Q_R$) in Watt needed to maintain an isothermal operation.

$$\frac{dQ_R}{dz_R} = \rho_b A_{c,r} \sum_k (-\Delta H_k) R_k \qquad \text{Eq. 32}$$

The Ergun equation is used to describe the pressure drop in the axial direction in packed beds.

$$\frac{dP_R}{dz_R} = -\frac{\rho_f u_s^2 (1-\varepsilon_R)}{d_{p,e}\varepsilon_R^3} f \qquad \text{Eq. 33}$$

$$f = \frac{150}{\text{Re}^*} + 1.75 \qquad \text{Eq. 34}$$

$$\text{Re}^* = \frac{\rho_f u_s d_{p,e}}{\mu_R (1-\varepsilon_R)} \qquad \text{Eq. 35}$$

where $\rho_f$ and $\mu_R$ are the density and viscosity of the fluid (gas) phase in the reactor in kg/m$^3$ and Pa s respectively, $u_s$ is the superficial velocity in m/s, $\varepsilon_R$ is the void fraction of the reactor bed, $f$ is the packed bed friction factor, Re* is the modified Reynolds number for packed beds, $$d_{p,e}\left(=\frac{6V_p}{s_p}\right)$$

is the effective particle diameter in m of the cylindrical catalyst particle with 10 hole rings. The viscosity of the gas is taken to be the mole fraction average of individual species viscosities which are provided in Table 2, shown below.

Table 2, shown below, lists the individual species viscosity values in Pa s used for calculating the overall gas viscosity for the reactor section of the present disclosure.

TABLE 2

| Species | Viscosity [Pa s] |
|---|---|
| CO | 3.62E−05 |
| CO$_2$ | 3.51E−05 |
| CH$_4$ | 2.4E−05 |
| H$_2$O | 3.2E−05 |
| H$_2$ | 1.5E−05 |
| N$_2$ | 3.5E−05 |

Inlet conditions at the $z_R=0$ end are given as:

$$F_i^R|_{z_R=0} = F_{0,i}^R$$

$$P_R|_{z_R=0} = P_h$$

$$Q_R|_{z_R=0} = 0 \quad \text{Eq. 36}$$

Calculating Process Performance Metrics: To evaluate the performance of the ICCC process for a given set of design and operating conditions, several metrics were used. These include the overall (net) $CO_2$ utilization (%), losses or emissions of greenhouse gases ($CO_2$ and $CH_4$), and syngas quality ($H_2$/CO ratio). Various economic costs, which are discussed further below, were also considered.

Overall $CO_2$ Utilization at Cyclic Steady State Condition: The percent overall $CO_2$ utilization (POCU) over each cycle at cyclic steady state condition accounts for the net $CO_2$ utilized by the process via various feeds while discounting unreacted $CO_2$, the lost $CO_2$ which is vented and the auxiliary $CO_2$ produced by using heating utilities and electrical power.

$$POCU = \frac{CO_{2,util}}{CO_{2,fed}} \times 100 \quad \text{% Overall } CO_2 \text{ utilization over one cycle,} \quad \text{Eq. 37}$$

$$\text{where, } CO_{2,fed} = \int_0^{t_c} F_{CO_2}^{A,in} dt + t_c \Sigma_{j \in J_M} y_{CO_2,j}^{mk} F_j^{mk} \quad \text{Eq. 38}$$

$$CO_{2,util} = \quad \text{Eq. 39}$$

$$CO_{2,fed} - \int_{t_{v1}}^{t_{v2}} F_{CO_2}^{A,out} dt - F_{CO_2}^R|_{z_R=L_R} t_c - \varphi_h Q_{HU} t_c - \varphi_e E_u$$

$$F_i^{A,in} = \frac{\varepsilon A_{c,a} v|_{z=0} \, y_i|_{z=0} \, P|_{z=0}}{RT|_{z=0}} \quad \forall i \in I_A \quad \text{Eq. 40}$$

where $F_{CO_2}^{A,in}$ is the molar flow rate in mol/s of $CO_2$ entering the adsorption column through either of the feeds, $Q_{HU}$ is the total heating duty requirement in Watt of the process during each cycle, and $E_u$ is "unclean" electricity in kWh contributing to auxiliary $CO_2$ emissions. If the total electricity requirement ($E_t$) of the process during a cycle is lesser than the clean electricity available, then the auxiliary $CO_2$ emission factor $\varphi_e$ is set to be zero. However, if the electricity requirement is greater than the clean electricity available, then the unclean electricity $E_u$ will contribute to auxiliary $CO_2$ emissions and an appropriate value for the auxiliary emission factor $\varphi_e$ (e.g., 0.939 ton $CO_2$ per MWh, if the electricity comes from a coal-fired power plant, as listed in Table 3, shown below) is used.

Table 3, show below, lists raw material pricing and auxiliary $CO_2$ emission parameters. These are converted to appropriate units for use with the model equations of the present disclosure.

TABLE 3

| Description | Value |
| --- | --- |
| Dehydrated Flue gas price ($CO_2/N_2$: 14/86%) ($/ton) | 1.87 |
| Natural Gas price ($CH_4/N_2$: 95/5%) ($/MMBTU) (October 2016) | 2.98 |
| Pure $CO_2$ price ($/ton) | 38.5 |
| Methane price ($/MMBTU) | 2.98 |
| Electricity price ($/kWh) | 0.07 |
| Cooling water ($/ton) | 1 |
| $\varphi_{NG}$ (lb. $CO_2$/MMBTU NG burnt) | 117 |

TABLE 3-continued

| Description | Value |
| --- | --- |
| $\varphi_e$ (ton $CO_2$/MWh from coal fired plant) | 0.939 |
| Compressor efficiency | 0.75 |
| Furnace efficiency | 0.8 |

The heating requirement ($Q_{HU}$) is provided by burning natural gas and includes both the reactor feed heating duty ($Q_f$) and the heat duty ($Q_R$) necessary to maintain an isothermal operation of the reactor. Therefore, $Q_{HU}=(Q_f+Q_R)/\eta_h$ where $\eta_h$ is the efficiency of the natural gas-fired furnace. The auxiliary $CO_2$ emissions by natural gas burnt for heating is calculated by applying the appropriate emission factor $\varphi_h$, i.e., $\varphi_{NG}$. The auxiliary $CO_2$ emission parameters are obtained from the U.S. Energy Information Administration and are listed in Table 3, shown above.

The present disclosure assumes that the $CH_4$-rich feeds and the makeup feeds are available at the required pressure of the process. A feed compressor is, however, necessary to compress the flue gas which is usually available at around 1 atm. Electricity is required by the process to run the feed compressor. All electricity is assumed to be sourced from a coal-fired power plant without carbon capture. Use of such electricity results in auxiliary $CO_2$ emissions. However, since the process utilizes $CO_2$, the present disclosure considers that the amount of electricity corresponding to the $CO_2$ processed by the systems and methods, presented herein, from flue gas and the $CH_4$-rich feed as clean electricity, that is, for example, free from auxiliary emissions and discount it from the total auxiliary $CO_2$ emitted due to electricity usage.

The total power consumed in kW by the feed compressor is given by:

$$W_{com} = \frac{0.001}{\eta_m \eta_c} F_{FG} \cdot R \cdot T_f \left(\frac{\gamma}{\gamma-1}\right)\left(\left(\frac{P_h}{P_0}\right)^{\frac{\gamma-1}{\gamma}} - 1\right) \quad \text{Eq. 41}$$

where $\eta_m$ is the electric motor efficiency which is taken as 0.95, $\eta_c$ is the compressor efficiency which is taken as 0.75, $F_{FG}$ is the inlet flow rate of flue gas in mol/s, $T_f$ is the temperature of flue gas in and is taken to be 298.15 K, and $\gamma$ for flue gas is taken to be 1.4. $F_{FG}$ is calculated as follows:

$$F_{FG} = \frac{\varepsilon A_{c,a} v_f P_h}{RT_f} \quad \text{Eq. 42}$$

As the feed compressor is used only during the flue gas step, the total electricity requirement $E_t$ in kWh can be calculated as follows:

$$E_t = W_{com} t_1 / 3600 \quad \text{Eq. 43}$$

Since the use of a compressor results in temperature increase which is calculated as follows, a cooler is required which results in cooling utility costs. $T_{o,com}$ is the temperature of gas at the outlet of the compressor in K.

$$T_{o,com} = T_{i,com} + \frac{T_{i,com}}{\eta_c}\left(\left(\frac{P_h}{P_0}\right)^{\frac{\gamma-1}{\gamma}} - 1\right) \quad \text{Eq. 44}$$

The cooling duty ($Q_C$) in kW required to cool the compressed flue gas back to the inlet temperature $T_f$ for the adsorption section is given below:

$$Q_C = F_{FG} \int_{T_{o,com}}^{T_f} C_{pm,FG} dT \qquad \text{Eq. 45}$$

The mass of cooling water in kg required in one cycle ($M_{CW}$) is given by the following equation assuming a $\Delta T=10$ K change in temperature of cooling water. The specific heat capacity of water ($C_{p,CW}$) is taken to be 4200 J/kg/K.

$$M_{CW} = t_1 |Q_C|/(C_{p,CW}\Delta T) \qquad \text{Eq. 46}$$

The electricity needed for the cooling water system used is around 2 kWh per 1000 gal (0.528 kW per ton of cooling water). This is deducted from the clean electricity available from processing flue gas and the resulting "unclean" electricity ($E_u$) is given by the following equation:

$$E_u = E_t - \frac{MW_{CO_2} \int_0^{t_c} F_{CO_2}^{A,in} dt}{\varphi_e} - 2\frac{0.528 M_{CW}}{1000} \qquad \text{Eq. 47}$$

where $MW_{CO_2}$ is taken as $44.01 \times 10^{-3}$ kg/mol.

$CO_2$ and $CH_4$ Losses: Let $loss_i^t$ denote the fractional loss of a greenhouse gas $i \in \{CO_2, CH_4\}$ from the process either via the vent or as unreacted component in the product syngas. $loss_i^t$ is calculated using the following expressions:

$$loss_i^t = loss_i^V + loss_i^P \quad i \in \{CO_2, CH_4\} \text{ where} \qquad \text{Eq. 48}$$

$$loss_{CO_2}^V = \frac{\int_{t_{v1}}^{t_{v2}} F_{CO_2}^{A,out} dt}{CO_{2,fed}} \text{ and } loss_{CH_4}^V = \frac{\int_{t_{v1}}^{t_{v2}} F_{CH_4}^{A,out} dt}{CH_{2,fed}} \qquad \text{Eq. 49}$$

$$loss_{CO_2}^P = \frac{t_c F_{CO_2}^R |_{z_R=L_R}}{CO_{2,in}} \text{ and } loss_{CH_4}^P = \frac{t_c F_{CH_4}^R |_{z_R=L_R}}{CH_{4,fed}} \qquad \text{Eq. 50}$$

Syngas Quality Specifications: Though the $CO_2$ reforming Reaction R1 produces a 1:1 ratio of $H_2$ and CO, the extent of progress of the reverse water gas shift Reaction R2 which consumes $H_2$ to produce CO can affect the overall $H_2$/CO ratio in the product ($y_{H_2}^P/y_{CO}^P$). Product compositions, especially $y_{CH_4}^P$, $y_{CO_2}^P$, $y_{N_2}^P$, are key metrics since they should be within certain limits to ensure the quality of syngas. The product composition for a species $y_i^P$ is calculated as follows:

$$y_i^P = \frac{F_i^R |_{z_R=L_R}}{\sum_{i \in I_R} F_i^R |_{z_R=L_R}} \quad \forall i \in I_R \qquad \text{Eq. 51}$$

Economic Assessment: Various economic costs, discussed in detail herein below, were also considered.

Operating Cost per kg of Syngas Produced: The operating costs involves cost of raw materials ($C_{RM}$), the cost of heating utilities ($C_{HU}$), cooling utilities ($C_{CU}$), and electricity ($C_E$) required by this process.

Cost of raw materials used over one cycle is calculated using the following expressions:

$$C_{RM} = C_{FG}F_{FG}t_1 + \int_0^{t_c} \frac{C_{MF} F_{CH_4}^{A,in}}{y_{CH_4,MF}} dt + \sum_{j \in J_M} C_j F_j^{mk} t_c \qquad \text{Eq. 52}$$

The raw material cost parameters, such as $c_{FG}$, $c_{FG}$, are obtained from various sources, and are listed above in Table 3. The cost of the electricity ($C_E$) required by the process is given by $c_e E_t$ where $c_e$ is the unit cost of electricity and $E_t$ is the electricity requirement of the process. Cost of cooling utility ($C_{CU}$) required is given by $c_{CW}M_{CW}$ where $c_{CW}$ is the cooling water price and $M_{CW}$ is the amount of cooling water needed per cycle. Similarly, the cost of heating utilities ($C_{HU}$) is calculated by $c_{NG}Q_{HU}$ where $c_{NG}$ is the price of natural gas.

The syngas produced is the sum of the moles of CO and $H_2$ in product. The operating cost per ton of syngas (OC) produced is given by the following equation, where $MW_{SG}$ is the molecular weight of the product syngas in kg/mol.

$$OC = \frac{1000 \, (C_{RM} + C_{HU} + C_{CU} + C_E)}{MW_{SG} t_c (F_{CO}^R |_{z_R=L_R} + F_{H_2}^R |_{z_R=L_R})} \qquad \text{Eq. 53}$$

Total Production Cost per kg of Syngas: To calculate the overall production cost of syngas from the process, both investment and operating costs are taken into account. These costs are annualized and then converted to cost per ton of syngas produced to evaluate whether the price is competitive. The breakdown of the different costs involved is taken from previous literature and is discussed in further detail below.

The total cost of syngas produced (TC) in $/ton syngas is given by:

$$TC = \frac{AIC}{P_{SG}} + OC \qquad \text{Eq. 54}$$

where AIC and OC are the annualized investment cost in $/year and operating cost in $/ton syngas produced, respectively, and $P_{SG}$ is the ton of syngas produced in a year. Total operating time in a year is assumed to be 8000 hours.

AIC is related to the total plant cost (TPC) and annual maintenance cost (AMC) as shown below.

$$AIC = \emptyset TPC + AMT \qquad \text{Eq. 55}$$

where $\emptyset$ is the capital recovery factor which is set to be 0.154 in the present disclosure. Annual maintenance cost (AMC) is assumed to be about 5% of TPC. The total plant cost (TPC) can be further broken down into total installed cost (TIC), indirect cost (IDC), and balance of plant cost (BPC).

$$TPC = TIC + IDC + BPC \qquad \text{Eq. 56}$$

The indirect cost (IDC) and balance of plant cost (BPC) are assumed to be 32% and 20% of TIC.

$$TPC = TIC + 0.32TIC + 0.2TIC = 1.52TIC \qquad \text{Eq. 57}$$

The details of the total installed cost (TIC) calculation are provided in further detail below.

Process Simulation

To obtain the process metrics, the overall process model described above is solved. The model for the adsorption section comprises non-linear algebraic partial differential equations (NAPDE). The partial differential equations (PDE) are spatially discretized into a set of coupled ordinary differential equations (ODEs) by implementing an upwind differencing scheme. The resultant discretized form of the equations is discussed in further detail below. Although the accuracy of the model increases with increase in the number of spatial discretizations (N), it also increases the size of the discretized model leading to longer computation times. The set of ODEs along with the initial conditions constitute an ODE initial value problem (ODE-IVP). Based on the solution, the concentration and temperature profiles along the adsorption column are obtained for the first step, i.e., flue gas feed. For the second step of the cycle, when the feed is changed to a $CH_4$-rich feed, the final condition of the column at the end of the first step becomes the initial condition for the second step. The simulations are run for multiple such cycles of steps, until the concentration and temperature profiles do not show significant change with further increase in the number of cycles, i.e., a cyclic steady state (CSS) is reached.

On the basis of the solution obtained at CSS, the inlet conditions for the reactor section are calculated. The reactor model equations which constitute another ODE-IVP problem is then solved. The process and product metrics are then calculated for the overall process.

Figure 6:
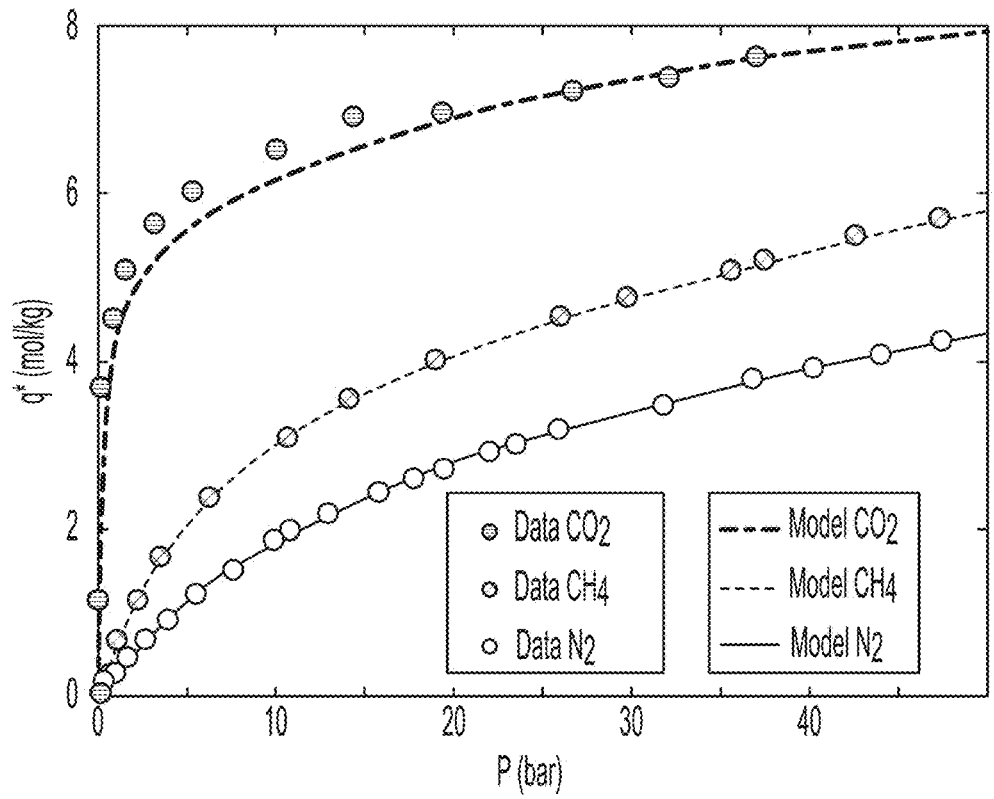
FIG. 6 illustrates dual site Langmuir adsorption isotherm model predictions of gas loading on the adsorbent at 298 K for zeolite 13X. The parameters are obtained by performing a least-square fit on the experimental data obtained from previous literature.

To study the effect of simulation parameters, such as the number of spatial discretization (N) and the number of cycles (C) to reach CSS, several simulations at fixed conditions were performed and are given in Table 4, shown below. The relevant parameters are tabulated in Table 5, shown below. Zeolite 13X is used as an adsorbent, the adsorption isotherm parameters for which are obtained by fitting a pure component dual-site Langmuir isotherm to the experimental data provided in pervious literature. These parameters are listed in Table 6, shown below, while the fitted isotherm model is shown in FIG. 6.

Table 4, shown below, lists simulation parameters and operating conditions for the reference case simulations used in the present disclosure.

TABLE 4

|  | Value |
|---|---|
| Adsorption section conditions |  |
| Pressure $P_h$ [bar] | 5 |
| Column inner radius $r_{in}$ [m] | 0.1445 |
| Adsorption Column Length $L_a$ [m] | 1.5 |
| Feed Temperature $T_f$ [K] | 298.15 |

TABLE 4-continued

|  | Value |
|---|---|
| Interstitial feed velocity $v_f$ [m/s] | 1 |
| Ambient Temperature $T_a$ [K] | 298.15 |
| Step 1 duration $t_1$ [s] | 100 |
| Total Cycle time $t_c$ [s] | 200 |
| Venting start time $t_{v1}$ [s] | 25 |
| Venting end time $t_{v2}$ [s] | 125 |
| Number of spatial discretizations N | 30 |
| No of cycles run C | 100 |
| Reaction section conditions |  |
| Makeup $CO_2$ $F_{CO2}^{mk}$ [mol/s] | 2.5 |
| Makeup $CH_4$ $F_{CO2}^{mk}$ [mol/s] | 2.5 |
| Makeup Feed Temperature $T_f^{mk}$ [K] | 298.15 |
| Reactor Temperature $T_R$ [K] | 1000 |
| Reactor Length $L_R$ [m] | 5 |
| Superficial velocity in reactor $v_f$ [m/s] | 1 |

Table 5, shown below, lists values of constants and parameters used in the model of the present disclosure.

TABLE 5

|  | Value |
|---|---|
| Constants |  |
| Universal gas constant R [J/mol/K] | 8.314 |
| Adsorption section model parameters |  |
| Specific heat capacity of adsorbent $C_{p,s}$ [J/kg/K] | 1070 |
| Specific heat capacity of column wall $C_{p,w}$ [J/kg/K] | 502 |
| Specific heat capacity of $CO_2$ [J/mol/K] | 37.14 |
| Specific heat capacity of $N_2$ [J/mol/K] | 29.13 |
| Specific heat capacity of $CH_4$ [J/mol/K] | 35.61 |
| Adsorbent density $\rho_s$ [kg/m$^3$] | 1130 |
| Adsorption column wall density $\rho_w$ [kg/m$^3$] | 7800 |
| Inside heat transfer coefficient $h_{in}$ [J/m$^2$/K/s] | 8.6 |
| Outside heat transfer coefficient $h_{in}$ [J/m$^2$/K/s] | 2.5 |
| Viscosity of gas in adsorption column μ [kg/m/s] | 1.72E−05 |
| Molecular diffusivity $D_m$ [m$^2$/s] | 1.6E−05 |
| Thermal conductivity of column wall $K_w$ [J/m/K/s] | 16 |
| Effective gas thermal conductivity $K_z$ [J/m/K/s] | 0.09 |
| Adsorbent column void fraction ε | 0.37 |
| Adsorbent particle porosity $\varepsilon_p$ | 0.54 |
| Adsorbent particle radius $r_p$ [m] | 1.6E−03 |
| Adsorbent tortuosity τ' | 3 |
| Reactor section model parameters |  |
| Reactor bed density $\rho_b$ [kg/m$^3$] | 900 |
| Catalyst particle diameter $d_p$ [m] | 0.019 |
| Catalyst particle length $d_l$ [m] | 0.016 |
| Number of hole rings in the catalyst particle $n_h$ | 10 |
| Diameter of the hole rings $r_h$ [m] | 0.0023 |
| Void fraction of reactor bed $\varepsilon_R$ | 0.4 |

Table 6, shown below, shows dual-site Langmuir isotherm parameters fitted to experimental data from literature.

TABLE 6

| Parameter | Value | Parameter | Value | Parameter | Value |
|---|---|---|---|---|---|
| $b_{CO2}^0$ [m$^3$/mol] | 1E−09 | $b_{N2}^0$ [m$^3$/mol] | 4.32E−06 | $b_{CH4}^0$ [m$^3$/mol] | 6.29E−06 |
| $d_{CO2}^0$ [m$^3$/mol] | 2.63E−07 | $d_{N2}^0$ [m$^3$/mol] | 2.65E−06 | $d_{CH4}^0$ [m$^3$/mol] | 1.84E−06 |
| $q_{b,CO2}^s$ [mol/m$^3$] | 4997.764 | $q_{b,N2}^s$ [mol/m$^3$] | 10557.477 | $q_{b,CH4}^s$ [mol/m$^3$] | 4616.276 |
| $q_{b,CO2}^s$ [mol/m$^3$] | 5800.516 | $q_{d,N2}^s$ [mol/m$^3$] | 3674.76 | $q_{d,CH4}^s$ [mol/m$^3$] | 16950.00 |
| $\Delta U_{b,CO2}$ [J /mol] | −33917.46 | $\Delta U_{b,N2}$ [J/mol] | −8089.09 | $\Delta U_{b,CH4}$ [J/mol] | −15922.30 |
| $\Delta U_{d,CO2}$ [J /mol] | −31731.06 | $\Delta U_{d,N2}$ [J/mol] | −16361.22 | $\Delta U_{d,CH4}$ [J/mol] | −9465.77 |

Figure 7:
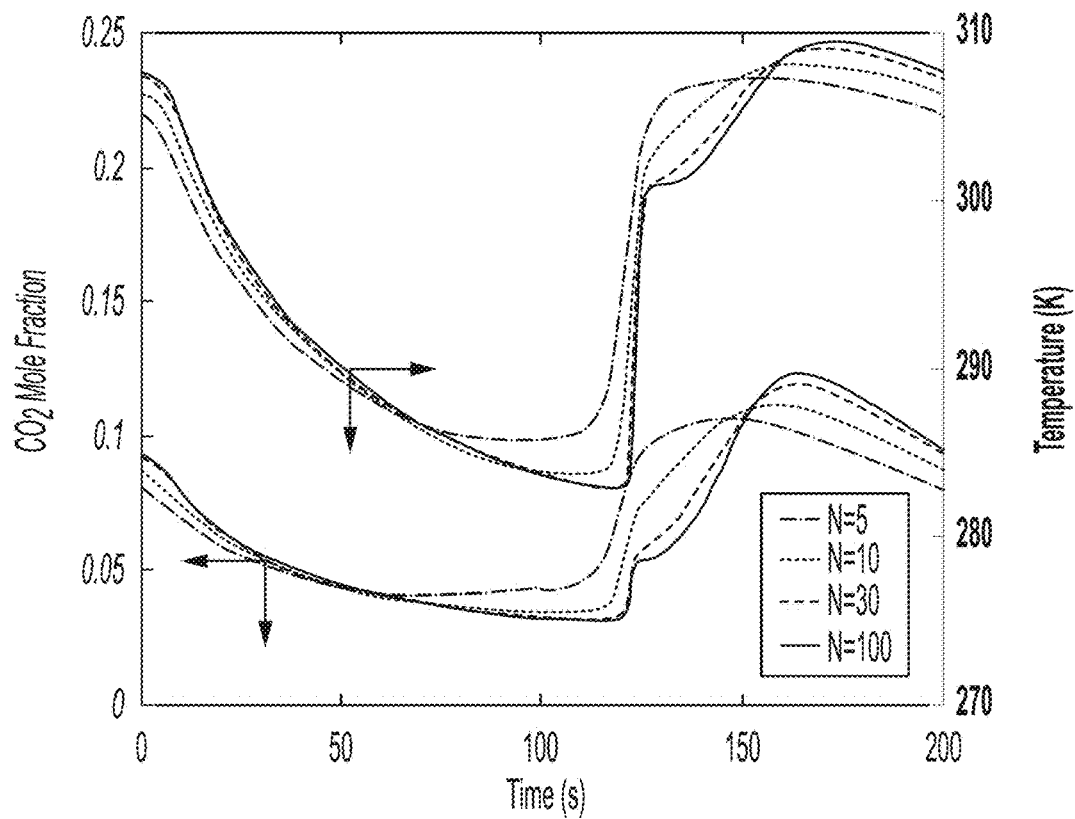
FIG. 7 illustrates temperature and $CO_2$ mole fraction profiles at the outlet of the adsorption column verses number of spatial discretizations.

It is observed that the steepness of $CO_2$ composition and temperature profiles increases with increase in N due to greater accuracy of the model at higher discretizations (FIG. 7). The computation time needed for performing the simulation also increases with higher value of N.

Figure 8:
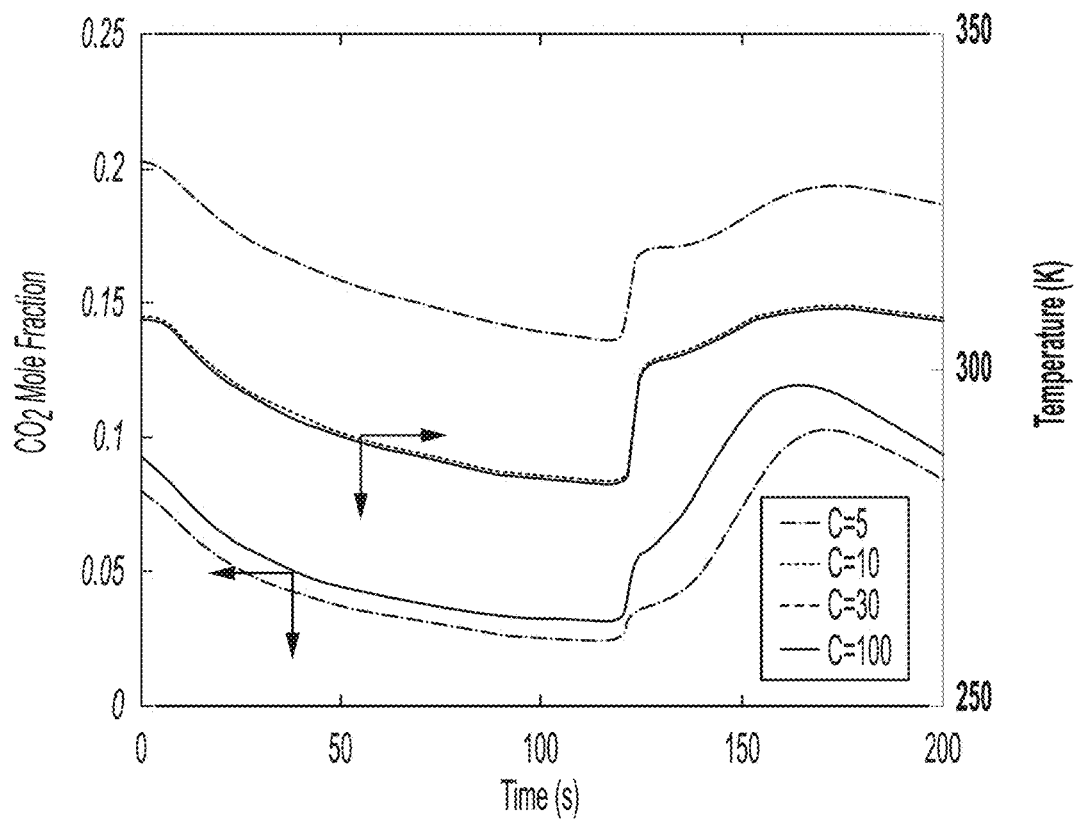
FIG. 8 illustrates temperature and $CO_2$ mole fraction profiles at the outlet of the adsorption column versus the number of cycles for the reference case. Cyclic steady state is attained after 10 cycles (C) for this case, as seen from the coincident profiles.

FIG. 8 shows the effect of the number of cycles (C) on the composition and temperature profiles with time obtained at the outlet of the adsorption column. Based on the profiles, there may be a need to simulate at least a few cycles (C>10) before the process reaches cyclic steady state (CSS).

Simulation Results and Discussion: The entire chemical process, as shown in FIG. 4, is simulated using N=100 and C=30 for a reference case where the design variables are fixed to certain values listed in Table 4, shown above. The results for the reference case simulation of the cyclic process after 30 cycles are provided in Table 7, shown below. The loss percentages $CH_4$ and $CO_2$ are 62.6% and 24.3%, respectively. These are significant at this reference case leading to an overall $CO_2$ utilization of 75.6%. The total loss includes both the losses through the vent and the presence in the product syngas. Reducing the loss of $CO_2$ will also lead to the overall increase in $CO_2$ utilization.

Table 7, shown below, illustrates process performance metrics for the reference case simulation calculated for the 30th cycle.

TABLE 7

| Process Metric | Value | Process Metric | Value |
| --- | --- | --- | --- |
| % $CO_2$ Utilization | 75.63 | Unreacted % $CO_2$ | 21.16 |
| Total Cost ($/ton SG) | 218.06 | Syngas ratio ($H_2$/CO) | 0.83 |
| Operating Cost ($/ton SG) | 175.33 | $CH_4$ % in product | 0.25 |
| Total loss % $CH_4$ | 62.62 | $CO_2$ % in product | 0.05 |
| Total loss % $CO_2$ | 24.29 | $N_2$ % in product | 0.03 |
| Vent loss % $CH_4$ | 4.26 | $H_2$ % in product | 0.29 |
| Vent loss % $CO_2$ | 3.14 | CO % in product | 0.35 |
| Unreacted % $CH_4$ | 58.36 | $H_2O$ % in product | 0.03 |

Figure 9:
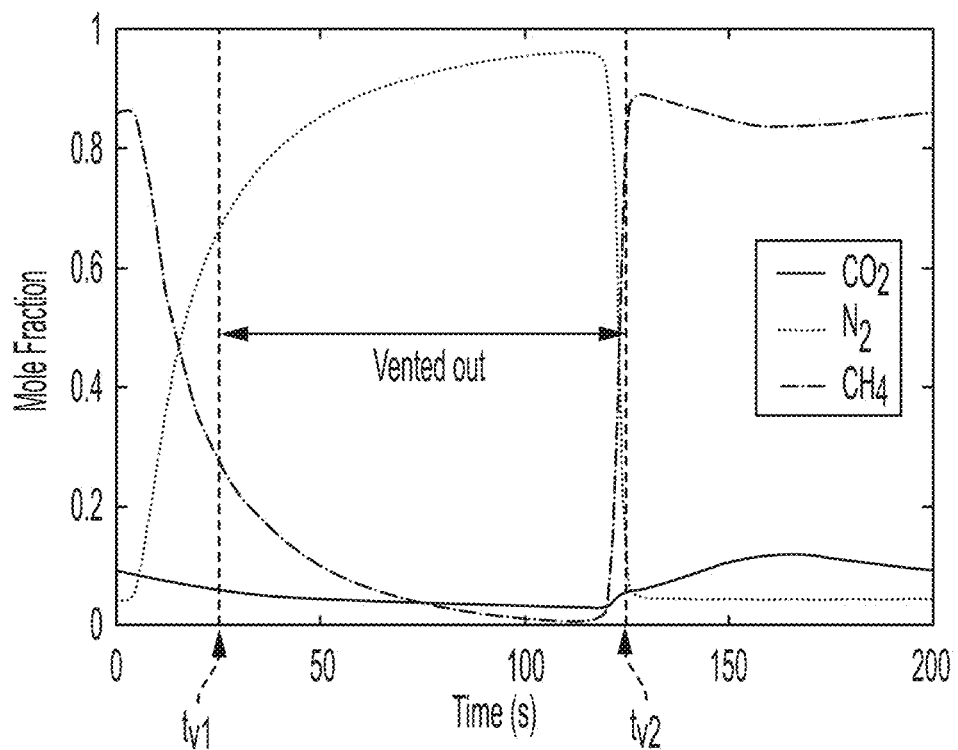
FIG. 9 illustrates $CO_2$ mole fraction versus time obtained at the outlet of the adsorption column for the reference case for the 30th cycle. Flue gas feed step ($t_1$) of 100 s is followed by natural gas feed step of 100 s for a total cycle time ($t_c$) of 200 s. Venting start time ($t_{v1}$) considered is 25 s and venting end time ($t_{v2}$) is 125 s.

To better understand the reasons behind the high losses at the reference case, the gas compositions both at the adsorption column and reactor outlets were examined. The composition profiles at the outlet of the adsorption section for the reference case are shown in FIG. 9. It is evident from the profiles that the outlet compositions show variation over the duration of a cycle. This is expected since the type of feed sent to the adsorption column is switched from flue gas to a $CH_4$-rich feed at each cycle. Two distinct periods are observed, an $N_2$-rich period and a $CH_4$-rich period, which correspond to the flue gas feed step and $CH_4$-rich feed step, respectively.

Figure 10:
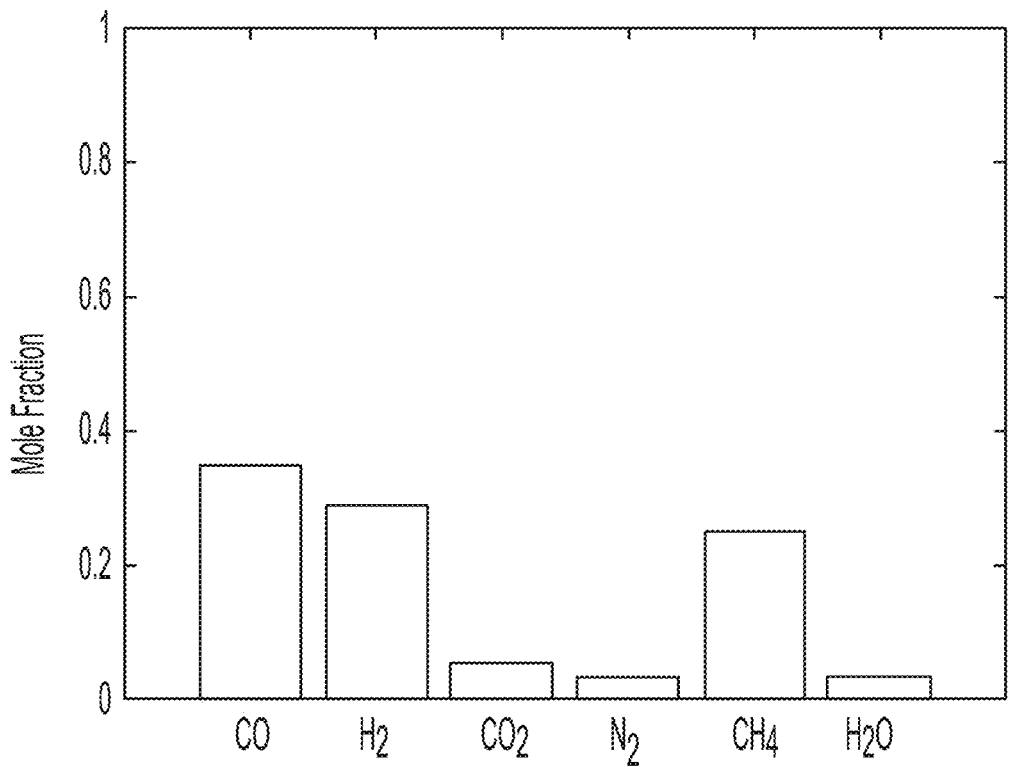
FIG. 10 illustrates compositions of different species in syngas (product) obtained at the reactor outlet for the reference case. The outlet gas from the adsorption column during the non-venting period (0-25 s) and (125-200 s) of the 30th cycle is mixed with makeup $CO_2$ ($F_{CO_2}^{mk}$=2.5 mol/s) and makeup $CH_4$ ($F_{CH_4}^{mk}$=2.5 mol/s) and is fed to the reactor. Reactor temperature ($T_R$) considered is 1000 K and reactor bed length ($L_R$) is 5 m. $CO_2$ (dry) reforming of $CH_4$ takes place in the reactor.

The outlet (product) compositions after the reaction section are shown in FIG. 10. It shows high compositions of $CH_4$ and $CO_2$ in the product. This is because complete conversions of $CO_2$ and $CH_4$ have not been achieved in the reactor at the reference condition.

A preliminary sensitivity analysis around the reference case is first performed by varying a chosen variable within ±30% of the reference case value while other variables are kept constant to understand the effect of each variable. The feed velocity and the temperature of the adsorption column are held constant, while the column pressure, length, feed step durations, and the venting times are varied. The reactor temperature and the reactor length are also varied. The reactor inlet flow rate is indirectly varied since it is influenced by the venting times and the makeup flow rates. The superficial velocity in the reactor is fixed at 1 m/s while the radius of the reactor is varied as a design decision based on the total flow rate entering the reactor. In the present disclosure, the decisions on final reactor diameter or the number of tubes can be taken once the flow rate at optimal conditions is determined. During the sensitivity analysis, both the flue gas and the natural gas feed to the adsorption column are set to the same pressure and temperature. The adsorption column and the reactor pressures are also kept to be equal.

Figures 11A, 11B:
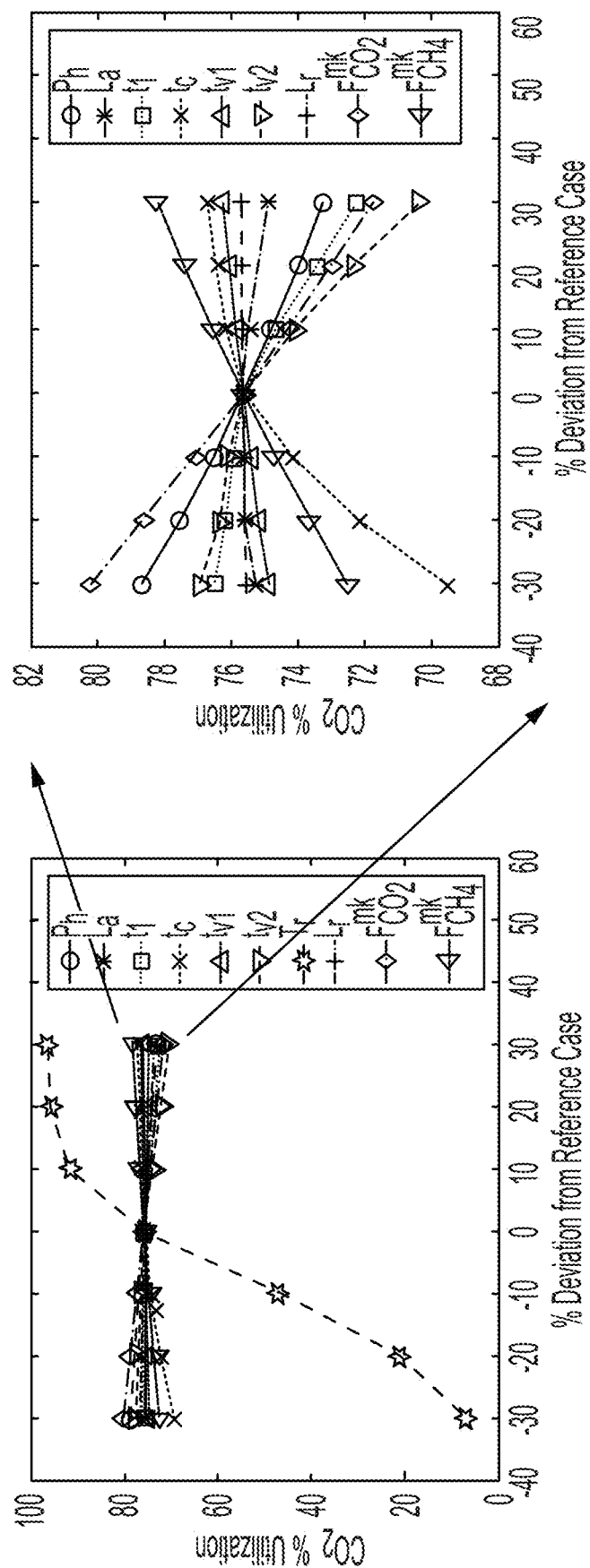
FIG. 11a illustrates a sensitivity analysis of overall $CO_2$ utilization performed for 10%, 20%, and 30% above and below the values of the decision variables in the reference case, namely pressure ($P_h$), adsorption column length ($L_a$), feed step 1 duration ($t_1$), total cycle time ($t_c$), venting start time ($t_{v1}$), venting end time ($t_{v2}$), reactor temperature ($T_R$), reactor bed length ($L_R$), makeup $CO_2$ ($F_{CO_2}^{mk}$), and makeup $CH_4$ ($F_{CH_4}^{mk}$).
FIG. 11b illustrates a zoomed-in view of the effect of variables other than reactor temperature on % $CO_2$ utilization wherein the % $CO_2$ utilization is calculated over a representative cycle.

The effects of design variables (e.g., pressure, adsorption column length, duration of step 1 and step 2, total cycle duration, venting start and end times, reactor temperature, reactor length, makeup $CO_2$ flow rate, and the makeup $CH_4$ flow rate) on the process performance metrics such as the overall $CO_2$ utilization, total cost, and the loss percentages are shown in FIG. 11-FIG. 13. These values are obtained by varying the variables within ±30% around the reference case (Table 4) while keeping the other variables constant. As shown in FIG. 11, significant $CO_2$ utilization (approximately 97%) can be achieved by changing the process conditions from the reference case. It is observed that the reactor temperature ($T_R$) has an effect on the process metrics (FIG. 11). At low $T_R$, reaction kinetics are slow, resulting in little $CO_2$ being consumed to form syngas. Hence, the $CO_2$ utilization is low at lower values of $T_R$. Moreover, the reactions are endothermic and hence are not thermodynamically favored at low temperatures. Increase in $T_R$ results in higher reaction rate leading to high conversion of $CO_2$ to syngas and thereby increasing the $CO_2$ utilization.

Figure 12A:
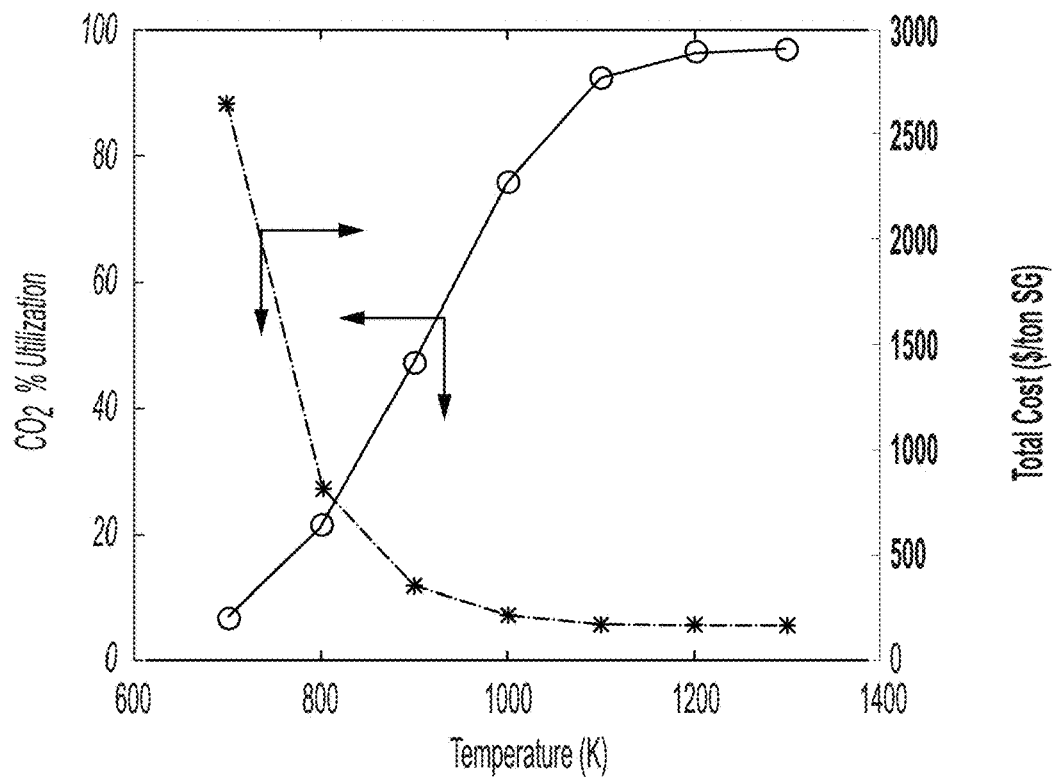
FIG. 12a illustrates overall % $CO_2$ utilization and total cost of the process per ton of syngas (SG) produced.
Figure 12B:
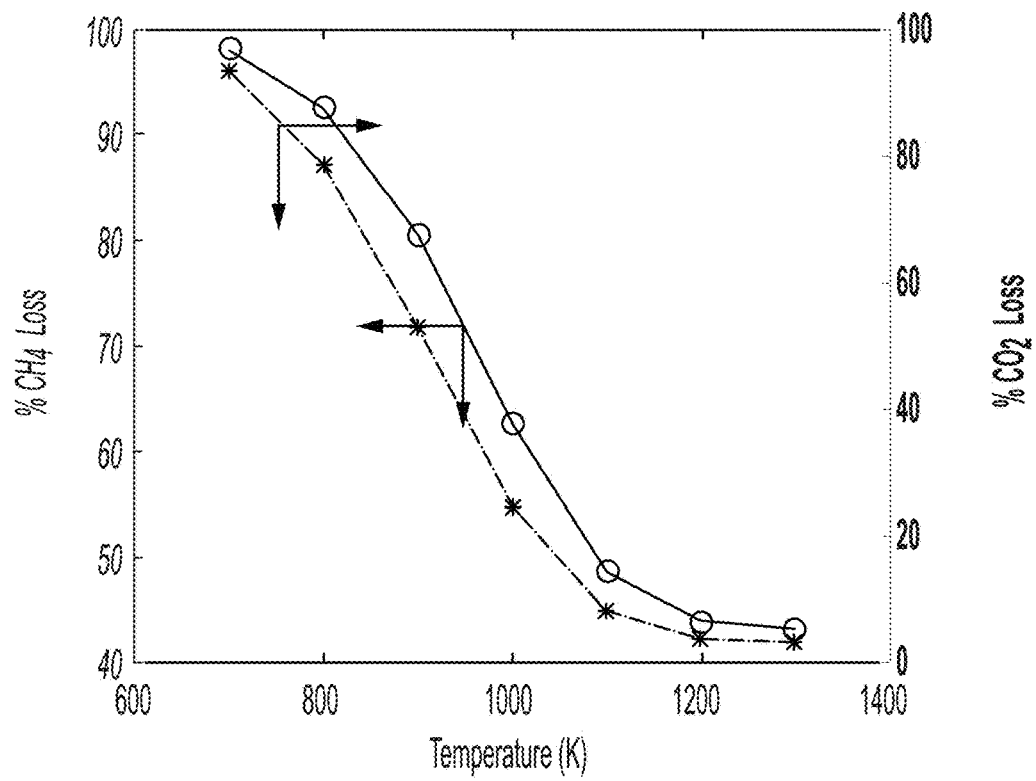
FIG. 12b illustrates % $CO_2$ loss and % $CH_4$ loss wherein $CO_2$ (dry) reforming of methane which is an endothermic reaction takes place in the reactor to convert $CO_2$ and $CH_4$ to syngas and loss % (for $CO_2$ and $CH_4$) accounts for both loss through the venting step and the presence in the final product syngas. The process metrics are calculated over a representative cycle at cyclic steady state.

FIG. 12a-FIG. 12b shows the effects of changing the reactor temperature $T_R$ on the total cost per ton of syngas and the losses of $CO_2$ and $CH_4$ from the process. An increase in the reactor temperature ($T_R$), especially at the 700-1100 K range, results in an increase in the $CO_2$ utilization from 7% to 92%. This increase in $CO_2$ utilization results in higher amounts of syngas produced in each cycle, an almost 18-fold increase at $T_R$>1100 K compared to 700 K case. This in turn, leads to a reduction in total cost ($/ton) of syngas produced. This correlation between the $CO_2$ utilization and total cost per ton of syngas is apparent from FIG. 12a. Similarly, the losses of $CO_2$ and $CH_4$ also go down with increase in $T_R$, as observed in FIG. 12b. This is due to increased conversion of $CO_2$ and $CH_4$ to syngas at higher temperatures. This thereby results in a decrease in the amount of unreacted $CO_2$ and $CH_4$ present in the product. Therefore, the losses decrease with increase in $CO_2$ utilization.

Other variables show a milder effect around the reference case as compared to $T_R$. It can be seen from FIG. 11 that an increase in some of the variables such as, for example, cycle time and makeup $CH_4$ results in an increase in $CO_2$ utilization. Increasing other design variables, such as the pressure, step duration of feed step 1, makeup $CO_2$ and venting end time, decreases the $CO_2$ utilization. Variables such as the lengths of the adsorption and the reactor sections do not have significant influence on $CO_2$ utilization. It can be observed from FIG. 11 and FIG. 13c that the trends in $CO_2$ utilization are opposite to that of $CO_2$ loss. This is because a decrease in $CO_2$ utilization is mainly due to unreacted $CO_2$ and $CO_2$ loss through the vents. Increasing the pressure, step duration of feed step 1, makeup $CO_2$, and venting end-time increases the $CO_2$ loss, which then reduces the $CO_2$ utilization. An increase in the venting end-time increases the loss of $CO_2$ through the vent.

The total cost per ton of syngas (FIG. 13a) increases on increasing the pressure due to the operation of feed compressor. It also increases on increasing the venting end time and the makeup $CH_4$, but to a lesser degree. Although an increase in the makeup $CO_2$ adds an additional cost of raw materials, this reduces the total cost per ton of syngas. This may be due to more syngas produced due to the added makeup $CO_2$ which offsets the increased cost of makeup $CO_2$ and lowers the unit cost per ton of syngas.

Moreover, from FIG. 13b, the $H_2/CO$ ratio in the product syngas is much lower than the desired ratio of 1 for the conditions at which this sensitivity analyses are performed. It is observed that makeup $CH_4$ is the only variable which, when increased, improves the $H_2/CO$ ratio. For the $H_2/CO$ ratio to be close to 1, the dry reforming Reaction R1, which consumes $CH_4$ and $CO_2$ to produce stoichiometric amounts of CO and $H_2$, should dominate the reverse water gas shift Reaction R2 which consumes $CO_2$ and $H_2$ to produce CO and $H_2O$. According to the Le Chatelier's principle, an increase in $CH_4$ favors the dry reforming Reaction R1, while an increase in $CO_2$ favors both the reactions. Hence increase in makeup $CH_4$ results in improving the $H_2/CO$ ratio closer to 1.

For the values of variables considered in this sensitivity analysis, the loss percentages of both $CH_4$ and $CO_2$ are still high, as seen from FIG. 13c-FIG. 13d. It is important to bring down the loss of $CH_4$ and $CO_2$ for the process to be viable. It is observed that the effect of some of the variables, for example, makeup feeds, duration of feed step 1 on the $CH_4$ and $CO_2$ loss are opposite to each other. This highlights the importance of balancing different tradeoffs while reducing losses of $CH_4$ and $CO_2$.

The compositions at the exit of the reactor are influenced by the reactor feed composition, pressure, temperature, reactor dimensions, and mode of operation (isothermal or adiabatic). The reactor feed composition and flow rate are determined by the makeup feed amount and the composition and flow rate of the outlet gas from the adsorption column. These are in turn influenced by the start and end times of the venting step, duration of the feed steps, adsorption column pressure, temperature, and dimensions.

The pressure at which the column is operated affects the equilibrium saturation capacity of the adsorbent. The higher the pressure is, the larger the amount of gas that can be adsorbed at equilibrium. The higher pressure then affects the kinetics of adsorption which is proportional to the difference from the equilibrium amount. As observed from FIG. 14a, as pressure increases, the steepness of the concentration fronts at the outlet of the adsorption column also increases. There is also a reduction in $CH_4$ mole fraction in the $N_2$-rich period of the profile and an increase in the $CO_2$ mole fraction over a major part of the $CH_4$-rich period. Thus, a change in pressure influences the venting times chosen and the composition of feed entering the reactor section.

FIG. 14b compares the effect of the adsorption column length on the adsorption outlet compositions. Increasing the adsorption column length increases the amount of adsorbent available for adsorption, thus raising the overall capacity of gas that can be adsorbed inside the column. This affects the composition of the gas at the outlet of the column. An increase in the length of the column reduces the steepness of the concentration fronts, as observed in FIG. 14b. An increase in $CH_4$ mole fraction is observed in the $N_2$-rich period of the composition profiles, while a reduction in $CO_2$ mole fraction is observed over the $CH_4$-rich period.

As discussed earlier, the process involves cyclic switching of input feeds to the adsorption column. With the total cycle time held constant, changing the relative durations of the individual steps at each cycle has an effect on the gas compositions at the outlet of the adsorption section, as shown in FIG. 14c. Increasing the duration of the first step at the expense of the duration of the second step changes the $N_2$ and $CH_4$ contents in the adsorber outlet. The longer the duration of the first step, the longer the $N_2$-rich period, and vice versa. This is because the step 1 feed is flue gas which has a high percentage of $N_2$. This then influences the choice of the venting times and the composition and flow rate of feed entering the reactor.

FIG. 14d compares the effect of total cycle time ($t_c$), which is the sum of the durations of step 1 and step 2, on the adsorption outlet gas compositions. Although the ratio of the durations of the first and second feed steps is the same, the overall cycle time affects the steepness and nature of the concentration fronts observed in the composition profiles. Different cycle times result in different durations of the individual steps leading to different amounts of gas adsorbed in the adsorption section. Increase in cycle time decreases the $CH_4$ mole fraction in the $N_2$-rich region, while the $CO_2$ mole fraction increases in the first half of the $CH_4$-rich region and then decreases.

The data above show a variety of factors that affect the shapes and durations of the $N_2$-rich and $CH_4$-rich fronts at the outlet of the adsorption section. Therefore, the appropriate values of the downstream design variables (e.g., the venting times, makeup feed amounts, etc.) depend on the adsorption outlet. The venting times are chosen to vent out enough $N_2$-rich gas while ensuring that the losses of $CO_2$ and $CH_4$ through the vents do not exceed maximum limits. Since the venting times depend on the adsorption outlet profiles, they can be chosen after the adsorption model is solved. Table 8 demonstrates how the loss percentages of $CO_2$ and $CH_4$ and the amount of $N_2$ gas vented out change with the choice of the venting times. As the venting period is increased to occupy more of the $N_2$-rich period, the amount of $N_2$ gas vented out increases but so does the losses of greenhouse gases $CO_2$ and $CH_4$. The venting duration will need to be restricted to meet the constraints on the loss percentages of the greenhouse gases.

Table 8, shown below, illustrates effect of changing venting start time, where the venting end time is fixed, on loss percentages through the vents for the reference case. Total cycle time is fixed at 200 s.

TABLE 8

| Venting start time ($t_{v1}$) | Venting end time ($t_{v2}$) | $N_2$ Vent Loss (%) | $CO_2$ Vent Loss (%) | $CH_4$ Vent Loss (%) |
| --- | --- | --- | --- | --- |
| 0 | 125 | 95.93 | 5.29 | 14.16 |
| 25 | 125 | 83.96 | 3.14 | 4.26 |
| 50 | 125 | 61.51 | 1.97 | 1.91 |
| 75 | 125 | 37.32 | 1.12 | 1.07 |
| 100 | 125 | 12.55 | 0.42 | 0.78 |

The gas compositions and flow rates from the adsorption section corresponding to the non-venting period is time averaged to calculate the inlet feed flow rates and compositions for the reactor section. The composition of the feed entering the reactor is determined by the adsorption inlet conditions and the venting times. Since the compositions of the feed gas are kept fixed and the venting times are primarily influenced by the loss constraints, this may restrict the range of compositions in the feed sent to the reactor. For example, there can be a high concentration of $CH_4$ and low concentration of $CO_2$ in the reactor feed. This might result in high amount of unreacted $CH_4$. A sensitivity analysis over various reactor feed compositions performed using the Gibbs free energy minimization module in Aspen Plus (RGIBBS) reveals that the outlet compositions are influenced significantly by the feed ratios (Table 9). Therefore, it is important that the $CH_4/CO_2$ ratio in the feed entering the reactor is adjusted. To provide the process with this flexibility, makeup $CO_2$ and $CH_4$ are added to the reactor feed to improve the feed ratios (FIG. 4a). Although adding makeup $CO_2$ and $CH_4$ increases the operating cost of the process, it makes the process robust to handle different feed compositions of flue gas and $CH_4$-rich feeds and enable meeting the product specifications of syngas product.

Table 9, shown below, illustrates mole fractions in reactor outlet (product) corresponding to feed mole fractions of $CO_2$ and $CH_4$ in a binary mixture at equilibrium conditions at 1 bar and 1000 K. This result is obtained based on Gibbs energy minimization performed using Aspen Plus (RG-IBBS) module to demonstrate that the feed composition significantly affects the product composition.

TABLE 9

| $CO_2$ in Feed | $CH_4$ in Feed | $CO_2$ in Product | $CH_4$ in Product |
|---|---|---|---|
| 0.095 | 0.86 | 5.52E−05 | 0.64 |
| 0.27 | 0.69 | 0.003 | 0.28 |
| 0.39 | 0.57 | 0.013 | 0.13 |
| 0.48 | 0.49 | 0.032 | 0.06 |
| 0.54 | 0.43 | 0.06 | 0.03 |

The variables pertaining to the adsorption section and the makeup feeds discussed until now affect the compositions and flow rates of feed entering the reactor. The reactor cross-sectional area and the number of tubes need to be adjusted accordingly to handle variation in the feed flow rate. To address this, the superficial velocity to the reactor is kept fixed at 1 m/s, while the reactor diameter is made variable.

In addition to the reactor feed compositions, the mode of operation of the reactor and the temperature can affect the final product compositions. The mode of reactor operation considered in this work is isothermal, that is, the temperature is held constant throughout the reactor. $CO_2$ reforming is endothermic and is favored at high temperatures. At higher temperatures, the reaction rates are high. It is thus beneficial to operate the reactor section at the highest temperature allowable. However, to reduce coke formation and sintering of the catalyst, the upper limit of reactor temperature is set at 1223 K. The length of the reactor also needs to be sufficient for enough residence time for the reaction mixture to reach equilibrium before exiting.

Because of these interplays between different design variables and process performance metrics, it is necessary to obtain a window of operation which reduces the loss of the greenhouse gases and meets the product quality specifications. A set of limits or constraints, as listed in Table 10, are imposed on the process performance metrics to characterize the feasible window of operation. The bounds on the design variables used in the present disclosure are summarized in Table 11.

Table 10, shown below, shows specifications of upper and/or lower bounds on key process metrics.

TABLE 10

| Parameter | Value |
|---|---|
| Max. allowable $CH_4$ loss from process, $loss_{CH_4}^{lim}$ (%) | 10 |
| Min. allowable overall % $CO_2$ utilization | 90 |
| Min. allowable $H_2$/CO ratio in syngas, $SG_L$ | 0.9 |
| Max. allowable $H_2$/CO ratio in syngas, $SG_U$ | 1.1 |
| Max. allowable $CH_4$ mole fraction in syngas, $y_{CH_4}^{spec}$ | 0.03 |
| Max. allowable $CO_2$ mole fraction in syngas, $y_{CO_2}^{spec}$ | 0.03 |

TABLE 10-continued

| Parameter | Value |
|---|---|
| Max. allowable $N_2$ mole fraction in syngas, $y_{N_2}^{spec}$ | 0.1 |
| Min. allowable step duration, $t_{min}$ | 10 |
| Max. allowable cycle duration, $t_{max}$ | 200 |

Table 11, shown below, shows the lower and upper bounds of the decision variables chosen in the present disclosure.

TABLE 11

| Decision variables | Lower Bound | Upper Bound |
|---|---|---|
| Pressure ($P_h$) [bar] | 1 | 10 |
| Adsorption bed length ($L_a$) [m] | 0.5 | 2.5 |
| Reactor temperature ($T_r$) [K] | 373 | 1223 |
| Reactor bed length ($L_r$) [m] | 0.5 | 10 |
| Step 1 duration ($t_1$) [s] | 10 ($t_{min}$) | $t_c$ |
| Total cycle time ($t_c$) [s] | 10 ($t_{min}$) | 200 ($t_{max}$) |
| Start of venting ($t_{v1}$) [s] | 0 | $t_c$ |
| End of venting ($t_{v2}$) [s] | 0 | $t_c$ |
| Makeup $CO_2$ ($F_{CO_2}^{mk}$) [mol/s] | 0 | 5 |
| Makeup $CH_4$ ($F_{CH_4}^{mk}$) [mol/s] | 0 | 5 |

To this end, a Latin Hypercube Design (LHD)-based space-filling sampling of the process performance at discrete points over the whole ranges of design variables was performed. A 1000K sampling is performed where K is the number of decision variables, which in this case is 10. This leads to a total of 10,000 samples. However, not all sampling points satisfy the cycle configuration constraints (Equation 16-Equation 21). These constraints are known a priori and they need to be satisfied for any valid operating condition for the process. Hence, a screen-and-replace algorithm is implemented to switch the incompatible values of design variables with values randomly chosen while satisfying the relevant constraints. The simulations are then run at the samples which have compatible values of decision variables to obtain the process performance metrics. To quickly identify the feasible operating window over the entire sample space, the simulations are run for N=5 and cycles C=5 (hereinafter short simulations). The computation time is significantly reduced for short simulations. The resulting reduction in accuracy is not considerable as the values of the process metrics obtained from the short simulations and the longer simulations are close (Table 12). For these space-filling short simulations, flue gas (14% $CO_2$ and 86% $N_2$) was used as the feed for step 1, and natural gas (95% $CH_4$ and 5% $N_2$) as the feed for step 2 at each cycle.

Table 12, shown below, shows comparison of process performance metrics obtained from short (N=5, C=5) simulations and long (N=30, C=100) simulations for the reference case. The absolute value of the percentage deviation of the short simulations from the longer simulations is also reported.

TABLE 12

| Process Metric | N = 30, C = 100 | N = 5, C = 5 | \|% Deviation\| |
|---|---|---|---|
| % $CO_2$ Utilization | 75.63 | 76.44 | 1.07 |
| Total Cost ($/ton SG) | 218.06 | 221.27 | 1.47 |
| Operating Cost ($/ton SG) | 175.33 | 178.03 | 1.54 |
| Total loss % $CH_4$ | 62.62 | 62.86 | 0.38 |
| Total loss % $CO_2$ | 24.29 | 23.49 | 3.29 |
| Vent loss % $CH_4$ | 4.26 | 5.05 | 18.54 |
| Vent loss % $CO_2$ | 3.14 | 3.00 | 4.46 |

TABLE 12-continued

| Process Metric | N = 30, C = 100 | N = 5, C = 5 | \|% Deviation\| |
|---|---|---|---|
| Unreacted % CH$_4$ | 58.36 | 57.82 | 0.93 |
| Unreacted % CO$_2$ | 21.16 | 20.49 | 3.17 |
| Syngas ratio (H$_2$/CO) | 0.83 | 0.83 | 0 |
| CH$_4$ % in product | 0.25 | 0.25 | 0 |
| CO$_2$ % in product | 0.05 | 0.05 | 0 |
| N$_2$ % in product | 0.03 | 0.03 | 0 |
| H$_2$ % in product | 0.29 | 0.29 | 0 |
| CO % in product | 0.35 | 0.35 | 0 |
| H$_2$O % in product | 0.03 | 0.03 | 0 |

Figure 15:
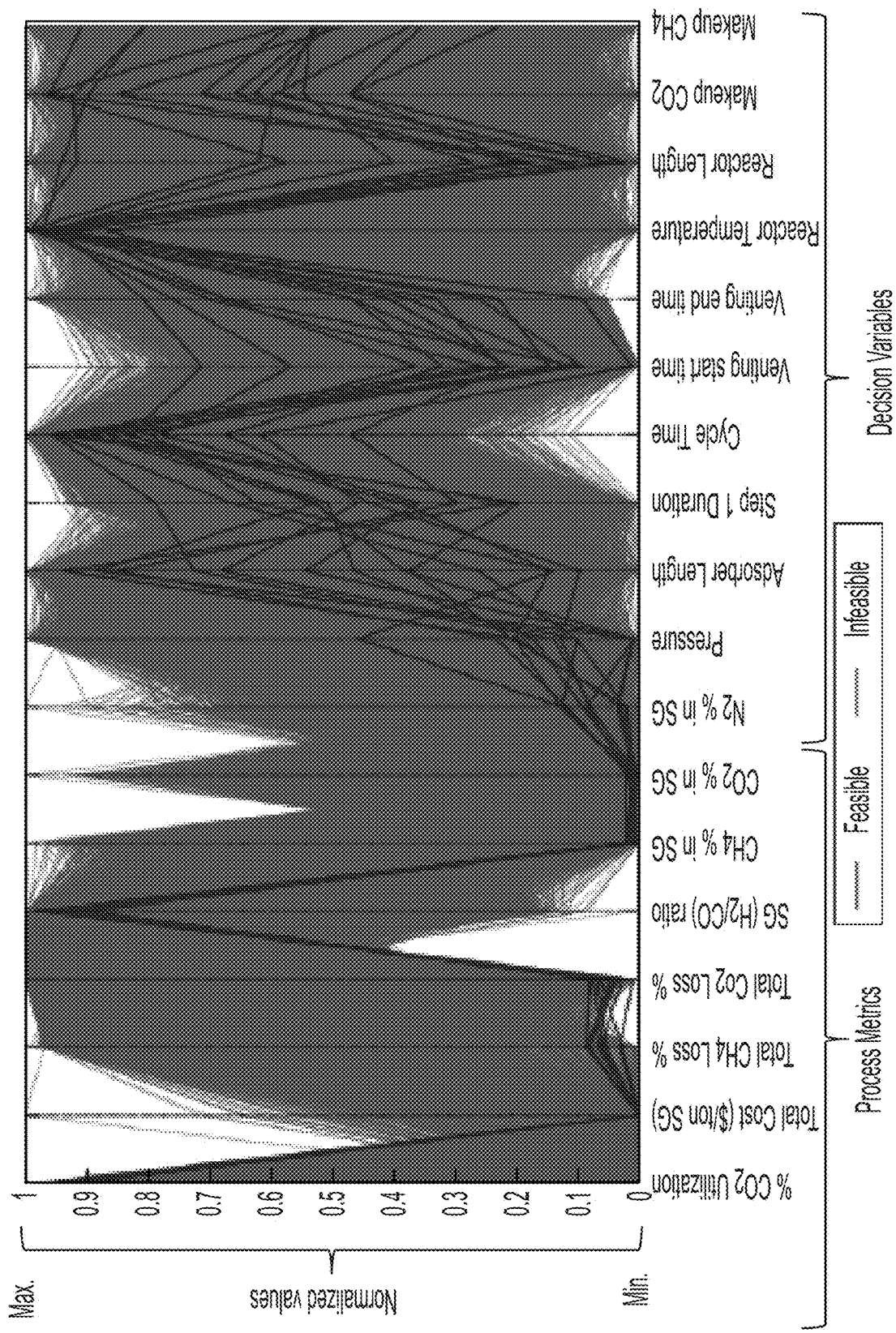
FIG. 15 illustrates large-scale simulation results for 10,000 simulations. Feasible window of operation of the process for flue gas and natural gas as feeds while meeting overall % $CO_2$ utilization above 90% and other constraints in Table 10. Normalized decision variable values (inputs) and process metric values (outputs) obtained from simulations are plotted on the vertical axis. Input variable values for simulations are obtained by randomly sampling the compatible decision variable space. All the 10000 simulations run are plotted and shown in FIG. 15. Each simulation is represented by a line joining the normalized values of process metric obtained and the decision variable value used.

The process performance metrics obtained from the 10,000 simulations/samples are plotted in the FIG. 15. Each simulation corresponds to a horizontal line joining the values of all the respective process metrics and the decision variable values which are normalized between the maximum and minimum values. All the lines corresponding to the 10,000 simulations are shown in FIG. 15, where each line represents a single simulation. FIG. 15 illustrates simulations for which all performance metrics are feasible and simulations having infeasible designs. Feasible designs are those for which all the performance metrics are feasible, that is, they are within specified limits as outlined in Table 10. The present disclosure refers to these simulations as feasible samples. It is interesting to note that the feasible region is very narrow as compared to the decision variable space. For the case considered, only 13 samples out of the 10,000 samples are found to be feasible.

Hence, finding a feasible point of operation by just performing parametric studies or sensitivity analyses involves many simulations. A systematic technique is utilized to obtain feasible operating conditions and optimize best operating conditions. In the following section, the present disclosure describes a novel simulation-based constrained grey-box optimization method to find feasible and optimal designs and operating conditions for the proposed ICCC process.

Process Optimization

To operate the ICCC process so that it meets the desired process and product specifications it may be necessary to run many simulations to narrow down the range of the input decision variables as observed in the previous section. This approach may become cumbersome and prohibitive with the increase in number of decision variables. Optimization helps in finding feasible conditions in less number of simulations compared to random sampling.

Several variables affect CO$_2$ utilization, the cost of the process and other process metrics. Optimization techniques to balance different trade-offs while achieving a desired objective. For example, a set of conditions which result in the maximum CO$_2$ utilization might have high costs, while another set of conditions might minimize the costs at the expense of CO$_2$ utilization. An approach to balance both these objectives can be minimizing costs while maintaining CO$_2$ utilization above a certain threshold using appropriate constraints. Additional constraints may also be needed for ensuring product purity, safety limits, containing losses, reducing dependence on makeup feed, inter alia. This can be achieved by formulating and solving an optimization problem with an appropriate objective function, such as maximizing CO$_2$ utilization or minimizing operating cost, while incorporating all the relevant constraints.

Problem Formulation: The ICCC process optimization problem is formulated as follows:

$$\text{Maximize POCU (overall CO}_2\text{ utilization) or, Minimize TC (total cost)} \quad \text{Eq. 58}$$

subject to $$\text{loss}_{CH_4}^t \leq \text{loss}_{CH_4}^{lim} \quad \text{Eq. 59a}$$

$$y_{CH_4}^P \leq y_{CH_4}^{spec} \quad \text{Eq. 59b}$$

$$y_{CO_2}^P \leq y_{CO_2}^{spec} \quad \text{Eq. 59d}$$

$$y_{N_2}^P \leq y_{N_2}^{spec} \quad \text{Eq. 59e}$$

$$SG_l \leq y_{H_2}^P / y_{CO}^P \leq SG_u \quad \text{Eq. 59f}$$

$$POCU \geq POCU^{min} \quad \text{Eq. 59g}$$

Cycle confirmation constraints (Equation 16-Equation 21)     Eq. 59h

Decision variable bounds (Table 11)     Eq. 59i

Complete process model (Equation 2-Equation 57 and Equation 72-Equation 84)     Eq. 59j where, Equation 58 is the objective function, and Equation 59a-Equation 59j are the constraints which are to be satisfied. These include the constraints defining the process specifications (Equations 59a-f), cycle assignment (Equation 16-Equation 21), and the detailed description of the ICCC process (Equation 2-Equation 57 and Equation 72-Equation 84). When the objective is to minimize the total cost, POCU$^{min}$ is set to be 90%, which ensured that the cost is minimized while achieving at least 90% overall CO$_2$ utilization. The specifications (e.g., loss$_{CH_4}^{lim}$, $y_{CH_4}^{spec}$, $y_{CO_2}^{spec}$, $y_{N_2}^{spec}$, SG$_l$, SG$_U$) are tabulated in Table 10, and the bounds on the design variables are summarized in Table 11.

While methods for the optimization of adsorption-based cyclic processes exist, it is not trivial to solve the optimization problem for the ICCC process, which is a highly nonlinear, nonconvex NAPDE model with many algebraic and partial differential equations (PDEs). Furthermore, the objective function and the performance metrics (POCU, TC, $y_{CH_4}^P$, $y_{CO_2}^P$, $y_{N_2}^P$, and $y_{H_2}^P/y_{CO}^P$) within the NAPDE model are not expressed explicitly as functions of the design/decision variables ($P_h$, $L_a$, $t_1$, $t_c$, $t_{v1}$, $t_{v2}$, $T_R$, $L_R$, $F_{CO_2}^{mk}$, $F_{CH_4}^{mk}$). The metrics are obtained only after solving Equation 2-Equation 57 and Equation 72-Equation 84. Because they are not explicitly expressed in terms of design variables, the present disclosure will refer to them as black-box. To this end, the NAPDE model can be viewed as a large grey-box model, which is a combination of both explicit and black-box/hidden models.

For performing optimization using gradient based solvers, the original NAPDE model needs to be completely discretized in both space and time resulting in a large number of nonlinear, nonconvex equations whose size increases with the level of discretization. Optimizing the resultant model using standard nonlinear solvers is computationally expensive. An alternative and promising approach is to use data obtained from simulations and develop surrogate models to guide optimization. Replacing a large and complex discretized model by a surrogate model aids in performing optimization with less computational overhead. Similar black-box/grey-box optimization problems have been previously studied for process flowsheet optimization, pressure swing adsorption, and superstructure optimization. Several approaches motivated from classical nonlinear programming methods involving known functional forms are being applied to black-box/grey-box optimization. Using a penalty-based trust-region approach, a constrained problem is converted to an unconstrained one by including the constraint violation within the objective function. Augmented Lagrangian-based methods have also been applied for constrained derivative-free optimization. A filter-based technique was recently proposed to solve general glass-box/black-box problems and was applied to chemical engineering based process optimization case studies. The filter approach treats a constrained problem as a bi-objective problem where minimizing the objective function and the constraint violation are considered as separate goals.

In the present disclosure, a trust-region based optimization framework is proposed to solve the NAPDE problem in two phases: (i) finding feasible points (restoration phase); and (ii) reducing the objective function while maintaining feasibility (optimization phase). This approach is specifically useful for applications such as those disclosed herein, where identifying the feasible set of operating conditions is not trivial. The overall optimization framework is described in further detail below.

Grey-box Optimization Methodology: The NAPDE optimization problem can be generalized as follows:

$$\min_{x} f(x, Y) \quad \text{(objective)} \quad \text{Eq. 60}$$

$$\text{s.t.} \quad h_p(x, Y) = 0, \quad p \in \{Eqs.\ 2-57, A.\ 1-13\} \quad \text{(process model)}$$

$$g_k(x) \leq 0, \quad k \in \{Eqs.\ 16-21\} \quad \text{(cycle assignment)}$$

$$g_u(x) \leq 0, \quad u \in \{Eqs.\ 59a-f\} \quad \begin{pmatrix} \text{process} \\ \text{specifications} \end{pmatrix}$$

$$x_i \in [x_i^L, x_i^U], \quad i \in \left\{ \begin{array}{c} P_h, L_a, t_1, t_c, t_{v1}, \\ t_{v2}, T_R, L_R, F_{CO_2}^{mk}, F_{CH_4}^{mk} \end{array} \right\} \quad \begin{pmatrix} \text{design variable} \\ \text{bounds} \end{pmatrix}$$

$$Y_j \in [Y_i^L, Y_i^U], \quad j \in \left\{ \begin{array}{c} POCU, TC, y_{CH_4}^p, \\ y_{CO_2}^p, y_{N_2}^p, y_{H_2}^p / y_{CO}^p \end{array} \right\} \quad \begin{pmatrix} \text{specifications} \\ \text{bounds} \end{pmatrix}$$

where x is a vector of all design variables $x_i$, and Y is a vector of all process performance metrics $Y_j$. For the ICCC process, $x=(P_h,L_a,t_1,t_c,t_{v1},t_{v2},T_R,L_R,F_{CO_2}^{mk},F_{CH_4}^{mk})$, and $Y=\{POCU,TC,y_{CH_4}^P,y_{CO_2}^P,y_{N_2}^P,y_{H_2}^P/y_{CO}^P\}$. Furthermore, $f(x)$ is the black-box objective function, $g_k(x)$ a known function from the set of explicit equations describing the cycle assignment (Equation 16-Equation 21), $g_u(x,Y)$ is a black-box function from the set of the equations describing the limits on the process performance metrics (Equations 59a-f), and $h_p(x,Y)=0$ represents the process model described by Equation 2-Equation 57 and Equation 72-Equation 84. $g_u(x,Y)$ is referred to be black-box, since it relates the design variables x with the process performance metrics Y through implicit expressions. Furthermore, a simulation is referred to when all $x_i$ will fixed such that their values satisfy $g_q(x) \leq 0$. Designing of simulations to find set of x-values that satisfy the know constraints $g_q(x) \leq 0$ is a challenge. However, a simulation-based optimization framework, such as one disclosed herein, requires many simulations as the algorithm proceeds. Therefore, design of simulations is of significant importance. The present disclosure applies a method previous proposed to design a set of feasible samples that satisfies known constraints. The method is described in further detail below.

The surrogate model-based trust-region approach is used for both the restoration and optimization phases. The basic steps involved in this approach are: (1) space filling samples are obtained such that they are feasible with respect to the known constraints; (2) after the simulations are performed on the design points, the black-box function is approximated by a fully-linear surrogate model; and (3) a non-linear programming problem involving minimization of the surrogate model subject to the constraints is solved using GAMS/ANTIGONE in a trust-region and the procedure is repeated in an iterative manner using a trust-region framework until a convergence criteria is satisfied. Based on a set of simulation samples, simpler models (surrogates) were developed for both $f(x)$. At each iteration, a set of 5 k samples are used to develop the surrogate model. All the samples are made sure to lie within the current trust-region. At the next iteration, previous samples lying within the new trust-region are reused. In case the number of samples is less than 5 k, the remaining samples are obtained using an optimization model described in further detail below. Let $f^r(x)$ represents the surrogate model of $f(x)$. The surrogate model used in the present disclosure is a cubic radial basis function and satisfies the fully-linear property. A model is said to be fully-linear if for all $x \in \Delta$, $\|\nabla f(x) - \nabla f^r(x)\| \leq \kappa_g \Delta$ and $\|f(x) - f^r(x)\| \leq \kappa_f \Delta^2$, where $\kappa_g, \kappa_f > 0$. Note that parameters of the cubic radial basis function representing $f^r(x)$ is obtained, whenever needed, based on a maximum-likelihood parameter estimation with cross-validation using a set of NAPDE simulation data (further detailed herein below).

Finding Feasible Solutions (Restoration Phase): The restoration phase is an iterative approach which proposes new designs of simulations towards finding a feasible simulation point or sample. At each iteration of the restoration phase, an optimization problem is solved where all the unknown constraints are grouped into a single smooth constraint violation function (θ) defined as follows:

$$\theta = \sum_{u} (\max(0, g_u))^2 \quad \text{Eq. 61}$$

The constraint violation function is zero when the current simulation considered is feasible. It is positive whenever it is infeasible with respect to the unknown constraints. The following nonlinear model is solved at each iteration of the restoration phase:

$$\min_{x} \theta^r(x) \quad \text{Eq. 62}$$

$$\text{s.t.} \quad g_k(x) \le 0$$
$$x \in \Delta_{k'}$$

$\theta^r$ denotes an approximation of $\theta$ within a trust region $\Delta_{k'}$. Similar to $f^r$, $\theta^r$ is approximated using a cubic radial basis function which is fitted based on simulations of the NAPDE model, as described in more detail below. The new point $\bar{x}_{k'}$ is acceptable as a new iterate if a decrease in the objective function (constraint violation in this case) is observed and the trust region is increased.

It may also be possible that a given problem is infeasible. To check this, the criticality measure $\varphi_r^\theta$ is calculated by solving the following linear program.

$$\varphi_r^\theta = \min_d \ \nabla \theta^r(\bar{x}_{k'})^T d \qquad \text{Eq. 63}$$
$$\text{s.t.} \quad g_k(\bar{x}_{k'}) + \nabla g_k(\bar{x}_{k'})^T d \le 0$$
$$\|d\|_1 \le 1$$

where d is a vector of size n, that is, the number of design variables. Criticality measure evaluates if further decrease in infeasibility/violation of the unknown constraints is possible. For nonlinear programs with known smooth objective function and constraints, if the solution of the above problem is within a pre-specified tolerance, the problem is deemed to have converged. However, in the paradigm of black-box optimization, an additional condition on accuracy of the surrogate model is also needed. In the present disclosure the accuracy of the surrogate model was tested by validating on an independent set of testing sample points (denoted by ST) by evaluating the root mean squared error ($\varepsilon_\theta$). So, if the criticality measure ($\varphi_r^\theta$) and root mean squared error ($\varepsilon_\theta$) is below threshold values of $\varphi^{tol}$ and $\varepsilon^{tol}$, the algorithm is terminated.

An alternative certificate of convergence could be the trust region being smaller than a pre-specified tolerance. In the algorithm, trust region is increased when a decrease in infeasibility (objective function of constraint violation in this case) is obtained in the current iteration and the trust region is decreased if a decrease in infeasibility is not observed. If the trust region size keeps on decreasing to a very small value, this implies that no better point is possible and hence the method has converged to the local minima. This argument is based on the assumption that the original function is sufficiently smooth. The above criterion is also employed as convergence criteria for the optimization phase as will be described below.

Figure 16:
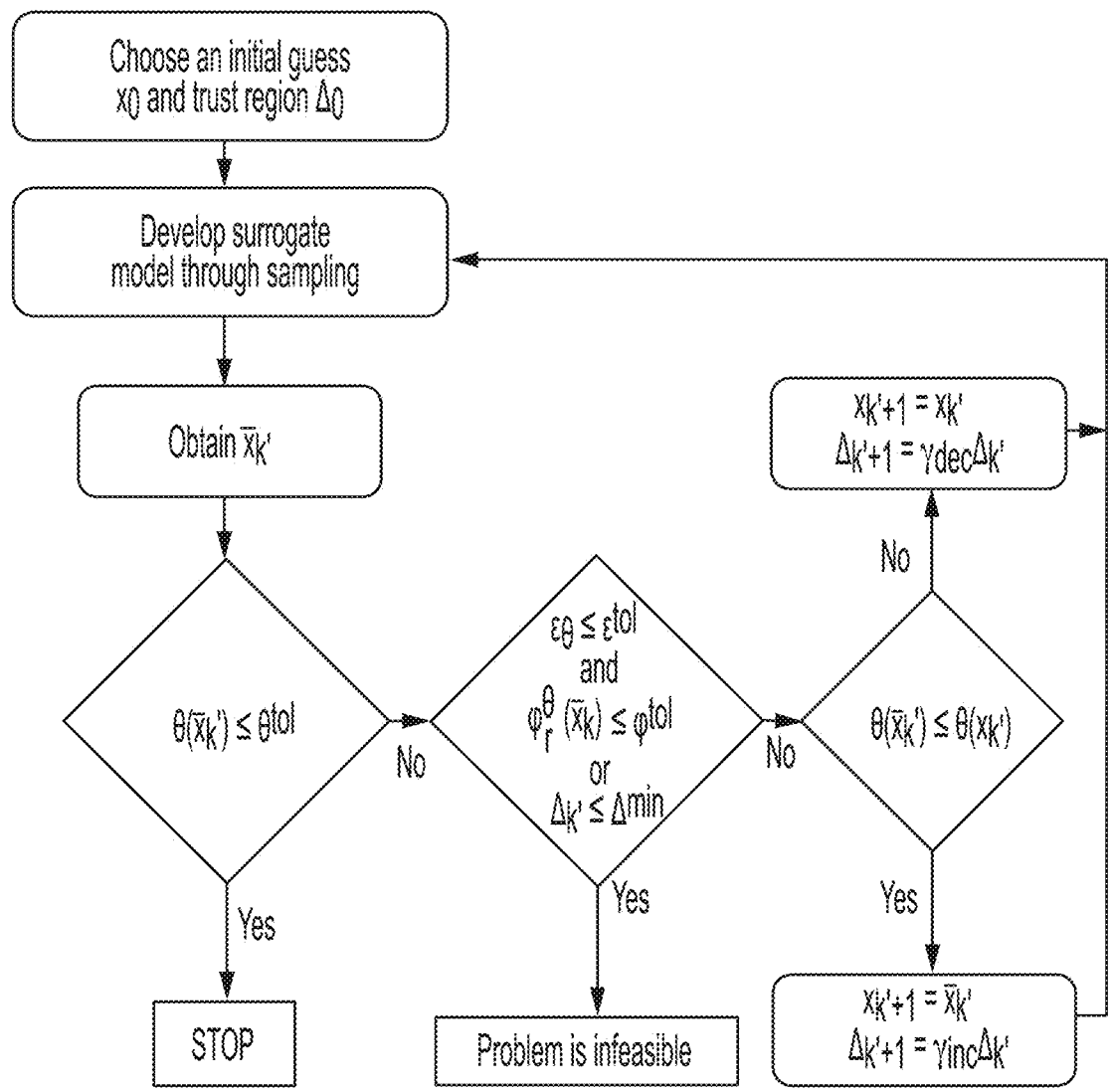
FIG. 16 illustrates the restoration phase of the optimization algorithm used to obtain feasible point. It is a trust-region based algorithm which starts from an infeasible point and performs iterations to find a feasible point. The algorithm terminates if a feasible point is obtained or if the problem is infeasible.

The restoration phase described above is illustrated in FIG. 16. If the restoration phase does not yield a feasible point, a different initial guess is provided and the algorithm is run again.

Finding Optimal Solutions (Optimization Phase): Once a feasible point is obtained, the focus is shifted towards decreasing the objective function while maintaining feasibility at all subsequent iterations. To achieve this, surrogate models for both the objective function and the constraint violation are developed. An optimization sub-problem (Equation 65) is also solved to find a point that decreases the objective function while ensuring feasibility with respect to both known and unknown constraints. The basis for considering surrogate model for the constraint violation, as well as for the objective, is to exclude the infeasible search space from consideration. A new iterate obtained by solving Equation 65 is only acceptable if the new point is feasible and the objective function is reduced. In other words:

$$\theta(\bar{x}_k) \le \theta^{tol} \text{ and } f(\bar{x}_k) \le f(x_k) \qquad \text{Eq. 64}$$

If the reduction obtained in the objective function is appreciable compared to the predicted reduction in objective function, the trust region, $\Delta_{k+1}$ can potentially be increased. The ratio relating the observed reduction with predicted reduction is given by:

$$\rho_k = \frac{f(x_k) - f(\bar{x}_k)}{f^r(x_k) - f^r(\bar{x}_k)}$$

Figure 17:
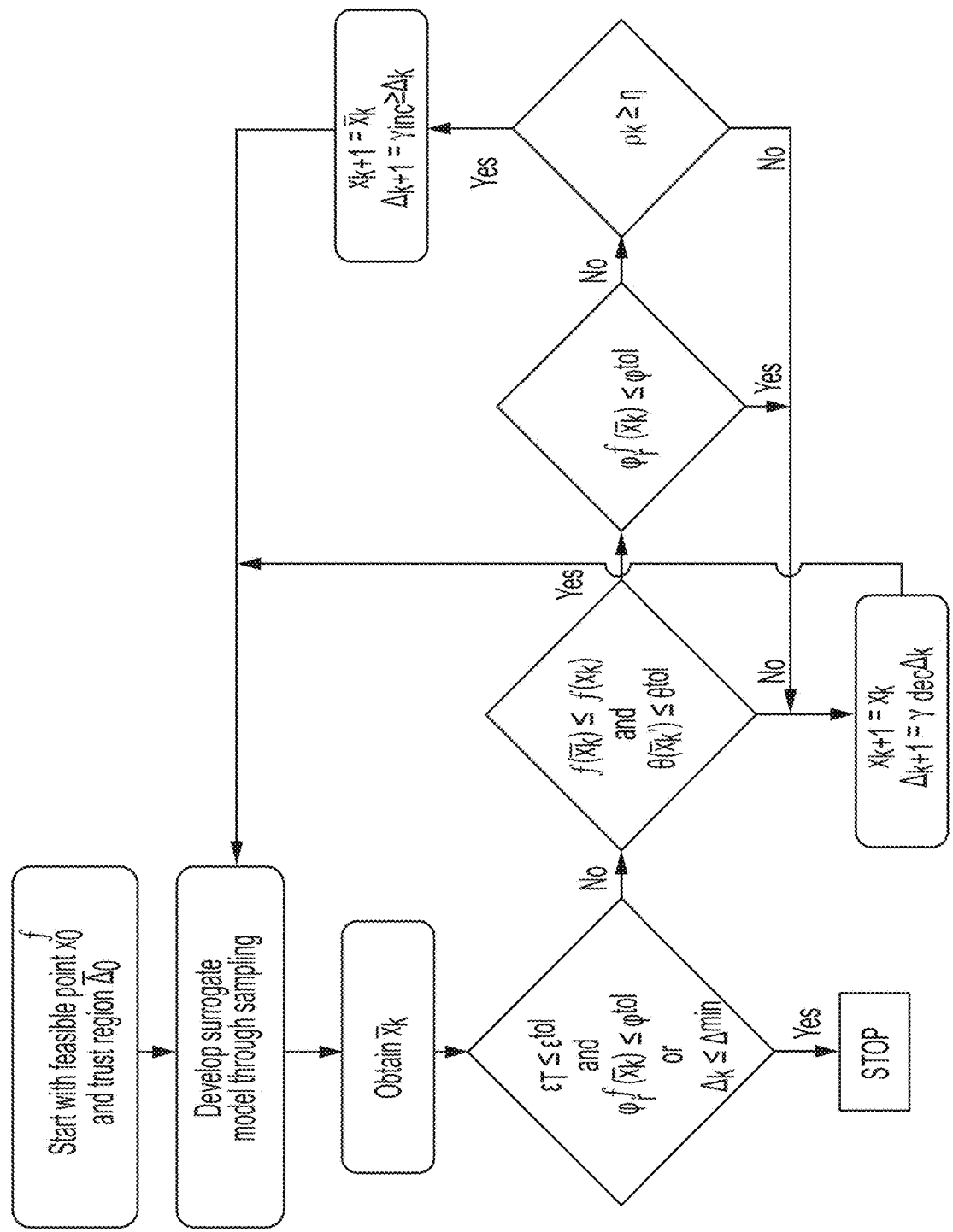
FIG. 17 illustrates an algorithm used in the optimization phase. The algorithm aims to improve objective function after the restoration phase has terminated. In the optimization phase, an iterate is only acceptable when it improves the objective function while maintaining feasibility.

The algorithm for minimizing the objective function is illustrated in FIG. 17. The following sub-problem is solved at each iteration in the trust region to obtain candidate optimum point $\bar{x}_k$:

$$\min_x \ f^r(x) \qquad \text{Eq. 65}$$
$$\text{s.t.} \quad \theta^r(x) \le \theta^m$$
$$g_k(x) \le 0$$
$$x \in \Delta_k$$

where $\theta^m$ denotes the minimum constraint violation encountered among the samples. To check whether a candidate point is a first order critical point, criticality measure $\varphi_r^f$ is calculated by solving the following linear program:

$$\varphi_r^f = \min_d \ \nabla f^r(\bar{x}_k)^T d \qquad \text{Eq. 66}$$
$$\text{s.t.} \quad g_u^r(\bar{x}_k) + \nabla g_u^r(\bar{x}_k)^T d \le 0$$
$$g_k(\bar{x}_k) + \nabla g_k(\bar{x}_k)^T d \le 0$$
$$\|d\| \le 1$$

This problem gives an indication as to whether the objective function can be decreased further while maintaining feasibility. The core of the algorithm relies on performing sampling and developing surrogate model. The strategy to obtain feasible samples with respect to the known constraints and the strategy for developing surrogate model are both described in more detail below. The optimization algorithm parameters are listed in Table 13.

Table 13, shown below, shows algorithm parameters used in the optimization runs performed. $L_1$ norm is used for defining trust region size.

TABLE 13

| Algorithm Parameters | Values |
| --- | --- |
| Constraint violation tolerance ($\theta^{tol}$) | 0 |
| Root mean squared error tolerance ($\varepsilon^{tol}$) | $10^{-3}$ |
| Threshold value for criticality measure ($\varphi^{tol}$) | $10^{-3}$ |
| Minimum trust region size ($\Delta^{min}$) | $10^{-5}$ |
| Trust region decrease factor ($\gamma_{dec}$) | 0.5 |
| Trust region increase factor ($\gamma_{inc}$) | 3 |
| Ratio of actual decrease and predicted decrease in objective function ($\eta$) | 0.25 |

Optimization Results: The present disclosure has applied the grey-box constrained optimization strategy to solve the NAPDE model for the optimization of the integrated carbon capture and conversion process presented in this disclosure. In what follows, the present disclosure describes three case studies. In the first case study, the capture and conversion of $CO_2$ from dry flue gas (14% $CO_2$ and 86% $N_2$) from a coal-fired power plant using typical natural gas containing 95% $CH_4$ and 5% $N_2$ as step 2 feed was considered. For case study 2, the same was considered, but using biogas, which is an unconventional and highly contaminated source of $CH_4$ with about 60% $CH_4$ and 40% $CO_2$, as the feed for step 2. In case study 3, the robustness of the proposed ICCC process under varying feed compositions was studied. Specifically, several optimization runs were performed, each of which considers a fixed flue gas but different $CH_4$-rich feed. The $CO_2$ contents in the $CH_4$-rich feed are varied over a range from 0-60% to cover the compositions of a wide range of unconventional, stranded and distributed sources of methane, such as shale gas, biogas, landfill gas, refinery off-gas, fuel gas, combinations of the same and like. All feeds are considered to be available at 1 atm and 298 K for all case studies.

Case Study 1—Conversion of Flue gas and Natural Gas to Syngas: For this case study, flue gas is used as the feed for the step 1, and natural gas (95% $CH_4$ and 5% $N_2$) is used as the methane-rich feed for step 2 of each cycle. The optimization was performed with different objectives: (i) maximizing the overall $CO_2$ utilization (case a); (ii) minimizing the total cost per ton of syngas produced (case b); and (iii) maximizing "direct" utilization of $CO_2$ from flue gas with respect to the total utilization (case c). These cases are discussed in further detail below.

Case (a)—Maximize Overall Utilization of $CO_2$: Here, the overall % $CO_2$ utilization is maximized and the results are presented in Table 14-Table 16. It can be observed from Table 14 that the product specifications, syngas ratio, and the losses are within the limits set by the constraints. The overall $CO_2$ utilization is high around 99.7% while the corresponding cost per ton of syngas is $120.9 which is within the range of costs described in pervious literature. The syngas is mostly composed of 47.88% $H_2$ and 47.99% CO, which confirms that the specified ratio of $H_2$/CO is met. The optimal design variables are listed in Table 15. The optimum is attained at 1 atm pressure and at the highest reactor temperature allowed (1223 K) to maximize the $CO_2$ conversion to syngas. The process requires additional $CO_2$ and $CH_4$ to adjust the input feed ratios to the reactor to obtain higher $CO_2$ conversion while meeting all the constraints. The total loss of $CH_4$ is at its upper bound (10%) but the total loss of $CO_2$ is only 0.23%. $CH_4$ is mostly lost through the vent. However, the venting is important to eliminate $N_2$ from the reactor feed. This is apparent, as the $N_2$ content of the product syngas is found to be only 1.43%. The product syngas also contains 0.03% $CO_2$.

Figure 18B:
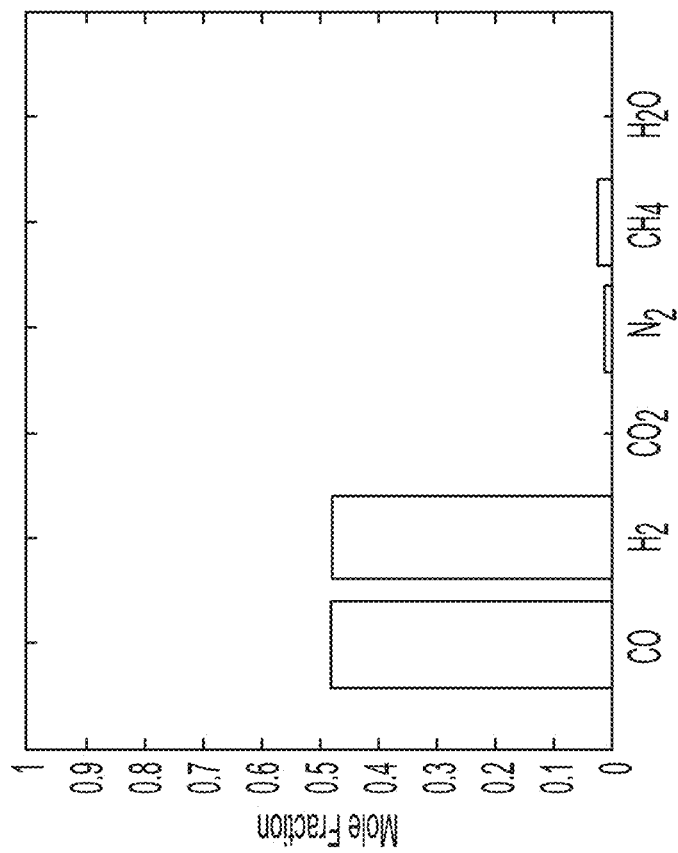
FIG. 18b illustrates product (syngas) composition at reactor outlet at optimum overall $CO_2$ utilization for flue gas and natural gas feeds. Maximum overall $CO_2$ utilization obtained at optimum is 99.7% at a cost $120.9/ton syngas.
Figure 18A:
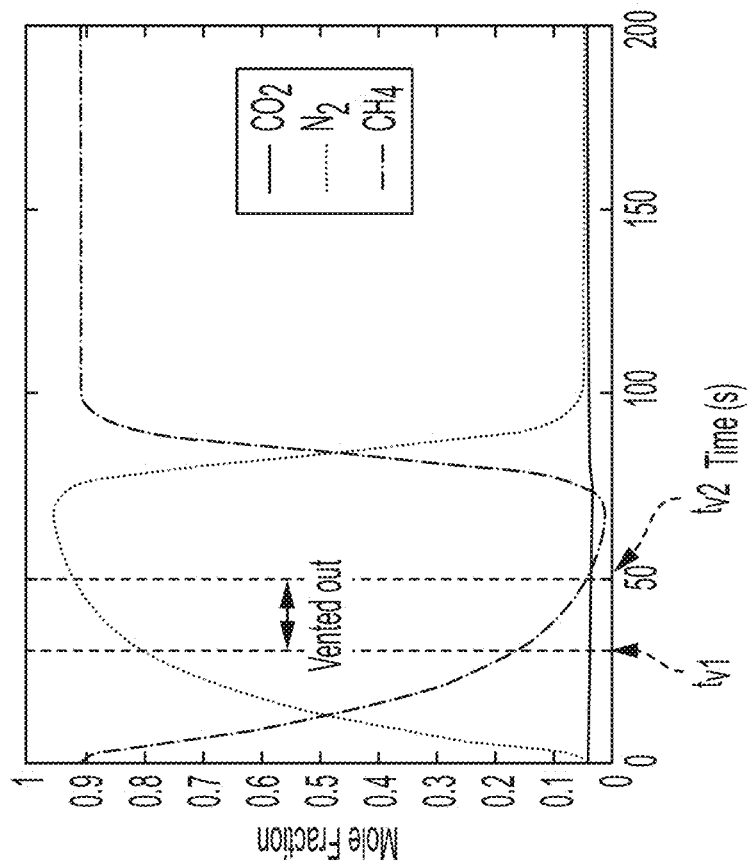
FIG. 18a illustrates mole fraction profiles at the adsorption column outlet for optimal overall $CO_2$ utilization for flue gas as feed in step 1 and natural gas as feed in step 2.

The adsorption outlet composition and the reactor outlet compositions for this case are shown in FIG. 18. Looking at the adsorption outlet profiles, at first it would seem surprising that the venting period is not shifted further towards the later part of the cycle where there is high $N_2$ content and low $CH_4$ content. However, the optimization has obtained a balance between different trade-offs to maintain feasibility while maximizing the overall $CO_2$ utilization. It is also observed that although $N_2$ does not participate in the reaction, its presence can reduce the partial pressure of the reacting species to adjust the final conversion. The complex interplay of different variables and their influence on decision making for optimum results is thus well brought out in this case.

Table 14, shown below, illustrates process and product specifications at optimum for natural gas (NG) and Biogas (BG) as $CH_4$-rich feed used in the second feed step. Process metrics calculated over 1 cycle. Value of the objective shown in bold typeface.

TABLE 14

| Process Metric | Case (a) Optimum Overall $CO_2$ % Utilization | | Case (b) Optimum Total Cost ($/ton Syngas) | | Case (c) Optimum "Direct" Utilization of $CO_2$ from Flue Gas | |
| --- | --- | --- | --- | --- | --- | --- |
| Step 1 Feed | Flue Gas | Flue Gas | Flue Gas | Flue Gas | Flue Gas | Flue Gas |
| Step 2 Feed | Natural Gas | Biogas | Natural Gas | Biogas | Natural Gas | Biogas |
| Overall $CO_2$ % Utilization | 99.67 | 99.67 | 97.14 | 97.35 | 92.00 | 90.76 |
| Total cost ($/ton SG) | 120.89 | 117.44 | 109.42 | 110.08 | 129.01 | 128.52 |
| % $CO_2$ fed via FG over total $CO_2$ utilized | 1.16 | 3.10 | 2.59 | 2.70 | 11.69 | 16.14 |
| Total loss % $CH_4$ | 10.00 | 9.97 | 1.20 | 1.14 | 7.64 | 6.42 |
| Total loss % $CO_2$ | 0.23 | 0.22 | 2.76 | 2.56 | 7.91 | 9.24 |
| Vent loss % $CH_4$ | 9.79 | 0.01 | 0.01 | 0.00 | 1.38 | 0.00 |
| Vent loss % $CO_2$ | 0.08 | 0.08 | 0.72 | 0.07 | 1.69 | 7.64 |
| Unreacted % $CH_4$ | 0.20 | 9.96 | 1.19 | 1.14 | 6.26 | 6.42 |
| Unreacted % $CO_2$ | 0.15 | 0.14 | 2.04 | 2.49 | 6.22 | 1.59 |
| Syngas (SG) ratio ($H_2$/CO) | 1.00 | 1.0 | 0.97 | 0.96 | 0.9 | 0.97 |
| $CH_4$ % in product | 2.61 | 2.57 | 0.29 | 0.27 | 1.44 | 1.5 |
| $CO_2$ % in product | 0.03 | 0.03 | 0.52 | 0.63 | 1.61 | 0.4 |
| $N_2$ % in product | 1.43 | 4.4 | 2.56 | 3.99 | 9.94 | 10.00 |
| $H_2$ % in product | 47.88 | 46.42 | 47.21 | 46.27 | 40.16 | 43.15 |
| CO % in product | 47.99 | 46.52 | 48.68 | 47.98 | 44.62 | 44.35 |
| $H_2O$ % in product | 0.05 | 0.05 | 0.73 | 0.85 | 2.23 | 0.59 |

Table 15, shown below, shows decision variables at optimum for natural gas (NG) and biogas (BG) feeds for different optimization objectives.

TABLE 15

| Decision variables | Case (a) Optimum Overall % $CO_2$ Utilization | | Case (b) Optimum Total Cost ($/ton Syngas) | | Case (c) Optimum "Direct" Utilization of $CO_2$ from Flue Gas | |
| --- | --- | --- | --- | --- | --- | --- |
| Step 1 Feed | Flue Gas | Flue Gas | Flue Gas | Flue Gas | Flue Gas | Flue Gas |
| Step 2 Feed | Natural Gas | Biogas | Natural Gas | Biogas | Natural Gas | Biogas |
| Pressure ($P_h$) [bar] | 1.01 | 1.01 | 1.01 | 1.01 | 6.24 | 2.84 |
| Adsorption bed length ($L_a$) [m] | 0.9 | 1.45 | 0.57 | 1.205 | 1.66 | 0.97 |
| Reactor Temperature ($T_r$) [K] | 1223 | 1223 | 1203 | 1193.97 | 1221.76 | 1217.33 |
| Reactor bed length ($L_r$) [m] | 9.15 | 1.40 | 0.5 | 0.5 | 0.52 | 0.53 |
| Step 1 duration ($t_1$) [s] | 65.02 | 159.57 | 185.6 | 157.18 | 137.62 | 185.62 |
| Total Cycle time ($t_c$) [s] | 199.92 | 186.08 | 199.27 | 167.18 | 196.49 | 196.23 |

TABLE 15-continued

| Decision variables | Case (a) Optimum Overall % $CO_2$ Utilization | | Case (b) Optimum Total Cost ($/ton Syngas) | | Case (c) Optimum "Direct" Utilization of $CO_2$ from Flue Gas | |
|---|---|---|---|---|---|---|
| Start of venting ($t_{v1}$) [s] | 30.07 | 172.59 | 35.12 | 156.96 | 48.49 | 84.95 |
| End of venting ($t_{v2}$) [s] | 49.54 | 182.59 | 101.48 | 167.18 | 108.29 | 194.44 |
| Makeup $CO_2$ ($F_{CO_2}^{makeup}$) [mol/s] | 3.85 | 3.67 | 5 | 4.81 | 4.96 | 2.09 |
| Makeup $CH_4$ ($F_{CH_4}^{makeup}$) [mol/s] | 3.67 | 4.15 | 4.83 | 4.67 | 3.22 | 2.24 |

Case (b)—Minimize Total Cost per ton of Syngas: For minimizing the total cost of the process per unit amount of syngas produced, an additional constraint is introduced which restricts the overall $CO_2$ utilization from going below 90%. A cost of $109.4 per ton syngas is achieved while maintaining around 97% overall $CO_2$ utilization. None of the process and product quality constraints are at their bounds, while the amount of makeup $CO_2$ needed is at its upper bound. The optimal step 1 duration is about 12 times larger than the duration of step 2. Although the makeup $CO_2$ is expensive, the optimization sets it at the maximum value to meet other process constraints. The reactor bed length is at its minimum and the pressure of the process is at 1 atm. The reactor temperature is 1203 K which is about 20 K less than the upper bound.

Figure 19:
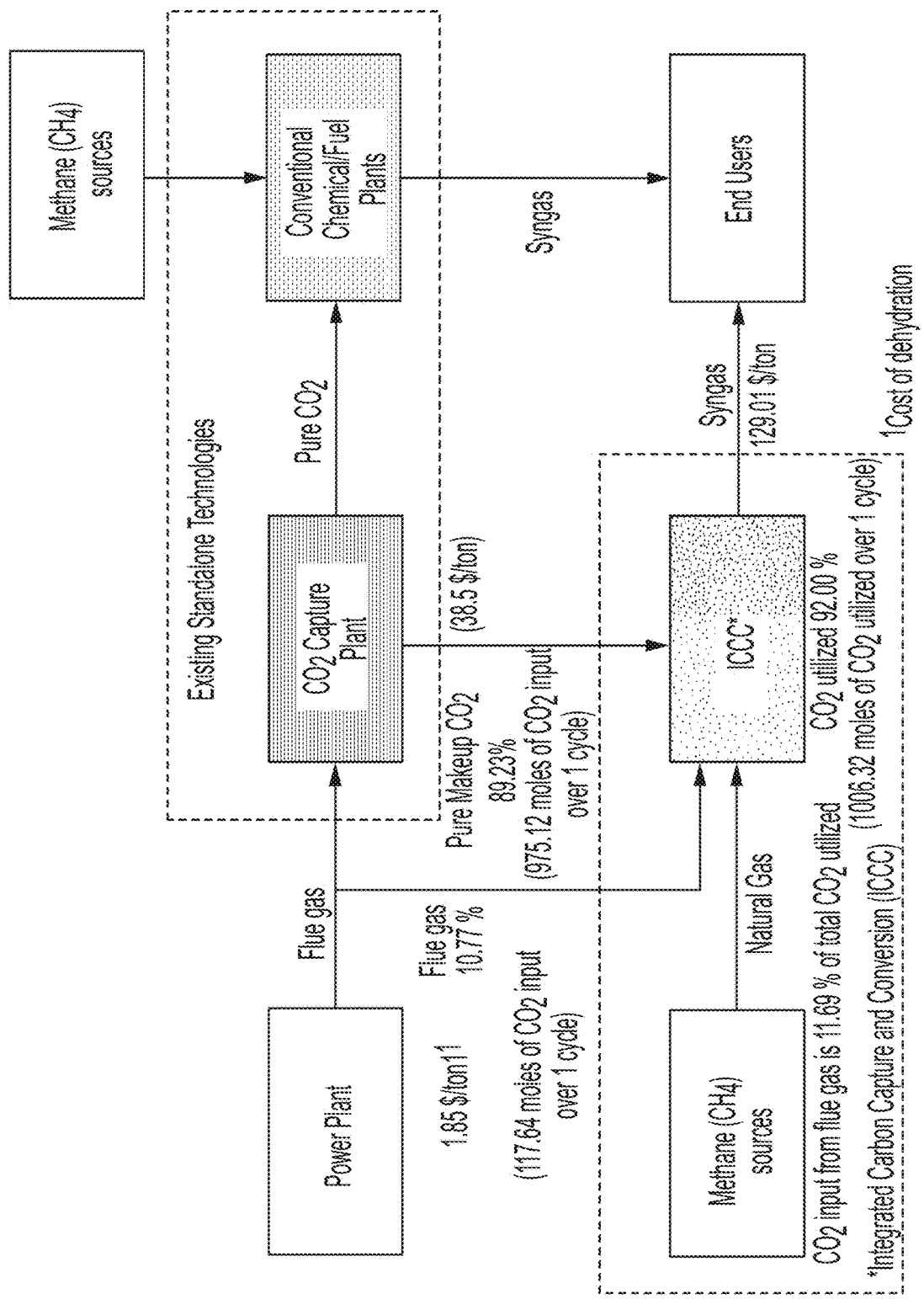
FIG. 19 illustrates "direct" utilization of $CO_2$ results for Case Study 1. The objective maximized herein is the relative percentage of $CO_2$ fed to the process via flue gas compared to the total $CO_2$ utilized by the process.

Case (c)—Maximize "Direct" Utilization of $CO_2$ from Flue Gas over Total $CO_2$ Utilization: It can be observed from Table 15 and 16 that the process is dependent on makeup $CO_2$ and $CH_4$ supplied to the process to attain feasibility and optimality. For the previous optimal points obtained, the $CO_2$ input via flue gas compared to the total amount of $CO_2$ utilized is around 1-2%. This means that from an overall process standpoint the contribution of flue gas to the total $CO_2$ utilized is quite low. Hence, to maximize the amount of flue gas processed while still maintaining the feasible nature of the process, a new objective of maximizing the $CO_2$ from flue gas consumed over the total $CO_2$ utilized is set. The constraint of overall $CO_2$ utilization to be greater than 90% is also set. In this case, it is seen that 11.69% of "direct" $CO_2$ utilization from flue gas is achieved (FIG. 19). The distribution of $CO_2$ input from the flue gas and the makeup $CO_2$ is shown in FIG. 19. This means almost 0.835 moles of flue gas can be processed with low costs for each mole of $CO_2$ utilized in the process.

This result is achieved at increased pressure. Since changing the pressure controls the amount of flue gas and natural gas sent to the process, the optimal pressure has increased to maximize the amount of $CO_2$ from flue gas processed. This however comes at a decrease in overall $CO_2$ utilization to 92% and an increase in the total cost to $129/ton of syngas. Other results are presented in Table 16 (case b).

Table 16, shown below, shows $CO_2$ consumption and utilization mole balance at optimum for natural gas (NG) and biogas (BG) feeds calculated over 1 cycle.

TABLE 16

| Process Metric | Case (a) Optimum Overall % $CO_2$ Utilization | | Case (b) Optimum Total Cost ($/ton Syngas) | | Case (c) Optimum "Direct" Utilization of $CO_2$ from Flue Gas | |
|---|---|---|---|---|---|---|
| Step 1 Feed | Flue Gas | Flue Gas | Flue Gas | Flue Gas | Flue Gas | Flue Gas |
| Step 2 Feed | Natural Gas | Biogas | Natural Gas | Biogas | Natural Gas | Biogas |
| $CO_2$ from FG feed [moles] | 9.03 | 22.16 | 25.78 | 21.83 | 117.64 | 72.34 |
| $CO_2$ from NG/BG feed [moles] | 0 | 10.52 | 0 | 3.97 | 0 | 11.82 |
| Total $CO_2$ from both feeds [moles] | 9.03 | 32.69 | 25.78 | 25.80 | 117.64 | 84.16 |
| Makeup $CO_2$ [moles] | 770.21 | 683.07 | 996.37 | 804.01 | 975.12 | 409.78 |
| Total $CO_2$ input [moles] | 779.24 | 715.76 | 1022.15 | 829.81 | 1092.76 | 493.94 |
| $CO_2$ lost vent [moles] | 0.64 | 0.57 | 7.35 | 0.55 | 18.44 | 37.77 |
| Unreacted $CO_2$ [moles] | 1.13 | 1.02 | 20.89 | 20.68 | 68.00 | 7.88 |
| Total $CO_2$ utilized [moles] | 777.47 | 714.17 | 993.91 | 808.58 | 1006.32 | 448.29 |
| % $CO_2$ from FG over total $CO_2$ utilized | 1.16 | 3.10 | 2.59 | 2.7 | 11.69 | 16.14 |

In 2016, about 1,241 million metric tons of $CO_2$ were emitted from coal-fired power plants in the United States. The direct utilization of 11.69% of $CO_2$ indicates that as much as 130 million metric tons of $CO_2$ from the coal power plants in the United States can be directly utilized to produce syngas, assuming 90% utilization, without expending additional energy and cost for $CO_2$ capture. If one considers a typical cost of post-combustion $CO_2$ capture of $40/ton, then one saves more than $5.2 billion per year.

Case Study 2—Conversion of Flue gas and Biogas to Syngas: For this case, flue gas is again used in feed step 1, but in step 2 biogas feed with 60% $CH_4$ and 40% $CO_2$ is used as the $CH_4$-rich purge feed. Similar optimizations are performed and the results are tabulated in Table 14-Table 16.

Figure 20B:
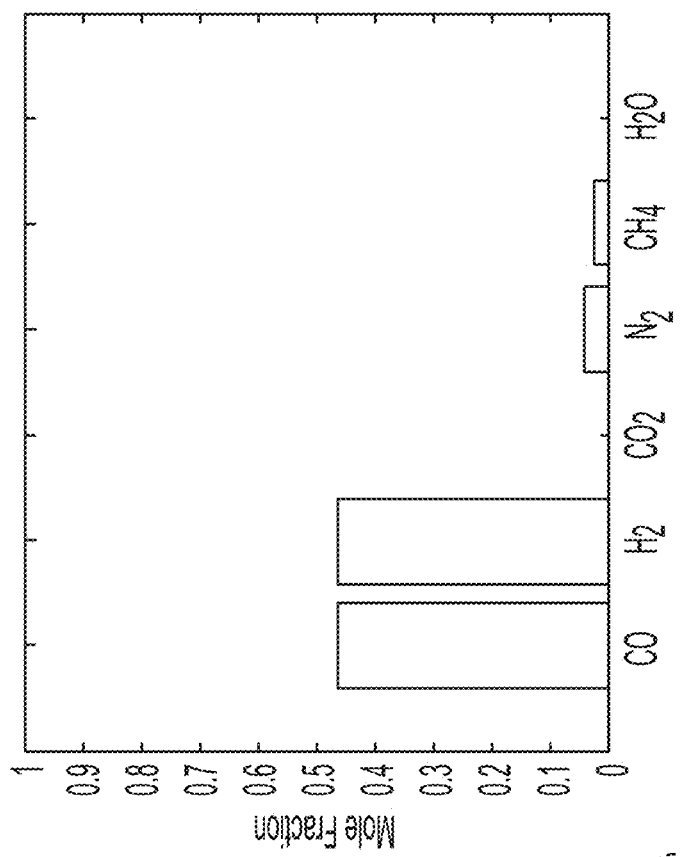
FIG. 20b illustrates product (syngas) composition at reactor outlet at maximum overall % $CO_2$ utilization for flue gas and natural gas feeds. Maximum overall % $CO_2$ utilization obtained at optimum is 99.67% at a cost $117.44/ton syngas. Process metrics and decision variable values at optimum are listed in Table 14 and Table 15, respectively.
Figure 20A:
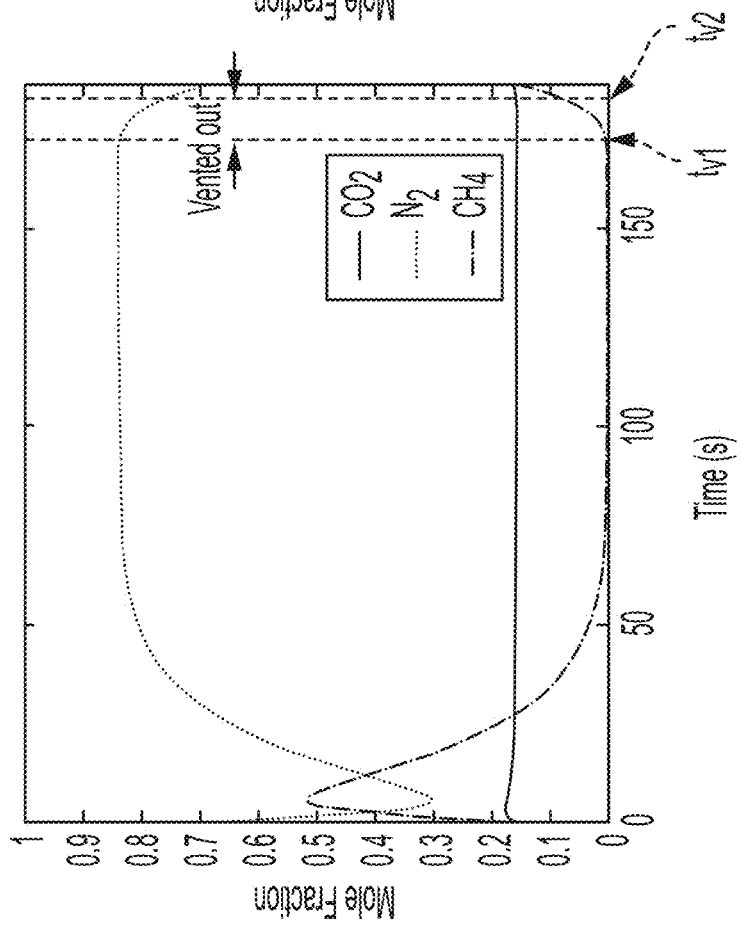
FIG. 20a illustrates mole fraction profiles at the adsorption column outlet for maximum overall % $CO_2$ utilization for flue gas as feed in step 1 and biogas as feed in step 2.

Case (a)—Maximize Overall Utilization of $CO_2$: The maximum overall $CO_2$ utilization obtained is 99.67% and it is observed that apart from temperature and pressure, there is a difference in the optimal value of the design variables between the natural gas and biogas cases. The adsorption outlet and reactor outlet profiles for this case are shown in FIG. 20. The optimal step 1 duration is almost 6 times as large as the step 2 duration. Although the optimal value is close to that obtained in the natural gas case, the operating conditions are different. It is difficult to exactly predict the choice of the venting period in this scenario, which has been chosen by the optimization to balance all the tradeoffs. At this maximum overall $CO_2$ utilization, the cost is $117.5 per ton of syngas, which is lower than the cost for the natural gas case.

Case (b)—Minimize total cost per ton of syngas: The total cost of the process per ton of syngas is minimized while restricting the overall $CO_2$ utilization above 90% and meeting all other constraints. The minimum total cost per ton of syngas obtained for this case is $110.1 per ton of syngas. All loss and product specifications are met. The pressure and reactor length hit the lower bound to reduce the cost while the reactor temperature is 1194 K. However, since biogas has 40% $CO_2$ the makeup $CO_2$ required at optimum has not reached the upper bound. The step 1 duration is much longer than the step 2 duration. From Table 15, it is seen that the use of biogas which is rich in $CO_2$ reduces the need for makeup $CO_2$ as compared to the natural gas case. However, a higher makeup $CH_4$ is used.

Figure 21:
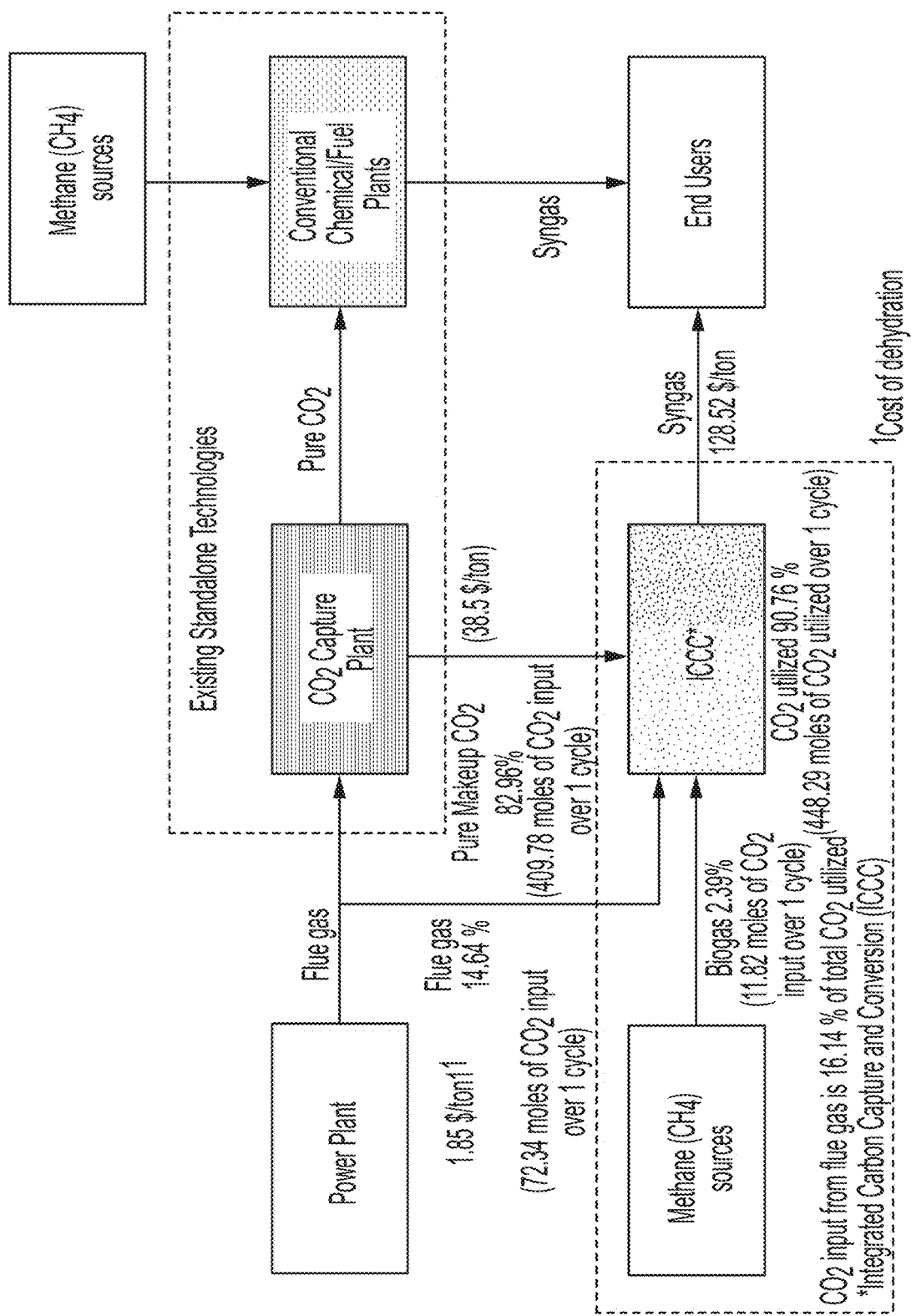
FIG. 21 illustrates "direct" utilization of $CO_2$ results for Case Study 2. $CO_2$ input contribution from various sources for optimal % of $CO_2$ input from flue gas over total $CO_2$ utilized in the process for the case of flue gas and biogas as feeds. The objective maximized herein is the relative percentage of $CO_2$ fed to the process via flue gas compared to the total $CO_2$ utilized by the process.

Case (c)—Maximize "Direct" Utilization of $CO_2$ from Flue Gas over Total $CO_2$ Utilization: The reduction in makeup $CO_2$ requirement results in an increase in the percentage of direct $CO_2$ input via flue gas as compared to the natural gas case. To further maximize the percentage of $CO_2$ utilized via flue gas, an optimization is run to maximize the same. It is ensured that the overall $CO_2$ utilization in the process does not drop below 90%. The optimization results suggest that it is possible to operate the process such that the $CO_2$ from flue gas accounts for 16.14% of the total $CO_2$ utilized and 14.6% of the total $CO_2$ input to the process (Table 16 and FIG. 21). This means that about 1.15 moles of flue gas can be processed without pressure or temperature swings for each mole of $CO_2$ utilized. This is achieved by reducing the makeup $CO_2$ required by the process while increasing the overall amount of flue gas sent to the process. The overall $CO_2$ utilization and the cost at this condition are 90.7% and $128.5/ton, respectively.

Figure 22:
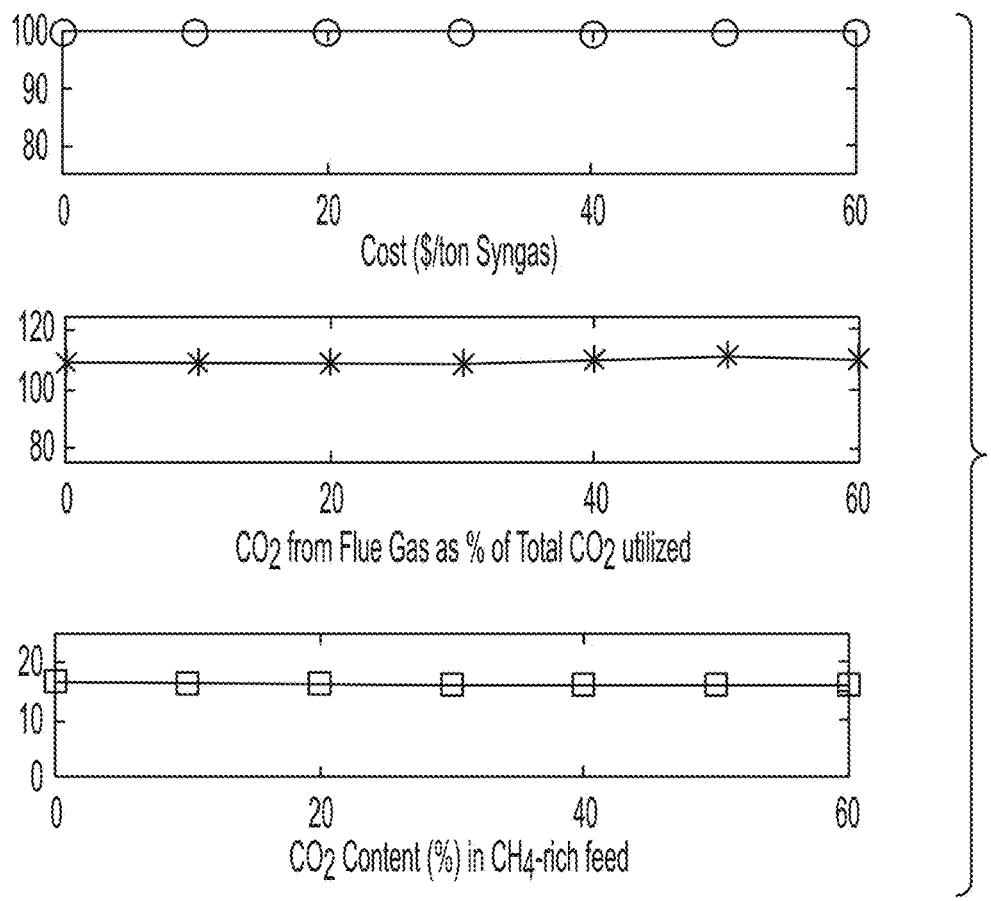
FIG. 22 illustrates results showing the robustness of the performance metrics for a range of feed conditions. Optimal objective values obtained for different $CO_2$ content ranging from 0-60% in methane-rich feed used in the second step. The objectives are optimized separately by changing the objective function accordingly to maximizing overall % $CO_2$ utilization, minimizing the total cost of the process per ton of syngas produced, and maximizing the % of $CO_2$ input from flue gas over total $CO_2$ utilized.

Case Study 3—Technology Robustness in the Presence of Variable Feed Compositions: To examine the applicability of the process when there is varying $CO_2$ content in the $CH_4$-rich feed, optimizations are performed for $CO_2$ percentage composition in $CH_4$-rich feed varying from 0-60%, considering different objectives of overall $CO_2$ utilization, total cost per ton of syngas, and direct utilization $CO_2$ from flue gas. The optimization results are shown in FIG. 22. Different warm starts and variable bounds were used for the optimization algorithm to obtain these results. It can be observed that for a wide variety of $CO_2$ compositions in the methane-rich feed it is possible to operate the process feasibly with costs of around $110/ton of syngas, maximum overall $CO_2$ utilization of around 99.5%, and direct flue gas based $CO_2$ utilization of about 16%. It is possible to maintain a certain desired objective value and operate the process at different compositions of $CH_4$-rich purge feed. This demonstrates that the proposed systems and methods disclosed herein could be robust under different feed conditions.

It is important to note that the best results presented above are dependent on the bounds on the design variables and the limits on the process performance metrics. Since conservative values of these parameters are employed, relaxing some of these specifications depending on the downstream needs may improve the results and applicability of the process even further.

The optimization case studies discussed above are performed with N=5 and C=5 along with the constraints and decision variable bounds already specified. The optimization algorithm requires function evaluations (simulations run at samples) to move towards feasibility and later towards the optimal point. Since the process model is dynamic involving partial differential equations and is operated cyclically, a highly accurate simulation performed with high N over many cycles is computationally expensive. The time required per simulation can be greatly reduced by performing the simulations for a fewer number of discretizations and cycles, hereinafter referred to as short simulations. Though the accuracy might be reduced to an extent, the feasible and optimal points for short simulations are obtained within a shorter time. The values of the process metrics obtained for a sample point after the short simulation can be compared with a longer simulation (N=30 and C=100) to check if it is acceptable. The differences in the value of the process metrics obtained from short and long simulations are small (Table 12). The results can be further refined using longer simulations.

Figure 23:
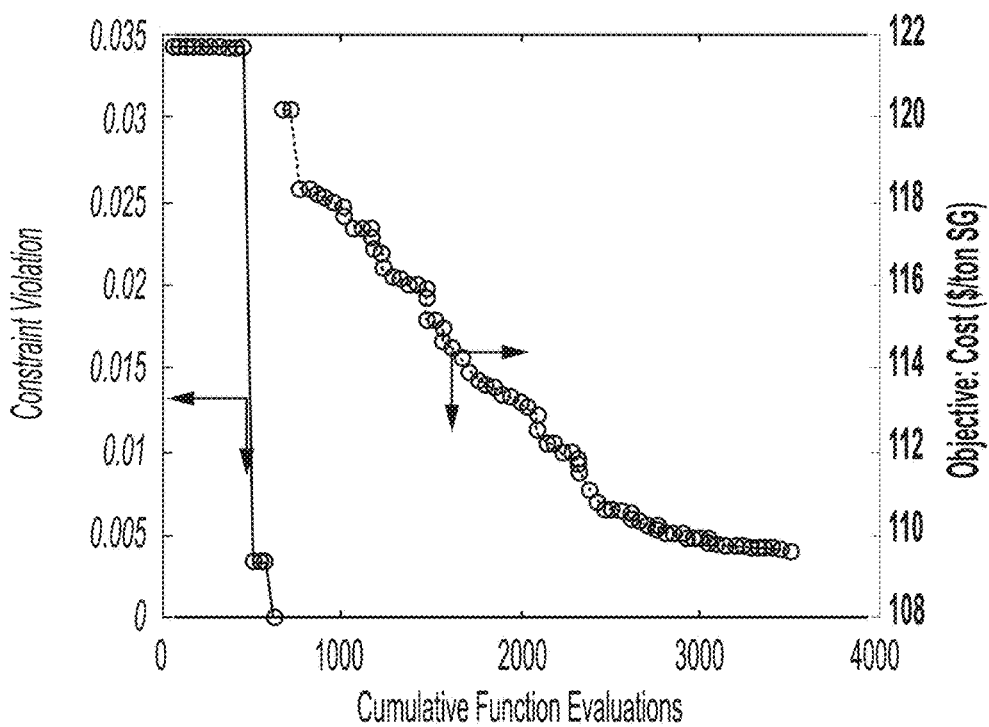
FIG. 23 illustrates the progress of the optimization algorithm from infeasible operating point towards optimality. The restoration phase of the algorithm is used to reduce the constraint violation and converge to a feasible point, after which the optimization phase of the algorithm reduces the objective of cost of the process while maintaining feasibility. For a particular case of minimizing the total cost when flue gas and natural gas are used as the feed, the restoration phase needs approximately 620 simulations to find a feasible solution where the constraint violation is zero. The algorithm then switches to the optimization phase which performs additional simulations towards finding better objective values.

Progress of the Algorithm: The progress of the optimization algorithm from an infeasible initial point to the optimal point is shown in FIG. 23. The optimization problem run in this case is the minimization of total cost when flue gas and natural gas are used as feeds. The initial point from which the optimization algorithm is started is same as the reference case listed in Table 4. The algorithm first decreases the cumulative constraint violation of all the constraints to reach the feasible operating point. After that the algorithm decreases the desired objective function until it reaches optimality. The optimization algorithm ends once the criticality measure is satisfied or the trust region size becomes sufficiently small. Feasible points obtained in this manner could be then provided as starting points to other optimization runs with different objectives. It is observed that the restoration phase of the algorithm needs approximately 620 simulation/samples of the NAPDE model to reach a feasible solution with all the constraints satisfied. Afterwards, the algorithm switches to the optimization phase, which performs approximately 2885 additional simulations to reach the final solution within a stipulated time.

Non-Dimensional Discretized Adsorption Model

The process model for adsorption involves a system of partial differential equations in space and time. To solve it, the system is first discretized into a set of ordinary differential equations by applying finite volume discretization in space. Through the model is discretized using a finite volume approach, an upwind differencing scheme is used which reduces it to a finite difference approximation. Although the accuracy is reduced due to numerical dispersion, the upwind differencing scheme is used due to its simplicity and non-oscillatory nature. The PDEs are non-dimensionalized using appropriate scaling factors for ease of convergence. The non-dimensional discretized form of the PDEs used in the adsorption model is given below:

Component mass balance:

$$\frac{\partial y_{i,j}}{\partial \tau} = \frac{1}{Pe}\frac{\overline{T}_j}{\overline{P}_j}\frac{1}{\Delta Z}\left[\left(\frac{\overline{P}}{\overline{T}}\right)_{j+0.5}\frac{(y_{i,j+1}-y_{i,j})}{\Delta Z} - \left(\frac{\overline{P}}{\overline{T}}\right)_{j-0.5}\frac{(y_{i,j}-y_{i,j-1})}{\Delta Z}\right] - \frac{\overline{T}_j}{\overline{P}_j}\frac{1}{\Delta Z}\left[\left(\frac{\overline{y}_i\overline{P}}{\overline{T}}\overline{v}\right)_{j+0.5} - \left(\frac{\overline{y}_i\overline{P}}{\overline{T}}\overline{v}\right)_{j-0.5}\right] - \psi\frac{\overline{T}_j}{\overline{P}_j}\frac{\partial \overline{q}_{i,j}}{\partial \tau} - \frac{\overline{y}_{i,j}}{\overline{P}_j}\frac{\partial \overline{P}_j}{\partial \tau} + \frac{y_i}{\overline{T}_j}\frac{\partial \overline{T}_j}{\partial \tau} \quad \text{Eq. 67}$$

Total mass balance:

$$\frac{\partial \overline{P}_j}{\partial \tau} = \frac{\overline{P}_j}{\overline{T}_j}\frac{\partial \overline{T}_j}{\partial \tau} - \frac{\overline{T}_j}{\Delta Z}\left[\left(\frac{\overline{P}}{\overline{T}}\overline{v}\right)_{j+0.5} - \left(\frac{\overline{P}}{\overline{T}}\overline{v}\right)_{j-0.5}\right] - \overline{T}_j\psi\sum_i\frac{\partial \overline{q}_i}{\partial \tau} \quad \text{Eq. 68}$$

Energy balance inside the column:

$$\frac{\partial \overline{T}_j}{\partial \tau} = \Omega_{1,j}\frac{1}{\Delta Z}\left[\left(\frac{\overline{T}_{j+1}-\overline{T}_j}{\Delta Z}\right)-\left(\frac{\overline{T}_{j+1}-\overline{T}_j}{\Delta Z}\right)\right] - \qquad \text{Eq. 69}$$

$$\Omega_{2,j}\frac{1}{\Delta Z}[(\overline{vP})_{j+0.5}-(\overline{vP})_{j-0.5}]+$$

$$\sum_i (\sigma_{i,j}-\Omega_{3,j}\overline{T}_j)\frac{\partial \overline{q}_i}{\partial \tau} - \Omega_{4,j}(\overline{T}_j-\overline{T}_{w,j}) - \Omega_{2,j}\frac{\partial \overline{P}_j}{\partial \tau}$$

Energy balance across the column wall:

$$\frac{\partial \overline{T}_{w,j}}{\partial \tau} = \pi_1\frac{1}{\Delta Z}\left[\left(\frac{\overline{T}_{w,j+1}-\overline{T}_{w,j}}{\Delta Z}\right)-\left(\frac{\overline{T}_{w,j}-\overline{T}_{w,j-1}}{\Delta Z}\right)\right]+ \qquad \text{Eq. 70}$$

$$\pi_2(\overline{T}_j-\overline{T}_{w,j})-\pi_3(\overline{T}_{w,j}-\overline{T}_a)$$

Linear driving force model for mass transfer:

$$\frac{\partial \overline{q}_{i,j}}{\partial \tau} = \alpha_i(\overline{q}^*_{i,j}-\overline{q}_{i,j}) \qquad \text{Eq. 71}$$

Total Installed Cost Calculation

The total installed cost is the sum of all individual equipment costs for compressors, columns, and heat exchangers used. The process of the present disclosure includes an adsorption column, compressors and a reformer type of reactor. The total installed cost is given by:

$$TIC = TIC_{ads} + TIC_{com} + TIC_{RR} \qquad \text{Eq. 72}$$

The cost calculated for a past base year ($C_0$) is converted to 2016 values (C) using the Chemical Engineering (CE) Plant Cost Index.

$$C = C_0\frac{I_{2016}}{I_0} \qquad \text{Eq. 73}$$

where $I_0$=index value at the base year and $I_{2016}$ is the CE index value for September 2016, that is, 542.8.

The equipment installation cost for compressors is taken to be 80% of the purchased cost while for other equipment (heat exchangers and columns) it is taken to be 4% of the purchased cost based on a U.S. Department of Energy report. Hence, $C_{com}=1.8\ C_{p,com}$, $TIC_{cool}=1.04\ C_{p,cool}$, and $TIC_{ads}=1.04\ C_{p,ads}$. The purchased costs for these are obtained from previous literature and are described below.

The adjusted purchase cost for the compressors and the subsequent cooler is given below:

$$C_{com} = 3791.3\frac{I_{2016}}{I_0}\left(\frac{W_{com}}{0.7453}\right)^{0.82} \qquad \text{Eq. 74}$$

$$C_{cool} = 130\frac{I_{2016}}{I_0}|Q_C|^{0.78} \qquad \text{Eq. 75}$$

where $I_0$ for this case is CE value in 2004, that is, 444.2, $W_{com}$ is the consumed power of a compressor in kW and $|Q_C|$ is the cooling duty in kW.

The purchased cost for the adsorption column is given below:

$$C_{p,ads}^0 = F_M C_{V,ads} + C_{PL,ads} + V_{P,ads}C_{PK} + C_{DR,ads} \qquad \text{Eq. 76}$$

where $F_M$ is the materials of construction factor, $C_{V,ads}$ is the free on board purchase cost of empty vessel with weight $W_{ads}$, $C_{PL,ads}$ is cost of platforms and ladders, $V_{ads}$ is the adsorber packing volume, $C_{PL}$ is the installed cost of packing (adsorbent) per unit volume, and $C_{DR,ads}$ is the installed cost of flow distributors. These are further calculated using the expressions below:

$$C_{V,ads} = \exp(7.0374 + 0.18255\ln W_{ads} + 0.02297(\ln W_{ads})^2) \qquad \text{Eq. 77}$$

$$W_{ads} = \pi(39.37D_{ads}+t_s)(39.37(0.8D_{ads}+L_a)t_s\rho_w) \qquad \text{Eq. 78}$$

$$C_{PL,ads} = 237.1(3.281D_{ads})^{0.63316}(3.281L_a)^{0.80161} \qquad \text{Eq. 79}$$

$$V_{ads} = \frac{\pi}{4}(3.281D_a)^2(3.281L_a) \qquad \text{Eq. 80}$$

$$C_{DR,ads} = 100\frac{\pi}{4}(3.281D_a)^2 \qquad \text{Eq. 81}$$

where $F_M$=2.1, $C_{PK}$=60, $\rho_w$=0.2818 lb/in$^3$, $t_s$=0.688 in, and $D_a$ is the diameter of the column. The base index value ($I_0$) in this case was CE in mid-2000 and its then value was 394. The CE index in October 2016 was $I_{2016}$=543.3.

$$C_{p,ads} = C_{p,ads}^0\frac{I_{2016}}{I_0} \qquad \text{Eq. 82}$$

To estimate the total installed cost of isothermal dry reforming reactor ($TIC_R$) with feed heating in the process of the present disclosure, the cost of furnace and that of the reactor bed were considered. A reformer includes a furnace section where natural gas is burnt. This heat is then supplied to the catalyst tubes in the convection section where the reaction takes place. There are different types of reformers with different configuration of burners to achieve the heat flux desired. This can help achieve both feed heating and isothermal operation which is needed in the process implementation. The purchased cost for the reactor bed ($C_{p,reac}$) is calculated in the same manner as for the adsorbent column.

The purchased cost for the furnace ($C_{p,furn}$) is given by:

$$C_{p,furn} = 0.677\frac{I_{2016}}{I_0}Q_h^{0.81} \qquad \text{Eq. 83}$$

where $Q_h$ is the heat duty requirement in Btu/hr.

The total installed cost of the reforming reactor is given by:

$$TIC_{RR} = 1.04C_{p,reac} + 1.04C_{p,furn} \qquad \text{Eq. 84}$$

Design of Simulations for Data-Driven Optimization

The desired number of feasible samples was obtained by solving the following optimization problem. This problem aims to find space filling samples within the known feasible region:

$$\min_{u} \left(\frac{4}{3}\right)^n + \frac{1}{N_s^2} \sum_{i',j=1}^{N_s} \prod_{i=1}^{n} \left[\frac{3}{2} - |u_i^{(i')} - u_i^{(j)}|(1 - |u_i^{(i')} - u_i^{(j)}|)\right] \quad \text{Eq. 85}$$

s.t. $g_{k,i}(u) \leq 0 \ \forall \ i \in \{1, \ldots, p\}$ $u_i \in [0, 1] \ \forall \ i \in \{1, \ldots, n\}$ where u represents the normalized decision variables. The decision variables are normalized such that their scaled bounds fall within the range [0,1].

Surrogate Models and Parameter Estimation

Cubic radial basis function with the following functional form is used as a surrogate model:

$$f^r = a + \sum_{i=1}^{n} b_i x_i + \sum_{j=1}^{|SMB|} \lambda_j \left(\left(\sum_{i=1}^{n}(x_i - x_{j,i})^2\right)\right)^{3/2} \quad \text{Eq. 86}$$

where $a$, $b_i$, and $\lambda_j$ represent the parameters of the surrogate model fitted to the dataset obtained from simulations performed using the detailed process model. The above function is nonlinear and interpolating in nature. It has also been shown that the function satisfies the fully-linear property assuming certain conditions on the geometry of sample set.

The samples obtained are divided into three sets: interpolating (denoted by SMB), cross-validation (denoted by SCV), and testing (denoted by ST). In the present disclosure, at each iteration, the total number of samples used are 5n. 20% of the samples are used for testing (|ST|=n), 30% of the samples are employed for cross-validation (|SCV|=⌈1.5n⌉), and the remaining samples are utilized for interpolation. To estimate the parameters ($a$, $b_i$, $\lambda_j$), following linear program is solved:

$$\min_{a,b_i,\lambda_j} \sum_{i'=1}^{|SCV|} SP_{i'} + SN_{i'} \quad \text{Eq. 87}$$

s.t. $y_{i'} + SP_{i'} - SN_{i'} =$ $$a + \sum_{i=1}^{n} b_i x_{i',i} + \sum_{j=1}^{|SMB|} \lambda_j \left(\left(\sum_{i=1}^{n}(x_{i',i} - x_{j,i})^2\right)\right)^{3/2} \ \forall \ i' \in SCV$$

$$Y_{i'} = a + \sum_{i=1}^{n} b_i x_{i',i} + \sum_{j=1}^{|SMB|} \lambda_j \left(\left(\sum_{i=1}^{n}(x_{i',i} - x_{j,i})^2\right)\right)^{3/2} \ \forall \ i \in SMB$$

$SP_{i'}, SN_{i'} \geq 0$ where SCV is the cross-validation set.

CONCLUSIONS

The present disclosure has designed, intensified, optimized, and examined the techno-economic feasibility of an integrated cyclic process which captures $CO_2$ from flue gas using a $CH_4$-rich feed to perform regeneration without expending significant energy. The choice of using $CH_4$-rich feed was motivated ultimately to produce syngas by $CO_2$ reforming of methane. The cyclic nature of the process necessitated the use of a dynamic model which was solved to examine the effect of variables such as pressure, column lengths, and durations of individual feed steps. Since the choice of some of the variables such as venting times and makeup feeds are based on the upstream adsorption outlet profiles, applying just a parametric simulation study for the whole process may not be the best approach. Even for finding conditions for feasible operation while meeting process constraints, an optimization framework is necessary for complex process configurations such as ones presented herein. A novel simulation-based, data-driven optimization strategy was used to obtain optimal operating conditions for maximum $CO_2$ utilization and minimum cost. An overall $CO_2$ utilization of 99.67% was obtained. The cost of syngas production is approximately $109-110 per ton. As much as 14.6% of the total $CO_2$ input to the process can be also captured with low cost "directly" from flue gas while still maintaining more than 90% overall $CO_2$ utilization. This is possible due to the intensification of the separation and reaction steps as well as the optimization approach presented herein. The process technology is found to be robust to operate efficiently under different feed conditions. Though the systems and methods discussed herein are dependent on external reinforcement of $CO_2$ and $CH_4$ to meet the requisite syngas product specifications, an argument can be made for the low-cost utilization of $CO_2$ and $CH_4$ from off-spec sources by employing this process in a grid or network along with existing technologies.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A gas capture and conversion system, comprising:
   a flue gas feed, the flue gas containing nitrogen and carbon dioxide;
   a methane gas feed;
   an adsorption column fluidly coupled to the flue gas feed and to the methane gas feed, the adsorption column comprising an adsorbent having an affinity for the carbon dioxide contained in the flue gas;
   a vent fluidly coupling the adsorption column to the atmosphere, the vent exhausting the nitrogen contained in the flue gas;
   a reactor fluidly coupled to the adsorption column via a reactor line; and
   wherein supplying methane gas to the adsorption column increases a partial pressure of the methane gas and results in a reduction of a partial pressure of the carbon dioxide contained in the flue gas causing the carbon dioxide to be desorbed from the adsorbent to create a mixture of the carbon dioxide gas and the methane gas that is supplied to the reactor via the reactor line.

2. The gas capture and conversion system of claim 1, wherein the reactor comprises a catalyst that facilitates a reaction between the methane and the carbon dioxide to yield a product gas.

3. The gas capture and conversion system of claim 2, wherein the product gas is syngas.

4. The gas capture and conversion system of claim 2, comprising:
   a first makeup feed of the carbon dioxide gas coupled to the reactor line; and
   a second makeup feed of the methane gas coupled to the reactor line.

5. The gas capture and conversion system of claim 1, wherein the flue gas feed is from an industrial plant that at least one of produces, generates, or emits $CO_2$ as at least one of a main product and a by-product.

\* \* \* \* \*